(12) United States Patent
Favor

(10) Patent No.: US 6,336,178 B1
(45) Date of Patent: Jan. 1, 2002

(54) RISC86 INSTRUCTION SET

(75) Inventor: John G. Favor, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/152,043

(22) Filed: Sep. 11, 1998

Related U.S. Application Data

(60) Division of application No. 08/649,983, filed on May 16, 1996, now Pat. No. 5,926,642, which is a continuation-in-part of application No. 08/592,151, filed on Jan. 26, 1996, now abandoned.
(60) Provisional application No. 60/005,069, filed on Oct. 6, 1995, and provisional application No. 60/005,021, filed on Oct. 10, 1995.

(51) Int. Cl.[7] .................................................. G06F 15/00

(52) U.S. Cl. ........................ 712/23; 712/213; 712/209

(58) Field of Search .......................... 712/23, 205, 208, 712/209, 210, 215, 212, 21 T, 213; 717/5

(56) References Cited

U.S. PATENT DOCUMENTS

| | | | |
|---|---|---|---|
| 4,641,262 A | 2/1987 | Bryan et al. ............... 364/900 |
| 4,868,765 A | 9/1989 | Diefendorff ................ 364/521 |
| 4,932,048 A | 6/1990 | Kenmochi et al. ............ 379/67 |
| 4,941,089 A | 7/1990 | Fischer ..................... 364/200 |
| 5,018,146 A | 5/1991 | Sexton ..................... 371/37.1 |
| 5,101,341 A | 3/1992 | Circello et al. ............. 395/375 |
| 5,131,086 A | 7/1992 | Circello et al. ............. 395/375 |
| 5,155,843 A | 10/1992 | Stamm et al. .............. 395/575 |
| 5,185,868 A | 2/1993 | Tran ......................... 395/375 |
| 5,201,056 A | 4/1993 | Daniel et al. .............. 395/800 |
| 5,222,244 A | 6/1993 | Carbine et al. ............. 395/800 |
| 5,233,694 A | 8/1993 | Hotta et al. ................ 395/375 |
| 5,233,696 A | 8/1993 | Suzuki ...................... 395/375 |
| 5,287,490 A | 2/1994 | Sites ........................ 395/500 |
| 5,301,342 A | 4/1994 | Scott ........................ 395/800 |

(List continued on next page.)

FOREIGN PATENT DOCUMENTS

| | | |
|---|---|---|
| EP | 0 380 854 A3 | 8/1990 |
| EP | 0 454 984 A2 | 11/1991 |
| EP | 0 498 654 A3 | 8/1992 |
| EP | 0 506 972 A1 | 10/1992 |
| EP | 0 651 320 A1 | 5/1995 |
| GB | 2 263 985 A | 8/1993 |
| GB | 2 263 987 A | 8/1993 |
| WO | WO 93/01546 | 1/1993 |
| WO | WO 93/20507 | 10/1993 |

OTHER PUBLICATIONS

Steve McGeady, "Inside Intel's i960CA Superscalar Processor," Jul. 1990, pp. 385–396, *Microprocessors and Microsystems*, vol. 14, No. 6, XP000151094.

Keith Diefendorff and Ed Silha, "The PowerPC User Instruction Set Architecture," Oct. 14, 1994, pp. 30–41, IEEE Micro, Los Alamitos, CA, XP000476678.

John Crawford, "Architecture of the Intel 80386," Oct. 6–9, 1986, pp. 155–160, IEEE Int. Conf. on Computer Design: VLSI in Computers, XP000212275.

G. B. steven et al., "iHARP: A Multiple Instruction Issue Processor," Sep. 1992, pp. 439–449, IEEE Proceedings–E, vol. 139, No. 5, XP000319892.

*Primary Examiner*—Larry D. Donaghue
(74) *Attorney, Agent, or Firm*—Skjerven Morrill MacPherson LLP

(57) ABSTRACT

An internal RISC-type instruction structure furnishes a fixed bit-length template including a plurality of defined bit fields for a plurality of operation (Op) formats. One format includes an instruction-type bit field, two source-operand bit fields and one destination-operand bit field for designating a register-to-register operation. Another format is a load-store format that includes an instruction-type bit field, an identifier of a source or destination register for the respective load or store operation, and bit fields for specifying the segment, base and index parameters of an address.

48 Claims, 11 Drawing Sheets

U.S. PATENT DOCUMENTS

| | | | |
|---|---|---|---|
| 5,333,277 A | 7/1994 | Searls | 395/325 |
| 5,394,524 A | 2/1995 | DiNicola et al. | 395/163 |
| 5,412,466 A | 5/1995 | Pietras et al. | 395/131 |
| 5,438,668 A | 8/1995 | Coon et al. | 395/375 |
| 5,440,619 A | 8/1995 | Cann | 379/97 |
| 5,488,710 A | 1/1996 | Sato et al. | 395/452 |
| 5,495,419 A | 2/1996 | Rostoker et al. | 364/468 |
| 5,504,689 A | 4/1996 | Fiebrich et al. | 364/481 |
| 5,513,330 A | 4/1996 | Stiles | 395/375 |
| 5,568,646 A | 10/1996 | Jaggar | 395/800 |
| 5,598,546 A | 1/1997 | Blomgren | 395/385 |
| 5,619,665 A | 4/1997 | Emma | 395/384 |
| 5,638,525 A | 6/1997 | Hammond et al. | 395/385 |
| 5,646,676 A | 7/1997 | Dewkett et al. | 348/7 |
| 5,664,215 A | 9/1997 | Burgess et al. | 395/800.23 |
| 5,758,114 A | 5/1998 | Johnson et al. | 395/380 |
| 5,758,141 A | 5/1998 | Kahle et al. | 395/570 |

FIG. 6A  RegOp
FIG. 6B  LdStOp
FIG. 6C  LIMMOp
FIG. 6D  SpecOp
FIG. 6E  FpOp

RISC86 INSTRUCTION SET

RELATED APPLICATIONS

This application is a division of application Ser. No. 08/649,983, filed May 16, 1996, now U.S. Pat. No. 5,926,642, which is a continuation-in-part of application Ser. No. 08/592,151, filed on Jan. 26, 1996 now abandoned, and claims benefit of U.S. Provisional Application No. 60/005,069, filed Oct. 6, 1995 and U.S. Provisional Application No. 60/005,021, filed Oct. 10, 1995.

BACKGROUND OF THE INVENTION

1. Field of the Invention

This invention relates to processors. More specifically, this invention relates to processors that convert an x86 instructions into RISC-type operations for execution on a RISC-type core.

2. Description of the Related Art

Advanced microprocessors, such as P6-class x86 processors, are defined by a common set of features. These features include a superscalar architecture and performance, decoding of multiple x86 instructions per cycle and conversion of the multiple x86 instructions into RISC-like operations. The RISC-like operations are executed out-of-order in a RISC-type core that is decoupled from decoding. These advanced microprocessors support large instruction windows for reordering instructions and for reordering memory references.

The conversion or translation of CISC-like instructions into RISC-like instructions typically involves a mapping of many like-type instructions, for example many variations of an ADD instruction, into one or more generic instructions. Furthermore, a very large number of addressing modes of a particular instruction are converted into a register-to-register operation in combination with load and store operations accessing memory. Performance of a microprocessor that converts CISC-type instructions into RISC-type instructions for execution depends greatly on the number of RISC-type operations produced from a single CISC-type instruction.

Performance of an advanced superscalar microprocessor is also highly dependent upon decoding performance including decoding speed, the number of x86 instructions decoded in a single cycle, and branch prediction performance and handling. Instruction decoders in advanced superscalar microprocessors often include one or more decoding pathways in which x86 instructions are decoded by hardware logic translation and a separate decoding pathway which uses a ROM memory for fetching a RISC operation sequence that corresponds to an x86 instruction. Generally, x86 instructions that are translated by hardware logic are simple x86 instructions. The lookup ROM is used to decode more complex x86 instructions.

One problem with the usage of lookup ROM for decoding x86 instructions is that the process of accessing a microprogram control store is inherently slower and less efficient than hardwired translation of instructions. A further problem arising with decoding of x86 instructions via lookup ROM is the very large number of different CISC-type instructions that are standard for an x86 processor. Since a substantial number of instructions are implemented, a large ROM circuit on the processor chip is necessary for converting the instructions to RISC-like operations. The large number of implemented instructions corresponds to an increased circuit complexity for deriving pointers to the ROM and applying the derived pointers to the ROM. This increased circuit complexity directly relates to an increased overhead that reduces instruction decoding throughput. A large lookup ROM increases the size of the processor integrated circuit and thereby reduces manufacturing yields of the circuits and increases production costs.

What is needed is an internal instruction format that facilitates translation of a very large number of CISC-type instructions into a small number of RISC-type operations. What is also needed is an internal instruction format that facilitates conversion of CISC-type instructions into a minimum number of RISC-type operations. What is further needed is an internal instruction format that permits more common CISC-type instructions to be converted using hardwired logic, as compared to conversion via lookup ROM.

SUMMARY OF THE INVENTION

In accordance with the present invention, an internal RISC-type instruction structure furnishes a fixed bit-length template including a plurality of defined bit fields for a plurality of operation (Op) formats. One format includes an instruction-type bit field, two source-operand bit fields and one destination-operand bit field for designating a register-to-register operation. Another format is a load-store format that includes an instruction-type bit field, an identifier of a source or destination register for the respective load or store operation, and bit fields for specifying the segment, base and index parameters of an address, an index scaling factor and a displacement.

In accordance with a first embodiment of the present invention, a RISC-like internal instruction set executes on a RISC-like core of a superscalar processor. The RISC-like internal instruction set is translated from instructions of a CISC-like external instruction set. The instruction set includes a plurality of instruction codes arranged in a fixed bit-length structure. The structure being divided into a plurality of defined-usage bit fields. The instruction codes have a plurality of operation (Op) formats of the plurality of defined-usage bit fields. One Op format is a first register Op format having a format bit-field designating the instruction code as a first register Op format code, a type bit-field designating a register instruction type, a first source operand bit-field identifying a first source operand, a second source operand bit-field identifying a second source operand, a destination bit-field designating a destination operand, and an operand size bit-field designating an operand byte-size. A second Op format is a load-store Op format having a format bit-field designating the instruction code as a load-store Op format code, a type bit-field designating a load-store instruction type, a data bit-field identifying a destination-source of a load-store operation, an index scale factor bit-field for designating an index scale factor, a segment bit-field designating a segment register, a base bit-field designating a load-store base address, a displacement bit-field designating a load-store address displacement, and an index bit-field designating a load-store address index. Various bit-fields of the instruction code are substituted into the Op format with the substituted bit-field determined as a function of processor context.

Many advantages are gained by the described instruction set and instruction set format. One substantial advantage is that the described instruction set is highly regular with a fixed length and format of RISC operations. By comparison, conventional x86 instructions are highly irregular having greatly different instruction lengths and formats. A regular structure greatly reduces circuit complexity and size and substantially increases efficiency. A further advantage is that extensions are included for efficient mapping of operations by the decoder. The extensions support direct decoding and emulation or mapping of x86 instructions. Another advantage is that the described instruction set is implemented in a reduced ROM memory size due to reuse of operation structures for multiple variations that are common among x86 instructions. Usage of substitution achieves encoding of CISC functionality while substantially reducing the size of lookup code ROM, advantageously reducing the size and cost of a processor integrated circuit.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
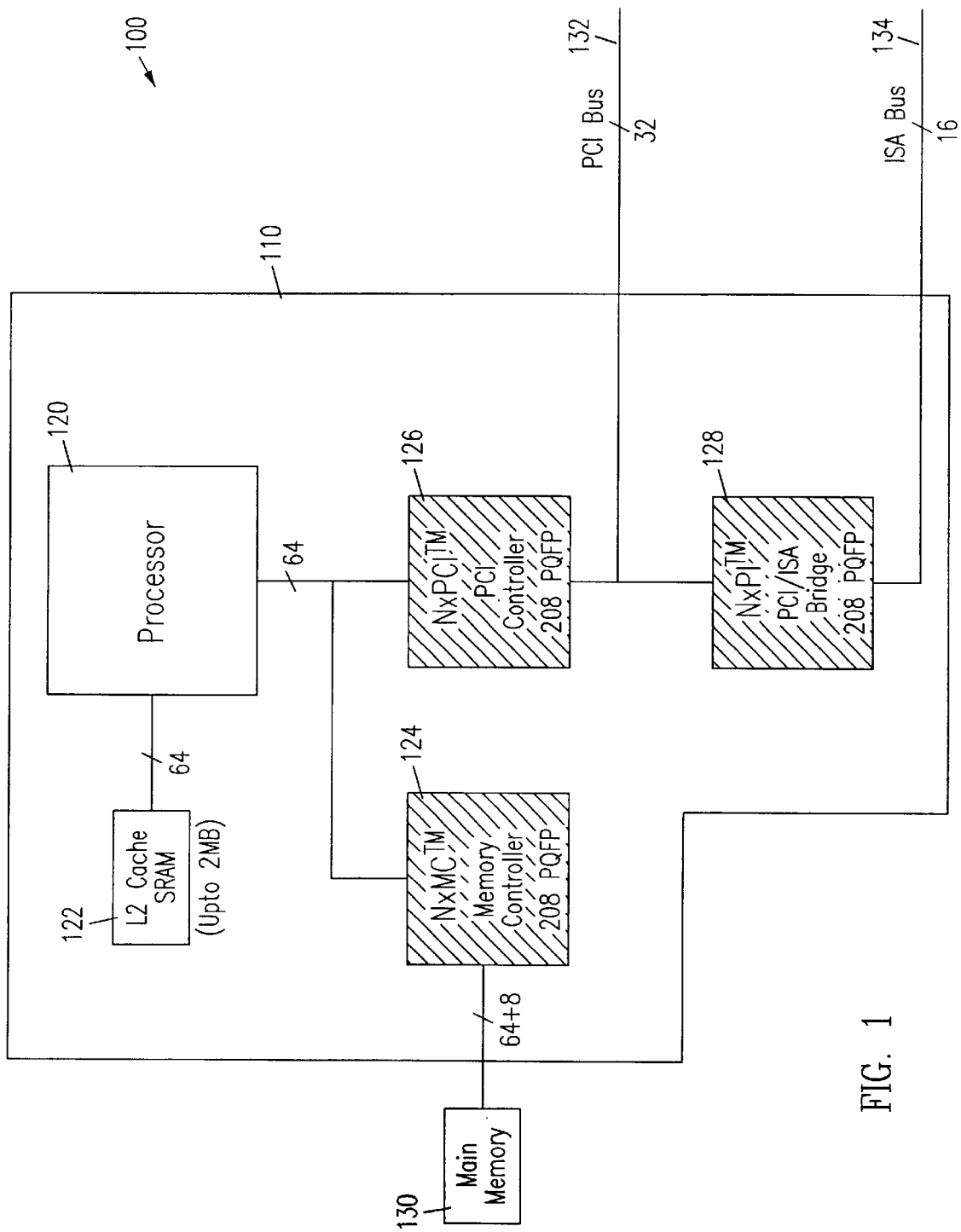
FIG. 1 is a block diagram which illustrates a computer system in accordance with one embodiment of the present invention.

Referring to FIG. 1, a computer system 100 is used in a variety of applications, including a personal computer application. The computer system 100 includes a computer motherboard 110 containing a processor 120 in accordance with an embodiment of the invention. Processor 120 is a monolithic integrated circuit which executes a complex instruction set so that the processor 120 may be termed a complex instruction set computer (CISC). Examples of complex instruction sets are the x86 instruction sets implemented on the well known 8086 family of microprocessors.

The processor 120 is connected to a level 2 (L2) cache 122, a memory controller 124 and local bus controllers 126 and 128. The memory controller 124 is connected to a main memory 130 so that the memory controller 124 forms an interface between the processor 120 and the main memory 130. The local bus controllers 126 and 128 are connected to buses including a PCI bus 132 and an ISA bus 134 so that the local bus controllers 126 and 128 form interfaces between the PCI bus 132 and the ISA bus 134.

Figure 2:
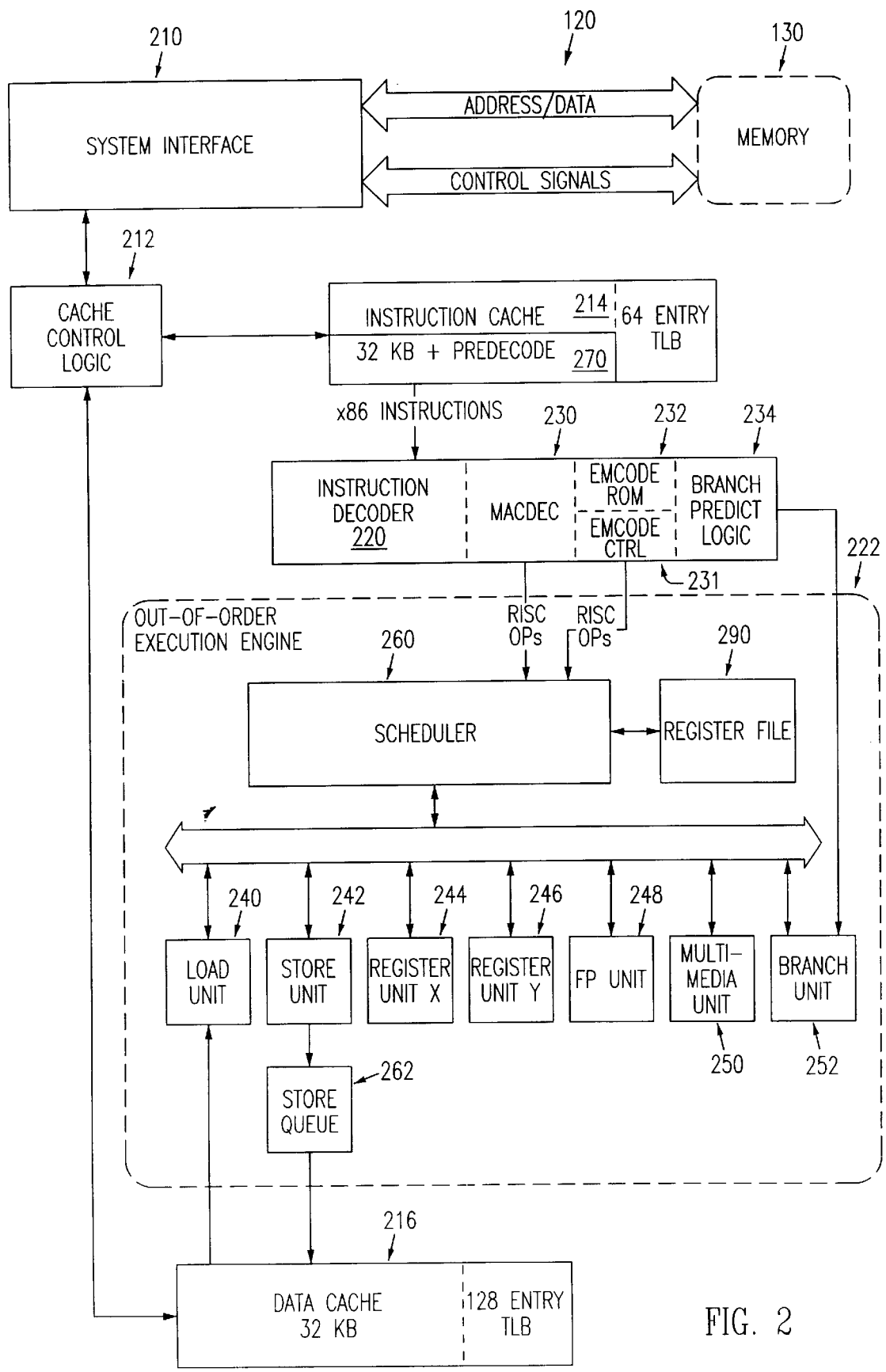
FIG. 2 is a block diagram illustrating one embodiment of processor for usage in the computer system shown in FIG. 1.

Referring to FIG. 2, a block diagram of an embodiment of processor 120 is shown. The core of the processor 120 is a RISC superscalar processing engine. Common x86 instructions are converted by instruction decode hardware to operations in an internal RISC86 instruction set. Other x86 instructions, exception processing, and other miscellaneous functionality are implemented as RISC86 operation sequences stored in on-chip ROM. Processor 120 has interfaces including a system interface 210 and an L2 cache control logic 212. The system interface 210 connects the processor 120 to other blocks of the computer system 100. The processor 120 accesses the address space of the computer system 100, including the main memory 130 and devices on local buses 132 and 134 by read and write accesses via the system interface 210. The L2 cache control logic 212 forms an interface between an external cache, such as the L2 cache 122, and the processor 120. Specifically, the L2 cache control logic 212 interfaces the L2 cache 122 and to an instruction cache 214 and a data cache 216 in the processor 120. The instruction cache 214 and the data cache 216 are level 1 (L1) caches which are connected through the L2 cache 122 to the address space of the computer system 100.

Instructions from main memory 130 are loaded into instruction cache 214 via a predecoder 270 for anticipated execution. The predecoder 270 generates predecode bits that are stored in combination with instruction bits in the instruction cache 214. The predecode bits, for example 3 bits, are fetched along with an associated instruction byte (8 bits) and used to facilitate multiple instruction decoding and reduce decode time. Instruction bytes are loaded into instruction cache 214 thirty-two bytes at a time as a burst transfer of four eight-byte quantities. Logic of the predecoder 270 is replicated eight times for usage four times in a cache line so that predecode bits for all eight instruction bytes are calculated simultaneously immediately before being written into the instruction cache 214. A predecode operation on a byte typically is based on information in one, two or three bytes so that predecode information may extend beyond an eight-byte group. Accordingly, the latter two bytes of an eight-byte group are saved for processing with the next eight-byte group in case of predecode information that overlaps two eight-byte groups. Instructions in instruction cache 214 are CISC instructions, referred to as macroinstructions. An instruction decoder 220 converts CISC instructions from instruction cache 214 into operations of a reduced instruction set computing (RISC) architecture instruction set for execution on an execution engine 222. A single macroinstruction from instruction cache 214 decodes into one or multiple operations for execution engine 222.

Figure 4:
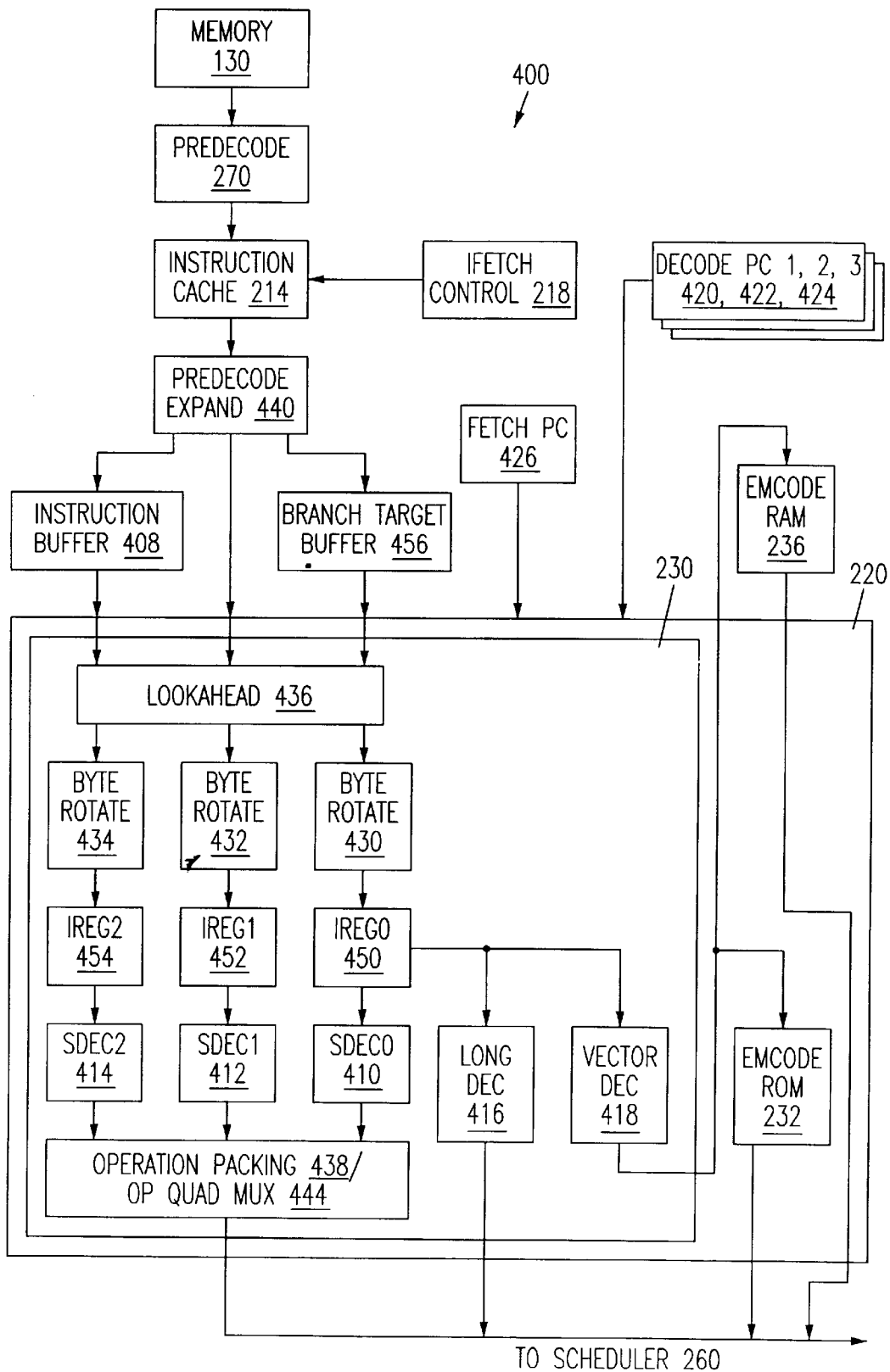
FIG. 4 is a schematic block diagram showing an embodiment of an instruction decoder used in the processor shown in FIG. 2.

Instruction decoder 220 has interface connections to the instruction cache 214 and an instruction fetch control circuit 218 (shown in FIG. 4). Instruction decoder 220 includes a macroinstruction decoder 230 for decoding most macroinstructions, an instruction emulation circuit 231 including an emulation ROM 232 for decoding a subset of instructions such as complex instructions, and a branch predict logic 234 for branch prediction and handling. Macroinstructions are classified according to the general type of operations into which the macroinstructions are converted. The general types of operations are register operations (RegOps), load-store operations (LdStOps), load immediate value operations (LIMMOps), special operations (SpecOps) and floating point operations (FpOps).

Execution engine 222 has a scheduler 260 and six execution units including a load unit 240, a store unit 242, a first register unit 244, a second register unit 246, a floating point unit 248 and a multimedia unit 250. The scheduler 260 distributes operations to appropriate execution units and the execution units operate in parallel. Each execution unit executes a particular type of operation. In particular, the load unit 240 and the store unit 242 respectively load (read) data or store (write) data to the data cache 216 (L1 data cache), the L2 cache 122 and the main memory 130 while executing a load/store operation (LdStOp). A store queue 262 temporarily stores data from store unit 242 so that store unit 242 and load unit 240 operate in parallel without conflicting accesses to data cache 216. Register units 244 and 246 execute register operations (RegOps) for accessing a register file 290. Floating point unit 248 executes floating point operations (FpOps). Multimedia unit 250 executes arithmetic operations for multimedia applications.

Scheduler 260 is partitioned into a plurality of, for example, 24 entries where each entry contains storage and logic. The 24 entries are grouped into six groups of four entries, called Op quads. Information in the storage of an entry describes an operation for execution, whether or not the execution is pending or completed. The scheduler monitors the entries and dispatches information from the entries to information-designated execution units.

Figure 3:
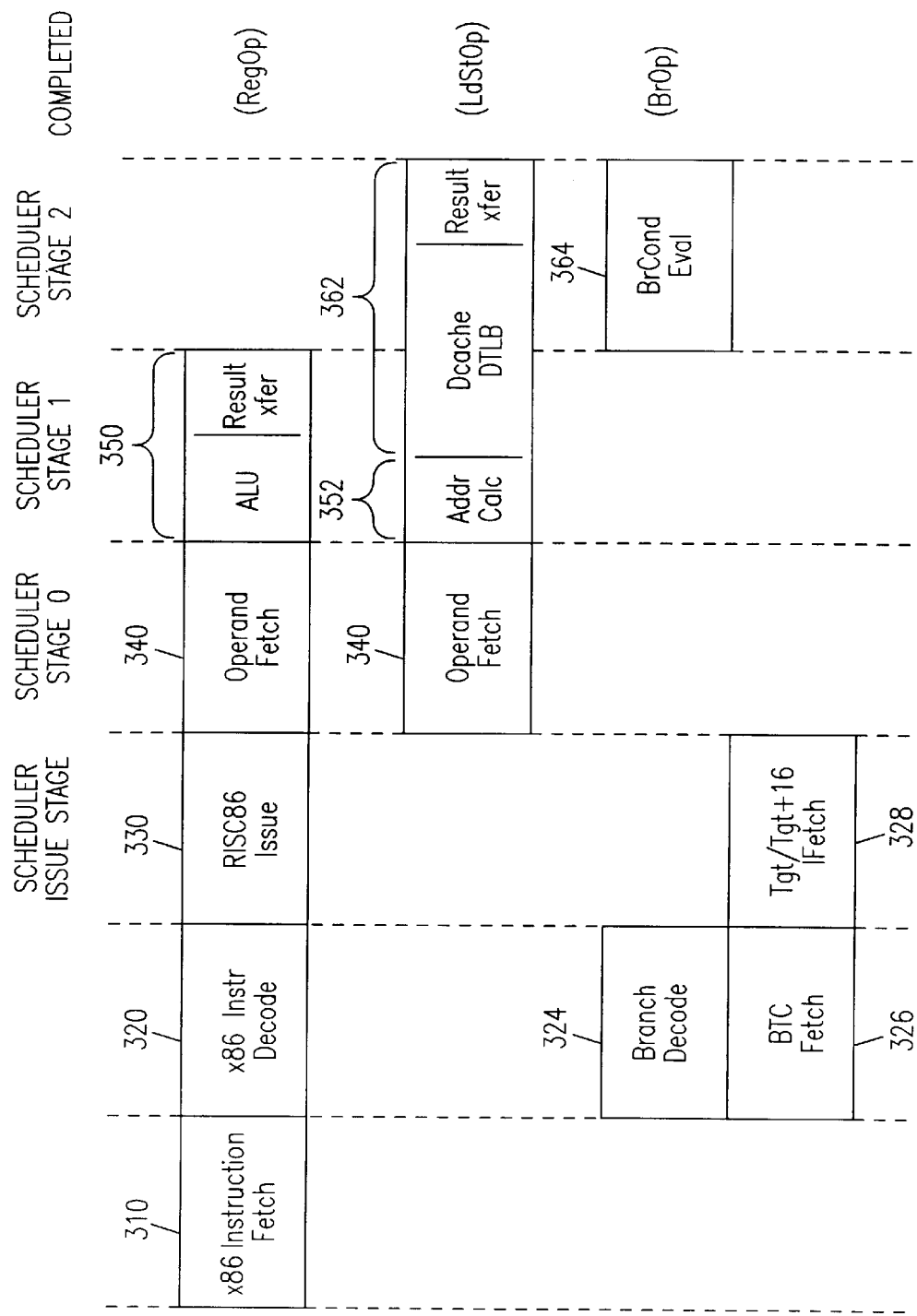
FIG. 3 is a timing diagram which illustrates pipeline timing for an embodiment of the processor shown in FIG. 2.

Referring to FIG. 3, processor 120 employs five and six stage basic pipeline timing. Instruction decoder 220 decodes two instructions in a single clock cycle. During a first stage 310, the instruction fetch control circuit 218 fetches CISC instructions into instruction cache 214. Predecoding of the CISC instructions during stage 310 reduces subsequent decode time. During a second stage 320, instruction decoder 220 decodes instructions from instruction cache 214 and loads an Op quad into scheduler 260. During a third stage 330, scheduler 260 scans the entries and issues operations to corresponding execution units 240 to 252 if an operation for the respective types of execution units is available. Operands for the operations issued during stage 330 are forwarded to the execution units in a fourth stage 340. For a RegOp, the operation generally completes in the next clock cycle which is stage 350, but LdStOps require more time for address calculation 352, data access and transfer of the results 362.

For branch operations, instruction decoder 220 performs a branch prediction 324 during an initial decoding of a branch operation. A branch unit 252 evaluates conditions for the branch at a later stage 364 to determine whether the branch prediction 324 was correct. A two level branch prediction algorithm predicts a direction of conditional branching, and fetching CISC instructions in stage 310 and decoding the CISC instructions in stage 320 continues in the predicted branch direction. Scheduler 260 determines when all condition codes required for branch evaluation are valid, and directs the branch unit 252 to evaluate the branch instruction. If a branch was incorrectly predicted, operations in the scheduler 260 which should not be executed are flushed and decoder 220 begins loading new Op quads from the correct address after the branch. A time penalty is incurred as instructions for the correct branching are fetched. Instruction decoder 220 either reads a previously-stored predicted address or calculates an address using a set of parallel adders. If a previously-predicted address is stored, the predicted address is fetched in stage 326 and instructions located at the predicted address are fetched in stage 328 without a delay for adders. Otherwise, parallel adders calculate the predicted address.

In branch evaluation stage 364, branch unit 252 determines whether the predicted branch direction is correct. If a predicted branch direction is correct, the fetching, decoding, and instruction-executing steps continue without interruption. For an incorrect prediction, scheduler 260 is flushed and instruction decoder 220 begins decoding macroinstructions from the correct program counter subsequent to the branch.

Referring to FIG. 4, a schematic block diagram illustrates an embodiment of an instruction preparation circuit 400 which is connected to the main memory 130. The instruction preparation circuit 400 includes the instruction cache 214 that is connected to the main memory 130 via the predecoder 270. The instruction decoder 220 is connected to receive instruction bytes and predecode bits from three alternative sources, the instruction cache 214, a branch target buffer (BTB) 456 and an instruction buffer 408. The instruction bytes and predecode bits are supplied to the instruction decoder 220 through a plurality of rotators 430, 432 and 434 via instruction registers 450, 452 and 454. The macroinstruction decoder 230 has input connections to the instruction cache 214 and instruction fetch control circuit 218 for receiving instruction bytes and associated predecode information. The macroinstruction decoder 230 buffers fetched instruction bytes in an instruction buffer 408 connected to the instruction fetch control circuit 218. The instruction buffer 408 is a sixteen byte buffer which receives and buffers up to 16 bytes or four aligned words from the instruction cache 214, loading as much data as allowed by the amount of free space in the instruction buffer 408. The instruction buffer 408 holds the next instruction bytes to be decoded and continuously reloads with new instruction bytes as old ones are processed by the macroinstruction decoder 230. Instructions in both the instruction cache 214 and the instruction buffer 408 are held in "extended" bytes, containing both memory bits (8) and predecode bits (5), and are held in the same alignment. The predecode bits assist the macroinstruction decoder 230 to perform multiple instruction decodes within a single clock cycle.

Instruction bytes addressed using a decode program counter (PC) 420, 422 or 424, are transferred from the instruction buffer 408 to the macroinstruction decoder 230. The instruction buffer 408 is accessed on a byte basis by decoders in the macroinstruction decoder 230. However on each decode cycle, the instruction buffer 408 is managed on a word basis for tracking which of the bytes in the instruction buffer 408 are valid and which are to be reloaded with new bytes from the instruction cache 214. The designation of whether an instruction byte is valid is maintained as the instruction byte is decoded. For an invalid instruction byte, decoder invalidation logic (not shown), which is connected to the macroinstruction decoder 230, sets a "byte invalid" signal. Control of updating of the current fetch PC 426 is synchronized closely with the validity of instruction bytes in the instruction buffer 408 and the consumption of the instruction bytes by the instruction decoder 220.

The macroinstruction decoder 230 receives up to sixteen bytes or four aligned words of instruction bytes fetched from the instruction fetch control circuit 218 at the end of a fetch cycle. Instruction bytes from the instruction cache 214 are loaded into a 16-byte instruction buffer 408. The instruction buffer 408 buffers instruction bytes, plus predecode information associated with each of the instruction bytes, as the instruction bytes are fetched and/or decoded. The instruction buffer 408 receives as many instruction bytes as can be accommodated by the instruction buffer 408 free space, holds the next instruction bytes to be decoded and continually reloads with new instruction bytes as previous instruction bytes are transferred to individual decoders within the macroinstruction decoder 230. The instruction predecoder 270 adds predecode information bits to the instruction bytes as the instruction bytes are transferred to the instruction cache 214. Therefore, the instruction bytes stored and transferred by the instruction cache 214 are called extended bytes. Each extended byte includes eight memory bits plus five predecode bits. The five predecode bits include three bits that encode instruction length, one D-bit that designates whether the instruction length is D-bit dependent, and a HasModRM bit that indicates whether an instruction code includes a modrm field. The thirteen bits are stored in the instruction buffer 408 and passed on to the macroinstruction decoder 230 decoders. The instruction buffer 408 expands each set of five predecode bits into six predecode bits. Predecode bits enable the decoders to quickly perform multiple instruction decodes within one clock cycle.

The instruction buffer 408 receives instruction bytes from the instruction cache 214 in the memory-aligned word basis of instruction cache 214 storage so that instructions are loaded and replaced with word granularity. Thus, the instruction buffer 408 byte location 0 always holds bytes that are addressed in memory at an address of 0 (mod 16).

Instruction bytes are transferred from the instruction buffer 408 to the macroinstruction decoder 230 with byte granularity. During each decode cycle, the sixteen extended instruction bytes within the instruction buffer 408, including associated implicit word valid bits, are transferred to the plurality of decoders within the macroinstruction decoder 230. This method of transferring instruction bytes from the instruction cache 214 to the macroinstruction decoder 230 via the instruction buffer 408 is repeated with each decode cycle as long as instructions are sequentially decoded. When a control transfer occurs, for example due to a taken branch operation, the instruction buffer 408 is flushed and the method is restarted.

The current decode PC has an arbitrary byte alignment in that the instruction buffer 408 has a capacity of sixteen bytes but is managed on a four-byte word basis in which all four bytes of a word are consumed before removal and replacement or the word with four new bytes in the instruction buffer 408. An instruction has a length of one to eleven bytes and multiple bytes are decoded so that the alignment of an instruction in the instruction buffer 408 is arbitrary. As instruction bytes are transferred from the instruction buffer 408 to the macroinstruction decoder 230, the instruction buffer 408 is reloaded from the instruction cache 214.

Instruction bytes are stored in the instruction buffer 408 with memory alignment rather than a sequential byte alignment that is suitable for application of consecutive instruction bytes to the macroinstruction decoder 230. Therefore, a set of byte rotators 430, 432 and 434 are interposed between the instruction buffer 408 and each of the decoders of the macroinstruction decoder 230. Five instruction decoders, including three short decoders SDec0 410, SDec1 412 or SDec2 414, long decoder 416 and vectoring decoder 418, share the byte rotators 430, 432 and 434. In particular, the short decoder SDec0 410 and the combined long and vectoring decoder 418 share byte rotator 430. Short decoder SDec1 412 is associated with byte rotator 432 and short decoder SDec2 414 is associated with byte rotator 434.

A plurality of pipeline registers, specifically instruction registers 450, 452 and 454, are interposed between the byte rotators 430, 432 and 434 and the instruction decoder 220 to temporarily hold the instruction bytes, predecode bits and other information, thereby shortening the decode timing cycle. The other information held in the instruction registers 450, 452 and 454 includes various information for assisting instruction decoding, including prefix (e.g. 0F) status, immediate size (8-bit or 32-bit), displacement and long decodable length designations.

Although a circuit is shown utilizing three rotators and three short decoders, in other embodiments, different numbers of circuit elements may be employed. For example, one circuit includes two rotators and two short decoders.

Instructions are stored in memory alignment, not instruction alignment, in the instruction cache 214, the branch target buffer (BTB) 456 and the instruction buffer 408 so that the location of the first instruction byte is not known. The byte rotators 430, 432 and 434 find the first byte of an instruction.

The macroinstruction decoder 230 also performs various instruction decode and exception decode operations, including validation of decode operations and selection between different types of decode operations. Functions performed during decode operations include prefix byte handling, support for vectoring to the emulation code ROM 232 for emulation of instructions, and for branch predict logic 234 operations, branch unit interfacing and return address prediction. Based on the instruction bytes and associated information, the macroinstruction decoder 230 generates operation information in groups of four operations corresponding to Op quads. The macroinstruction decoder 230 also generates instruction vectoring control information and emulation code control information. The macroinstruction decoder 230 also has output connections to the scheduler 260 and to the emulation ROM 232 for outputting the Op quad information, instruction vectoring control information and emulation code control information. The macroinstruction decoder 230 does not decode instructions when the scheduler 260 is unable to accept Op quads or is accepting Op quads from emulation code ROM 232.

The macroinstruction decoder 230 has five distinct and separate decoders, including three "short" decoders SDec0 410, SDec1 412 and SDec2 414 that function in combination to decode up to three "short" decode operations of instructions that are defined within a subset of simple instructions of the x86 instruction set. Generally, a simple instruction is an instruction that translates to fewer than three operations. The short decoders SDec0 410, SDec1 412 and SDec2 414 each typically generate one or two operations, although zero operations are generated in certain cases such as prefix decodes. Accordingly for three short decode operations, from two to six operations are generated in one decode cycle. The two to six operations from the three short decoders are subsequently packed together by operation packing logic 438 into an Op quad since a maximum of four of the six operations are valid. Specifically, the three short decoders SDec0 410, SDec1 412 and SDec2 414 each attempt to decode two operations, potentially generating six operations. Only four operations may be produced at one time so that if more than four operations are produced, the operations from the short decoder SDec2 414 are invalidated. The five decoders also include a single "long" decoder 416 and a single "vectoring" decoder 418. The long decoder 416 decodes instructions or forms of instructions having a more complex address mode form so that more than two operations are generated and short decode handling is not available. The vectoring decoder 418 handles instructions that cannot be handled by operation of the short decoders SDec0 410, SDec1 412 and SDec2 414 or by the long decoder 416. The vectoring decoder 418 does not actually decode an instruction, but rather vectors to a location of emulation ROM 232 for emulation of the instruction. Various exception conditions that are detected by the macroinstruction decoder 230 are also handled as a special form of vectoring decode operation. When activated, the long decoder 416 and the vectoring decoder 418 each generates a full Op quad. An Op quad generated by short decoders SDec0 410, SDec1 412 and SDec2 414 has the same format as an Op quad generated by the long and vectoring decoders 416 and 418. The short decoder and long decoder Op quads do not include an OpSeq field. The macroinstruction decoder 230 selects either the Op quad generated by the short decoders 410, 412 and 414 or the Op quad generated by the long decoder 416 or vectoring decoder 418 as an Op quad result of the macroinstruction decoder 230 are each decode cycle. Short decoder operation, long decoder operation and vectoring decoder operation function in parallel and independently of one another, although the results of only one decoder are used at one time.

Each of the short decoders 410, 412 and 414 decodes up to seven instruction bytes, assuming the first byte to be an operation code (opcode) byte and the instruction to be a short decode instruction. Two operations (Ops) are generated with corresponding valid bits. Appropriate values for effective address size, effective data size, the current x86-standard B-bit, and any override operand segment register are supplied for the generation of operations dependent on these parameters. The logical address of the next "sequential" instruction to be decoded is supplied for use in generating the operations for a CALL instruction. Note that the word sequential is placed in quotation marks to indicate that, although the sequential address generally points to an instruction which immediately precedes the present instruction, the "sequential" address may be set to any addressed location. The current branch prediction is supplied for use in generating the operations for conditional transfer control instructions. A short decode generates control signals including indications of a transfer control instruction (for example, Jcc, LOOP, JMP, CALL), an unconditional transfer control instruction (for example, JMP, CALL), a CALL instruction, a prefix byte, a cc-dependent RegOp, and a designation of whether the instruction length is address or data size dependent. Typically one or both operations are valid, but prefix byte and JMP decodes do not generate a valid op. Invalid operations appear as valid NOOP operations to pad an Op quad.

The first short decoder 410 generates operations based on more than decoding of the instruction bytes. The first short decoder 410 also determines the presence of any prefix bytes decoded during preceding decode cycles. Various prefix bytes include OF, address size override, operand size override, six segment override bytes, REP/REPE, REPNE and LOCK bytes. Each prefix byte affects a subsequent instruction decode in a defined way. A count of prefix bytes and a count of consecutive prefix bytes are accumulated during decoding and furnished to the first short decoder SDec0 410 and the long decoder 416. The consecutive prefix byte count is used to check whether an instruction being decoded is too long. Prefix byte count information is also used to control subsequent decode cycles, including checking for certain types of instruction-specific exception conditions. Prefix counts are reset or initialized at the end of each successful non-prefix decode cycle in preparation for decoding the prefix and opcode bytes of a next instruction. Prefix counts are also reinitialized when the macroinstruction decoder 230 decodes branch condition and write instruction pointer (WRIP) operations.

Prefix bytes are processed by the first short decoder 410 in the manner of one-byte short decode instructions. At most, one prefix byte is decoded in a decode cycle, a condition that is enforced through invalidation of all short decodes following the decode of a prefix byte. Effective address size, data size, operand segment register values, and the current B-bit, are supplied to the first short decoder 410 but can decode along with preceding opcodes.

The address size prefix affects a decode of a subsequent instruction both for decoding of instructions for which the generated operation depends on effective address size and for decoding of the address mode and instruction length of modr/m instructions. The default address size is specified by a currently-specified D-bit, which is effectively toggled by the occurrence of one or more address size prefixes.

The operand size prefix also affects the decode of a subsequent instruction both for decoding of instructions for which the generated operation depends on effective data size and for decoding of the instruction length. The default operand size is specified by a currently-specified x86-standard D-bit, which is effectively toggled by the occurrence of one or more operand size prefixes.

The segment override prefixes affect the decode of a subsequent instruction only in a case when the generation of a load-store operation (LdStOps) is dependent on the effective operand segment of the instruction. The default segment is DS or SS, depending on the associated general address mode, and is replaced by the segment specified by the last segment override prefix.

The REP/REPE and REPNE prefixes do not affect the decode of a subsequent instruction. If the instruction is decoded by the macroinstruction decoder 230, rather than the emulation code ROM 232, then any preceding REP prefixes are ignored. However, if the instruction is vectored, then the generation of the vector address is modified in some cases. Specifically, if a string instruction or particular neighboring opcode is vectored, then an indication of the occurrence of one or more of the REP prefixes and designation of the last REP prefix encountered are included in the vector address. For all other instructions the vector address is not modified and the REP prefix is ignored.

A LOCK prefix inhibits all short and long decoding except the decoding of prefix bytes, forcing the subsequent instruction to be vectored. When the vector decode cycle of this subsequent instruction occurs, so long as the subsequent instruction is not a prefix, the opcode byte is checked to ensure that the instruction is within a "lockable" subset of the instructions. If the instruction is not a lockable instruction, an exception condition is recognized and the vector address generated by the vectoring decoder 418 is replaced by an exception entry point address.

Instructions decoded by the second and third short decoders 412 and 414 do not have prefix bytes so that decoders 412 and 414 assume fixed default values for address size, data size, and operand segment register values.

Typically, the three short decoders generate four or fewer operations because three consecutive short decodes are not always performed and instructions often short decode into only a single operation. However, for the rare occurrence when more than four valid operations are generated, operation packing logic 438 inhibits or invalidates the third short decoder 414 so that only two instructions are successfully decoded and at most four operations are generated for packing into an Op quad.

When the first short decoder 410 is unsuccessful, the action of the second and third short decoders 412 and 414 are invalidated. When the second short decoder 412 is unsuccessful, the action of the third short decoder 414 is invalidated. When even the first short decode is invalid, the decode cycle becomes a long or vectoring decode cycle. In general, the macroinstruction decoder 230 attempts one or more short decodes and, if such short decodes are unsuccessful, attempts one long decode. If the long decode is unsuccessful, the macroinstruction decoder 230 performs a vectoring decode. Multiple conditions cause the short decoders 410, 412 and 414 to be invalidated. Most generally, short decodes are invalidated when the instruction operation code (opcode) or the designated address mode of a modr/m instruction does not fall within a defined short decode or "simple" subset of instructions. This condition typically restricts short decode instructions to those operations that generate two or fewer operations. Short decodes are also invalidated when not all of the bytes in the instruction buffer 408 for a decoded instruction are valid. Also, "cc-dependent" operations, operations that are dependent on status flags, are only generated by the first short decoder 410 to ensure that these operations are not preceded by and ".cc" RegOps. A short decode is invalidated for a second of two consecutive short decodes when the immediately preceding short decode was a decode of a transfer control instruction, regardless of the direction taken. A short decode is invalidated for a second of two consecutive short decodes when the first short decode was a decode of a prefix byte. In general, a prefix code or a transfer control code inhibits further decodes in a cycle.

Furthermore, no more than sixteen instruction bytes are consumed by the macroinstruction decoder 230 since the instruction buffer 408 only holds sixteen bytes at one time. Also, at most four operations can be packed into an Op quad. These constraints only affect the third short decoder 414 since the length of each short decoded instruction is at most seven bytes and operations in excess of four only arise in the third short decoder 414.

In a related constraint, if the current D-bit value specifies a 16-bit address and data size default, then an instruction having a length that is address and/or data dependent can only be handled by the first short decoder 410 since the predecode information is probably incorrect. Also, when multiple instruction decoding is disabled, only the first short decoder 410 is allowed to successfully decode instructions and prefix bytes.

Validation tests are controlled by short decoder validation logic (not shown) in the macroinstruction decoder 230 and are independent of the operation of short decoders 410, 412 and 414. However, each of the short decoders 410, 412 and 414 does set zero, one or two valid bits depending on the number of operations decoded. These valid bits, a total of six for the three short decoders 410, 412 and 414, are used by the operation packing logic 438 to determine which operations to pack into an Op quad and to force invalid operations to appear as NOOP (no operation) operations. The operation packing logic 438 operates without short decoder validation information since valid short decodes and associated operations are preceded only by other valid short decodes and associated operations.

The short decoders 410, 412 and 414 also generate a plurality of signals representing various special opcode or modr/m address mode decodes. These signals indicate whether a certain form of instruction is currently being decoded by the instruction decoder 220. These signals are used by short decode validation logic to handle short decode validation situations.

The instruction bytes, which are stored unaligned in the instruction buffer 408, are aligned by byte rotators 430, 432 and 434 as the instruction bytes are transferred to the decoders 410–418. The first short decoder SDec0 410, the long decoder 416 and the vectoring decoder 418 share a first byte rotator 430. The second and third short decoders SDec1 412 and SDec2 414 use respective second and third byte rotators 432 and 434. During each decode cycle, the three short decoders SDec0 410, SDec1 412 and SDec2 414 attempt to decode what are, most efficiently, three short decode operations using three independently-operating and parallel byte rotators 430, 432 and 434. Although the multiplexing by the byte rotators 430, 432 and 434 of appropriate bytes in the instruction buffer 408 to each respective decoder SDec0 410, SDec1 412 and SDec2 414 is conceptually dependent on the preceding instruction decode operation, instruction length lookahead logic 436 uses predecode bits to enable the decoders to operate substantially in parallel.

The long and vectoring decoders 416 and 418, in combination, perform two parallel decodes of eleven instruction bytes, taking the first byte to be an opcode byte and generating either a long instruction decode Op quad or a vectoring decode Op quad. Information analyzed by the long and vectoring decoders 416 and 418 includes effective address size, effective data size, the current B-bit and DF-bit, any override operand segment register, and logical addresses of the next "sequential" and target instructions to be decoded. The long and vectoring decoders 416 and 418 generate decode signals including an instruction length excluding preceding prefix bits, a designation of whether the instruction is within the long decode subset of instructions, a RET instruction, and an effective operand segment register, based on a default implied by the modr/m address mode plus any segment override.

During a decode cycle in which none of the short decoders SDec0 410, SDec1 412 and SDec2 414 successfully decodes a short instruction, the macroinstruction decoder 230 attempts to perform a long decode using the long decoder 416. If a long decode cannot be performed, a vectoring decode is performed. In some embodiments, the long and vectoring decoders 416 and 418 are conceptually separate and independent decoders, just as the long and vectoring decoders 416 and 418 are separate and independent of the short decoders 410, 412 and 414. Physically, however, the long and vectoring decoders 416 and 418 share much logic and generate similar Op quad outputs. Instructions decoded by the long decoder 416 are generally included within the short decode subset of instructions except for an address mode constraint such as that the instruction cannot be decoded by a short decoder because the instruction length is greater than seven bytes or because the address has a large displacement that would require generation of a third operation to handle to displacement. The long decoder 416 also decodes certain additional modr/m instructions that are not in the short decode subset but are sufficiently common to warrant hardware decoding. Instruction bytes for usage or decoding by the long decoder 416 are supplied from the instruction buffer 408 by the first byte rotator 430, the same instruction multiplexer that supplies instruction bytes to the first short decoder SDec0 410. However, while the first short decoder SDec0 410 receives only seven bytes, the long decoder 416 receives up to eleven consecutive instruction bytes, corresponding to the maximum length of a modr/m instruction excluding prefix bytes. Thus, the first byte rotator 430 is eleven bytes wide although only the first seven bytes are connected to the first short decoder SDec0 410. The long decoder 416 only decodes one instruction at a time so that associated predecode information within the instruction buffer 408 is not used and is typically invalid.

The first byte of the first byte rotator 430 is fully decoded as an opcode byte and, in the case of a modr/m instruction, the second instruction byte and possibly the third are fully decoded as modr/m and sib bytes, respectively. The existence of a 0F prefix is considered in decoding of the opcode byte. The 0F prefix byte inhibits all short decoding since all short decode instructions are non-0F or "one-byte" opcodes. Because all prefix bytes are located within the "one-byte" opcode space, decoding of a 0F prefix forces the next decode cycle to be a two-byte opcode instruction, such as a long or vectoring decode instruction. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). The long decoder 416 always generates four operations and, like the short decoders 410, 412, and 414, presents the operations in the form of an emulation code-like Op quad, excluding an OpSeq field. The long decoder 416 handles only relatively simple modr/m instructions. A long decode Op quad has two possible forms that differ only in whether the third operation is a load operation (LdOp) or a store operation (StOp) and whether the fourth operation is a RegOp or a NOOP. A first long decode Op quad has the form:

| LIMM | t2, <imm32> |
|---|---|
| LIMM | t1, <disp32> |
| LD.b/d | t8L/t8, @(<gam>)OS.a |
| <RegOp> . . . | |

A second long decode Op quad has the form:

| LIMM | t2, <imm32> |
|---|---|
| LIMM | t1, <disp32> |
| ST.b/d | @(<gam>), t2L/t2,OS.a |
| NOOP | |

The @(<gam>) address mode specification represents an address calculation corresponding to that specified by the modr/m and/or sib bytes of the instruction, for example @(AX+BX*4+LD). The <imm32> and <disp32> values are four byte values containing the immediate and displacement instruction bytes when the decoded instruction contains such values.

The long decoder 416, like the first short decoder 410, generates operations taking into account the presence of any prefix bytes decoded by the short decoders during preceding decode cycles. Effective address size, data size, operand segment register values, and the current B-bit are supplied to the long decoder 416 and are used to generate operations. No indirect size or segment register specifiers are included within the final operations generated by the long decoder 416.

Only a few conditions inhibit or invalidate an otherwise successful long decode. One such condition is an instruction operation code (opcode) that is not included in the long decode subset of instructions. A second condition is that not all of the instruction buffer 408 bytes for the decoded instruction are valid.

The vectoring decoder 418 handles instructions that are not decoded by either the short decoders or the long decoder 416. Vectoring decodes are a default case when no short or long decoding is possible and sufficient valid bytes are available. Typically, the instructions handled by the vectoring decoder 418 are not included in the short decode or long decode subsets but also result from other conditions such as decoding being disabled or the detection of an exception condition. During normal operation, only non-short and non-long instructions are vectored. However, all instructions may be vectored. Undefined opcodes are always vectored. Only prefix bytes are always decoded. Prefix bytes are always decoded by the short decoders 410, 412 and 414.

When an exception condition is detected during a decode cycle, a vectoring decode is forced, generally overriding any other form of decode without regard for instruction byte validity of the decoded instruction. When a detected exception condition forces a vectoring decode cycle, the generated Op quad is undefined and the Op quad valid bit for presentation to the scheduler 260 is forced to zero. The Op quad valid bit informs the scheduler 260 that no operations are to be loaded to the scheduler 260. As a result, no Op quad is loaded into the scheduler 260 during an exception vectoring decode cycle.

Few conditions inhibit or invalidate a vectoring decode. One such condition is that not all of the bytes in the instruction buffer 408 are valid.

When an instruction is vectored, control is transferred to an emulation code entry point. An emulation code entry point is either in internal emulation code ROM 232 or in external emulation code RAM 236. The emulation code starting from the entry point address either emulates an instruction or initiates appropriate exception processing.

A vectoring decode cycle is properly considered a macroinstruction decoder 230 decode cycle. In the case of a vectoring decode, the macroinstruction decoder 230 generate the vectoring quad and generate the emulation code address into the emulation code ROM 232. Following the initial vectoring decode cycle, the macroinstruction decoder 230 remains inactive while instructions are generated by the emulation code ROM 232 or emulation code RAM 236 until a return from emulation (ERET) OpSeq is encountered. The return from emulation (ERET) sequencing action transitions back to macroinstruction decoder 230 decoding. During the decode cycles following the initial vectoring decode cycle, the macroinstruction decoder 230 remains inactive, continually attempting to decode the next "sequential" instruction but having decode cycles repeatedly invalidated until after the ERET is encountered, thus waiting by default to decode the next "sequential" instruction.

Instruction bytes for usage or decoding by the vectoring decoder 418 are supplied from the instruction buffer 408 by the first byte rotator 430, the same instruction multiplexer that supplies instruction bytes to the first short decoder SDec0 410 and to the long decoder 416. The vectoring decoder 418 receives up to eleven consecutive instruction bytes, corresponding to the maximum length of a modr/m instruction excluding prefix bytes. Thus, the full eleven byte width of the first byte rotator 430 is distributed to both the long decoder 416 and the vectoring decoder 418. The predecode information within the instruction buffer 408 is not used by the vectoring decoder 418.

As in the case of the long decoder 416, the first byte of the first byte rotator 430 is fully decoded as an opcode byte and, in the case of a modr/m instruction, the second instruction byte and possibly the third are fully decoded as modr/m and sib bytes, respectively. The vectoring decoder 418 generates operations taking into account the presence of any prefix bytes decoded by the short decoders during preceding decode cycles. The existence of a 0F prefix is considered in decoding of the opcode byte. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). If not, a vectoring decode is initiated. Effective address size, data size and operand segment register values are supplied to the vectoring decoder 418 and are used to generate operations. No indirect size or segment register specifiers are included within the final operations generated by the vectoring decoder 418.

During a vectoring decode cycle, the vectoring decoder 418 generates a vectoring Op quad, generates an emulation code entry point or vector address, and initializes an emulation environment. The vectoring Op quad is specified to pass various information to initialize emulation environment scratch registers.

The value of the emulation code entry point or vector address is based on a decode of the first and second instruction bytes, for example the opcode and modr/m bytes, plus other information such as the presence of an 0F prefix, REP prefix and the like. In the case of vectoring caused by an exception condition, the entry point or vector address is based on a simple encoded exception identifier.

The emulation environment is stored for resolving environment dependencies. All of the short decoders 410, 412 and 414 and long decoder 416 directly resolve environmental dependencies, such as dependencies upon effective address and data sizes, as operations are generated so that these operations never contain indirect size or register specifiers. However, emulation code operations do refer to such effective address and data size values for a particular instance of the instruction being emulated. The emulation environment is used to store this additional information relating to the particular instruction that is vectored. This information includes general register numbers, effective address and data sizes, an effective operand segment register number, the prefix byte count, and a record of the existence of a LOCK prefix. The emulation environment also loads a modr/m reg field and a modr/m regm field are loaded into Reg and Regm registers. The emulation environment is initialized at the end of a successful vectoring decode cycle and remains at the initial state for substantially the duration of the emulation of an instruction by emulation code, until an ERET code is encountered.

The vectoring decoder 418 generates four operations of an Op quad in one of four forms. All four forms include three LIMM operations. The four forms differ only in the immediate values of the LIMM operations and in whether the third operation is an LEA operation or a NOOP operation.

A first vectoring decode Op quad has the form:

```
LIMM    t2, <imm32>
LIMM    t1, <disp32>
LEA     t6, @(<gam>),_.a
LIMM    t7,LogSeqDecPC[31..0]    //logical seq. next
                                              //instr. PC
```

A second vectoring decode Op quad has the form:

```
LIMM    t2, <imm32>
LIMM    t1, <disp32>
NOOP
LIMM    t7,LogSeqDecPC[31..0]
```

A third vectoring decode Op quad has the form:

```
LIMM    t2, <+/- 1/2/4>   //equiv to "LDK(D)S t2, +1/+2"
LIMM    t1, <+/- 2/4/8>   //equiv to "LDK(D)S t1, +2/+4"
NOOP
LIMM    t7, LogSeqDecPC[31..0]
```

A fourth vectoring decode Op quad has the form:

```
LIMM    t2, <+2/4>        //equiv to "LDKD t2, +2"
LIMM    t1, <disp32>
LD      t6, @(SP),SS.s
LIMM    t7,LogSeqDecPC[31..0]
                          //predicted RET target adr
                          //from Return Address Stack
```

The first two forms of vectoring Op quads apply for most opcodes. The first form is used for memory-referencing modr/m instructions for which the LEA operation is used to compute and load a general address mode effective operand address into a scratch register. The second form is used for non-modr/m and register-referencing modr/m instructions. For instructions having the second form no address is necessarily computed, although the <imm32> and <disp32> values remain useful insofar as they contain instruction bytes following the opcode byte. The third form of vectoring Op quad is used for all string instructions plus some neighboring non-modr/m instructions. A fourth form of vectoring Op quad supports special vectoring and emulation requirements for near RET instructions.

The macroinstruction decoder 230 has four program counters, including three decode program counters 420, 422 and 424, and one fetch program counter 426. A first decode program counter, called an instruction PC 420, is the logical address of the first byte, including any prefix bytes, of either the current instruction being decoded or, if no instruction is currently decoding, the next instruction to be decoded. If the decode operation is a multiple instruction decode, instruction PC 420 points to the first instruction of the multiple instructions to be decoded. The instruction PC 420 corresponds to the architectural address of an instruction and is used to generate instruction fault program counters for handling of exceptions. The instruction PC 420 is passed down the scheduler 260 with corresponding Op quads and is used by an operation commit unit (OCU) (see 970 shown in FIG. 9) to produce instruction fault program counters to be saved during exception processing. When an Op quad is generated by the macroinstruction decoder 230, the current instruction PC 420 value is tagged to the Op quad and loaded into the Scheduler 260 Op quad entry along with the Op quad. A second decode program counter, called a logical decode PC 422, is the logical address of the next instruction byte to be decoded and addresses either an opcode byte or a prefix byte. A third decode program counter, called a linear decode PC 424, is the linear address of the next instruction byte to be decoded and addresses either an opcode byte or a prefix byte. The logical decode PC 422 and the linear decode PC 424 point to the same instruction byte. The linear decode PC 424 designates the address of the instruction byte currently at the first byte rotator 430.

The various decoders in the macroinstruction decoder 230 function on the basis of decoding or consuming either prefix bytes or whole instructions minus any prefix bytes so that prefixes are generally handled as one-byte instructions. Therefore, the address boundaries between instruction and prefix byte decodes are more important than instruction boundaries alone. Consequently, at the beginning of each decode cycle, the next instruction byte to be decoded is not necessarily the true beginning of an instruction.

At the beginning of a decode cycle the logical decode PC 422 and the linear decode PC 424 contain the logical and linear addresses of the next instruction to be decoded, either an instruction or a prefix byte. The linear decode PC 424 is a primary program counter value that is used during the decoding process to access the instruction buffer 408. The linear decode PC 424 represents the starting point for the decode of a cycle and specifically controls the byte rotator feeding bytes from the instruction buffer 408 to the first short decoder 410 and to the long and vectoring decoders 416 and 418. The linear decode PC 424 also is the reference point for determining the instruction addresses of any further short decode instructions or prefix bytes, thus generating control signals for the byte rotators feeding the second and third short decoders 412 and 414.

The linear decode PC 424 also acts secondarily to check for breakpoint matches during the first decode cycles of new instructions, before prefix bytes are decoded, and to check for code segment overruns by the macroinstruction decoder 230 during successful instruction decode cycles.

The logical decode PC 422 is used for program counter-related transfer control instructions, including CALL instructions. The logical decode PC 422 is supplied to the branch predict unit 234 to be summed with the displacement value of a PC-relative transfer control instruction to calculate a branch target address. The logical decode PC 422 also supports emulation code emulation of instructions. The next sequential logical decode program counter (PC) 422 is available in emulation code from storage in a temporary register by the vectoring Op quad for general usage. For example, the next sequential logical decode PC 422 is used to supply a return address that a CALL instruction pushes on a stack.

A next logical decode PC 428 is set to the next sequential logical decode program counter value and has functional utility beyond that of the logical decode PC 422. The next logical decode PC 428 directly furnishes the return address for CALL instructions decoded by the macroinstruction decoder 230. The next logical decode PC 428 also is passed to emulation code logic during vectoring decode cycles via one of the operations within the vectoring Op quad.

During a decode cycle, the linear decode PC 424 points to the next instruction bytes to be decoded. The four least significant bits of linear decode PC 424 point to the first instruction byte within the instruction buffer 408 and thereby directly indicate the amount of byte rotation necessary to align the first and subsequent instruction bytes in the instruction cache 214. The first byte rotator 430 is an instruction multiplexer, specifically a 16:1 byte multiplexer, for accessing bytes in the instruction buffer 408 that are offset by the linear decode PC 424 amount. The first byte rotator 430 is seven bytes wide for the first short decoder SDec0 410 and eleven bytes wide for the long decoder 416 and the vectoring decoder 418 in combination. Shared logic in the first short decoder SDec0 410, the long decoder 416 and the vectoring decoder 418 generate a first instruction length value Ilen0 for the first instruction. The second and third byte rotators 432 and 434 are seven byte-wide instruction multiplexers, specifically 16:1 byte multiplexers. The second byte rotator 432 accesses bytes in the instruction buffer 408 that are offset by the sum of the linear decode PC 424 amount and the first instruction length ILen0 (modulo 16). Logic in the second short decoder SDec0 412 generate a second instruction length value Ilen1 for the second instruction. The third byte rotator 434 accesses bytes in the instruction buffer 408 that are offset by the sum of the linear decode PC 424 amount and the first and second instruction lengths Ilen0 and Ilen1. The byte rotators 430, 432 and 434 multiplex instruction bytes but not predecode bits. The byte rotators 430, 432 and 434 are controlled using predecode information in which the predecode bits associated with the first opcode byte or the first byte of the first instruction directly controls the second rotator 432. The first byte of the second instruction directly controls the third rotator 434. Each predecode code implies an instruction length but what is applied to the next rotator is a pointer. The pointer is derived by taking the four least significant bits of the program counter at the present instruction plus the length to attain the program counter to the next instruction.

All program counters 420, 422, 424 and 428 in the macroinstruction decoder 230 are initialized during instruction and exception processing. A plurality of signal sources activate this initialization. First, the branch predict logic 234 supplies a target branch address when a PC-relative transfer control instruction is decoded and predicted taken. Second, a return address stack (not shown) supplies a predicted return target address when a near RET instruction is decoded. Third, the scheduler 260 generates a correct and alternate branch address when the macroinstruction decoder 230, along with the remaining circuits in the processor 120, is restarted by the scheduler 260 due to a mispredicted branch condition (BRCOND) operation. Fourth, register unit 244, the primary RegOp execution unit, supplies a new decode address when a WRIP RegOp is executed. The WRIP RegOp execution allows emulation code to explicitly redirect instruction decoding. In all four cases, a logical address is supplied and utilized to simultaneously reinitialize the three decode program counters 420, 422 and 424. For the linear decode PC 424, a linear address value is supplied by adding the supplied logical address to the current code segment base address to produce the corresponding linear address for loading into linear decode PC 424. The logical address is loaded into the current instruction PC 420 and the logical decode PC 422. For each decode cycle until a next reinitialization, the macroinstruction decoder 230 sequentially and synchronously updates the current instruction PC 420, the logical decode PC 422 and the linear decode PC 424 as instruction bytes are successfully decoded and consumed by the individual decoders of macroinstruction decoder 230.

Generation of the instruction lengths Ilen0 and Ilen1 occurs serially. To hasten this serial process by emulating a parallel operation, instruction length lookahead logic 436 quickly determines the instruction lengths Ilen0 and Ilen1 using four predecode bits specifying the length of each instruction byte in the instruction buffer 408. The predecode bits associated with the opcode byte of the first instruction byte in the instruction buffer 408, the first instruction byte being multiplexed to the first short decoder SDec0 410, directly specifies a byte index of the opcode byte of the second instruction byte in the instruction buffer 408. The predecode bits associated with the opcode byte of the second instruction byte in the instruction buffer 408, the second instruction byte being multiplexed to the second short decoder SDec1 412, directly specifies a byte index of the opcode byte of the third instruction byte in the instruction buffer 408. The instruction length lookahead logic 436 includes two four-bit-wide 16:1 multiplexers for generating the byte indices of the opcode bytes of the second and third instruction bytes in the instruction buffer 408.

The instruction lookahead logic 436 also includes logic for determining validity of the sets of predecode bits. Predecode bits are valid when the associated instruction byte is the start of a valid short decode instruction. Specifically, the instruction lookahead logic 436 determines whether predecode bits for a given byte in the instruction buffer 408 point to the same byte, implying a zero length for an instruction starting at that byte. If so, that byte is not the start of a short decode instruction and no further short decoding is possible. Otherwise, a short decode operation is possible and predecode bits point to the beginning of the next instruction.

The predecoder 270 connected between the main memory 130 and the instruction cache 214 has eight logic units, each of which examines its associated instruction byte plus, in some cases, the following one or two instruction bytes. The first instruction byte is decoded as an opcode byte and the second and third instruction bytes, if the opcode byte is a modr/m opcode, are decoded as modr/m and sib bytes. Based on these three bytes, the length of an instruction and whether the instruction is classified as a "short" instruction are determined. The length of the instruction is added to a four-bit fixed value corresponding to the position of the logic unit with respect to the sixteen logic units to determine the byte index used by the instruction length lookahead logic 436. This byte index is set as the value of the predecode bits if the instruction falls within the criteria of a short instruction. For instruction bytes not meeting the short instruction criteria, the predecode bits are set to the four-bit fixed value corresponding to the position of the logic unit with respect to the sixteen logic units without increment to designate an instruction length of zero. An implied instruction length of zero is indicative that the instruction is not a short instruction. The predecode bits are truncated from four bits to three since short decode instructions are never longer than seven bytes and the most significant bit is easily reconstructed from the three predecode bits and the associated fixed byte address. The expansion from three to four predecode bits is performed by predecode expansion logic 440 having sixteen logic units corresponding to the sixteen instruction bytes of the instruction cache 214. The sixteen logic units of predecode expansion logic 440 operate independently and simultaneously on predecode bits as the instruction bytes are fetched from the instruction cache 214 to the instruction buffer 408.

The final two of the thirty-two instruction bytes that are predecoded and loaded to the instruction cache 214 have only one or two bytes for examination by the predecoder 270. For modr/m opcodes the full instruction length cannot be determined. Thus logic units for bytes 14 and 15 in the predecoder 270 are modified from logic units for bytes 0 through 13. For instruction byte 15, logic unit 15 of the predecoder 270 forces an instruction length of zero for all modr/m opcodes and for non-short decode instructions. For instruction byte 14, an effective instruction length of zero is forced for modr/m opcodes with an address mode requiring examination of a sib byte to reliably determine instruction length, as well as for non-short instructions.

During each decode cycle, the macroinstruction decoder 230 checks for several exception conditions, including an instruction breakpoint, a pending nonmaskable interrupt (NMI), a pending interrupt (INTR), a code segment overrun, an instruction fetch page fault, an instruction length greater than sixteen bytes, a nonlockable instruction with a LOCK prefix, a floating point not available condition, and a pending floating point error condition. Some conditions are evaluated only during a successful decode cycle, other conditions are evaluated irrespective of any decoding actions during the cycle. When an active exception condition is detected, all instruction decode cycles including short, long and vectoring decode cycles, are inhibited and an "exception" vectoring decode is forced in the decode cycle following exception detection. The recognition of an exception condition is only overridden or inhibited by inactivity of the macroinstruction decoder 230, for example, when emulation code Op quads are accepted by the scheduler 260, rather than short and long or vector decoder Op quads. In effect, recognition and handling of any exception conditions are delayed until an ERET Op seq returns control to the macroinstruction decoder 230.

During the decode cycle that forces exception vectoring, a special emulation code vector address is generated in place of a normal instruction vector address. The vectoring Op quad that is generated by the long and vectoring decoders 416 and 418 is undefined. The exception vector address is a fixed value except for low-order bits for identifying the particular exception condition that is recognized and handled. When multiple exception conditions are detected simultaneously, the exceptions are ordered in a priority order and the highest priority exception is recognized.

The instruction breakpoint exception, the highest priority exception condition, is recognized when the linear decode PC 424 points to the first byte of an instruction including prefixes, the linear decode PC 424 matches a breakpoint address that is enabled as an instruction breakpoint, and none of the instruction breakpoint mask flags are clear. One mask flag (RF) specifically masks recognition of instruction breakpoints. Another mask flag (BNTF) temporarily masks NMI requests and instruction breakpoints.

The pending NMI exception, the penultimate priority exception, is recognized when an NMI request is pending and none of the NMI mask flags are clear. One mask (NF) specifically masks nonmaskable interrupts. Another mask flag (BNTF) temporarily masks NMI requests and instruction breakpoints.

The pending INTR exception, the next exception in priority following the pending NMI exception, is recognized when an INTR request is pending and the interrupt flag (IF) and temporary interrupt flag (ITF) are clear.

The code segment overrun exception, the next exception in priority following the pending INTR exception, is recognized when the macroinstruction decoder 230 attempts to successfully decode a set of instructions beyond a current code segment limit.

The instruction fetch page fault exception, having a priority immediately lower than the code segment overrun exception, is recognized when the macroinstruction decoder 230 requires additional valid instruction bytes from the instruction buffer 408 before decoding of another instruction or prefix byte is possible and the instruction translation lookaside buffer (ITB) signals that a page fault has occurred on the current instruction fetch. A faulting condition of the instruction fetch control circuit 218 is repeatedly retried so that the ITB continually reports a page fault until the page fault is recognized by the macroinstruction decoder 230 and subsequent exception handling processing stops and redirects instruction fetching to a new address. The fault indication from the ITB has the same timing as instructions loaded from the instruction cache 214 and, therefore, is registered in the subsequent decode cycle. The ITB does not necessarily signal a fault on consecutive instruction fetch attempts so that the macroinstruction decoder 230 holds the fault indication until fetching is redirected to a new instruction address. Upon recognition of a page fault, additional fault information is loaded into a special register field.

The instruction length greater than sixteen bytes exception, which has a priority just below the instruction fetch page fault exception, is recognized when the macroinstruction decoder 230 attempts to successfully decode an instruction having a total length including prefix bytes of greater than fifteen bytes. The instruction length greater than sixteen bytes exception is detected by counting the number of prefix bytes before an actual instruction is decoded and computing the length of the rest of the instruction when it is decoded. If the sum of the prefix bytes and the remaining instruction length is greater than sixteen bytes, an error is recognized.

The nonlockable instruction with a LOCK prefix exception, having a priority below the instruction length exception, is recognized when the macroinstruction decoder 230 attempts to successfully decode an instruction having a LOCK prefix, in which the instruction is not included in the lockable instruction subset. The nonlockable LOCK instruction exception is detected based on decode of the opcode byte and existence of a 0F prefix. The nonlockable LOCK instruction exception only occurs during vectoring decode cycles since the LOCK prefix inhibits short and long decodes.

The floating point not available exception, having a next to lowest priority, is recognized when the macroinstruction decoder 230 attempts to successfully decode a WAIT instruction or an ESC instruction that is ont a processor control ESC, and the reporting of a floating point error is pending. Macroinstruction decoder 230 detects the floating point not available exception based on decoding of an opcode and modr/m byte, in addition to the existence of a 0F prefix.

During each decode cycle, the macroinstruction decoder 230 attempts to perform some form of instruction decode of one or more instructions. Typically, the macroinstruction decoder 230 succeeds in performing either one or multiple short decodes, one long decode or an instruction vectoring decode. Occasionally no decode is successful for three types of conditions including detection of an active exception condition, lack of a sufficient number of valid bytes in the instruction buffer 408, or the macroinstruction decoder 230 does not advance due to an external reason.

When an active exception condition is detected all forms of instruction decode are inhibited and, during the second decode cycle after detection of the exception condition, an exception vectoring decode cycle is forced, producing an invalid Op quad.

When an insufficient number of valid bytes are available in the instruction buffer 408 either no valid bytes are held in the instruction buffer 408 or at least the first opcode is valid and one of the decoders decodes the instruction but the decoded instruction length requires further valid bytes in the instruction buffer 408, not all of which are currently available.

When an external reason prevents macroinstruction decoder 230 advancement either the scheduler 260 is full and unable to accept an additional Op quad during a decode cycle or the scheduler 260 is currently accepting emulation code Op quads so that the macroinstruction decoder 230 is inactive awaiting a return to decoding.

In the latter two cases, the decode state of the macroinstruction decoder 230 is inhibited from advancing and the macroinstruction decoder 230 simply retries the same decodes in the next decode cycle. Control of macroinstruction decoder 230 inhibition is based on the generation of a set of decode valid signals with a signal corresponding to each of the decoders. For each decoder there are multiple reasons which are combined into decoder valid signals to determine whether that decoder is able to successfully perform a decode. The decoder valid signals for all of the decoders are then monitored, in combination, to determine the type of decode cycle to perform. The type of decode cycle is indicative of the particular decoder to perform the decode. The external considerations are also appraised to determine whether the selected decode cycle type is to succeed. Signals indicative of the selected type of decode cycle select between various signals internal to the macroinstruction decoder 230 generated by the different decoders, such as alternative next decode PC values, and also are applied to control an Op quad multiplexer 444 which selects the input Op quad applied to the scheduler 260 from the Op quads generated by the short decoders, the long decoder 416 and the vectoring decoder 418.

In the case of vectoring decode cycles, the macroinstruction decoder 230 also generates signals that initiate vectoring to an entry point in either internal emulation code ROM 232 or external emulation code RAM 236. The macroinstruction decoder 230 then monitors the active duration of emulation code fetching and loading into the scheduler 260.

The instruction decoder 220 includes the branch unit (not shown) for performing branch prediction so that operations are speculatively executed. Performance of an out-of-order processor is enhanced when branches are handled quickly and accurately so that pipeline-draining mispredictions are avoided. The processor 120 employs a two-level branch prediction algorithm that is disclosed in detail in U.S. Pat. No. 5,454,117, entitled CONFIGURABLE BRANCH PREDICTION FOR A PROCESSOR PERFORMING SPECULATIVE EXECUTION (Puziol et al., issued Sep. 26, 1995), U.S. Pat. No. 5,327,547, entitled TWO-LEVEL BRANCH PREDICTION CACHE (Stiles et al., issued Jul. 5, 1994), U.S. Pat. No. 5,163,140, entitled TWO-LEVEL BRANCH PREDICTION CACHE (Stiles et al., issued Nov. 10, 1992), and U.S. Pat. No. 5, 093,778, entitled INTEGRATED SINGLE STRUCTURE BRANCH PREDICTION CACHE (Favor et al., issued Mar. 3, 1993). The processor 120 further utilizes an 8,192-entry branch history table (BHT) (not shown) which is indexed by combining four program counter bits with nine bits of global branch history. Each BHT entry contains two history bits. The BHT is a dual-port RAM allowing both a read/lookup access and a write/update access. BHT lookups and updates do not conflict since they take place in opposite half phases of a clock cycle. The large number of entries of the BHT is supplied in a reasonable integrated circuit area because the BHT is only predicting conditional branch directions so that entries are not tagged and predicted branch target addresses are not stored, except for a 16-entry return address stack (not shown). Accordingly, an access to the BHT is similar to a direct mapping into a cache-like structure in which the BHT is indexed to access an entry in the BHT and the accessed entry is presumed to be a branch instruction. For branches other than returns, the target address is calculated during the decode cycle. The target address is calculated with sufficient speed using a plurality of parallel adders (not shown) that calculate all possible target addresses before the location of a branch instruction is known. By the end of the decode cycle, the branch predict logic 234 determines which, if any, target address result is valid.

If a branch is predicted taken, the target address is immediately known and the target instructions are fetched on the following cycle, causing a one-cycle taken-branch penalty. The taken-branch penalty is avoided using a branch target buffer (BTB) 456. The BTB 456 includes sixteen entries, each entry having sixteen instruction bytes with associated predecode bits. The BTB 456 is indexed by the branch address and is accessed during the decode cycle. Instructions from the BTB 456 are sent to the instruction decoder 220, eliminating the taken-branch penalty, for a cache hit of the BTB 456 when the BHT predicts a taken branch.

During each decode cycle, the linear decode PC 424 is used in a direct-mapped manner to address the BTB 456. If a hit, which is realized before the end of the decode cycle, occurs with a BTB entry, a PC-relative conditional transfer control instruction is decoded by a short decoder and the control transfer is predicted taken, then two actions occur. First, the initial target linear fetch address directed to the instruction cache 214 is changed from the actual target address to a value which points to an instruction byte immediately following the valid target bytes contained in the BTB entry. This modified fetch address is contained in the BTB entry and directly accessed from the BTB entry. Second, the instruction byte and predecode information from the entry is loaded into the instruction buffer 408 at the end of the decode cycle. If a PC-relative conditional transfer control instruction is decoded by a short decoder and the control transfer is predicted taken, but a miss occurs, then a new BTB entry is created with the results of the target instruction fetch. Specifically, simultaneously with the first successful load of target instruction bytes into the instruction buffer 408 from the instruction cache 214, the same information is loaded into a chosen BTB entry, replacing the previous contents. The target fetch and instruction buffer 408 load otherwise proceed normally.

Each entry includes a tag part and a data part. The data part holds sixteen extended instruction bytes including a memory byte and three associated predecode bits. The correspondence of the memory byte is memory-aligned with the corresponding instruction buffer 408 location. The tag part of a BTB entry holds a 30-bit tag including the 32-bit linear decode PC 424 associated with the transfer control instruction having a cached target, less bits [4:1], an entry valid bit and the 30-bit modified initial target linear instruction fetch address. No explicit instruction word valid bits are used since the distance between the true target address and the modified target address directly implies the number and designation of valid instruction words within the BTB 456.

The purpose of the BTB 456 is to capture branch targets within small to medium sized loops for the time period a loop and nested loops are actively executed. In accordance with this purpose, at detection of a slightest possibility of an inconsistency, the entire BTB is invalidated and flushed. The BTB 456 is invalidated and flushed upon a miss of the instruction cache 214, any form of invalidation of instruction cache 214, an ITB miss, or any form of ITB invalidation. Branch targets outside temporal or spatial locality are not effectively cached. Typically, the BTB 456 contains only a small number of entries so that complexity is reduced while the majority of performance benefit of ideal branch target caching is achieved.

PC-relative branch target address calculation logic performs the target address calculation. Branch target address calculation logic is utilized only for PC-relative transfer control instructions that are decoded by a short decoder SDec0 410, SDec1 414 or SDec2 416. Specifically, the branch target address calculation logic is utilized for the short decode branch instructions including Jcc disp8, LOOP disp8, JMP disp8, JMP disp16/32, and CALL disp16/32. Each short decoder SDec0 410, SDec1 412 and SDec2 414 includes logical and linear branch target address calculation logic (not shown). All three sets of logical and linear branch target address calculation logic function in parallel while the short decoders 410, 412 and 414 determine whether any of the operations is a PC-relative short decode branch instruction. The logical and linear branch target address calculation logic sum the logical program counter of the branch, the length of the branch instruction and the sign-extended displacement of the branch instruction and conditionally mask the high-order 16 bits of the sum, depending on calculation sizing, to produce a logical target address. The logical and linear branch target address calculation logic sum the logical target address with the current code segment base address to produce a linear target address. If the branch is taken, either unconditionally or predicted taken, then calculated addresses corresponding to the decoded short decode branch instruction are used to reinitialize the logical decode PC 422 and linear decode PC 424. If the branch is predicted not taken, the logical address is saved with the associated short decode branch instruction (BRCOND Op) in a scheduler 260 Op quad entry. The logical target address is compared to the current code segment limit value to monitor for a limit violation.

If the logical and linear branch target address calculation logic detects a limit violation, whether the branch is predicted taken or predicted not taken, then a special tag bit indicative of the limit violation is set in the scheduler 260 Op quad entry holding the operations generated from the branch instruction. Subsequently, when the operation commit unit (OCU) 970 of the scheduler 260 attempts to commit this Op quad, the Op quad is handled as containing a fault and aborted. The macroinstruction decoder 230 generates signals that initiate vectoring to a fault handler in emulation code ROM 232. The fault handler temporarily inhibits decoding by the short and long decoders and jumps to the fault PC address of the violating instruction associated with the faulted Op quad. Ultimately, the branch instruction is redecoded and vectored to instruction emulation code. The emulation code recognizes the limit violation if the branch is actually taken and appropriately handles the violation.

The processor 120 generally responds to a fault condition by vectoring to a specific fault handler in the emulation code ROM 232. The fault handler includes operations defined within the RISC86 instruction set which perform a routine that determines the source of the fault, an appropriate response to the fault and steps to initiate the appropriate response. As an alternative in appropriate cases, the processor 120 also includes an instruction called a "load alternate fault handler" instruction which initiates a special fault response. The load alternate fault handler instruction passes through the instruction decoder 220 pipeline in the manner of all instructions, but causes any subsequent exception condition to invoke a different vector instruction ROM entry point. The alternate fault handler terminates upon completion of execution of the current macroinstruction. The alternate fault handler is advantageous to allow special fault handling only in the case of a fault and thus to avoid special setup work if the fault occurs.

One example of the advantage of the alternate fault handler arises with respect to a repeated move string instruction (REP MOVs). To perform multiple interactions very quickly, a capability to reorder the sequence of operations is important. The sequence of operations typically includes a load to a first pointer-designated address, a store to a second pointer-designated address and, if both the load and store are successful, an increment of the first and second pointers and a decrement of a counter. For additional efficiency, the pointers are incremented and the counter decremented before completing the store operation. However, if a fault or exception occurs during the sequence of operations, the sequence is aborted with the counters and pointers in the wrong state. For example, the architectural x86 SI, DI and CX registers do not have the correct value. The alternate fault handler is used by specifying, prior to the sequence, an alternate fault handler that performs a cleanup after a repeated move fault. The sequence proceeds without the overhead of intermediate instructions for tracking the pointers and counters. If no errors occur, the alternate fault handler terminates without effect. However, if an error occurs, the alternate fault handler is invoked. This alternate fault handler is specific to the particular sequence of operations and performs clean-up accordingly and jumps to the default fault handler. Advantageously, highly efficient code improves speed performance without hindrance from the alternate fault handler until an error arises, at which time the error is addressed.

The branch history table (BHT) stores recent history information, particularly branch direction information, about conditional transfer control instructions that have been encountered in the past. When a branch is repeated, stored information relating to the branch is analyzed to predict the current direction of the branch. Subsequently, the stored information is updated based on the actual direction taken by the branch. The stored information is derived from the direction of a particular newly encountered branch, the recent direction history of the particular branch and the recent direction history of other branches. The stored information is based on a plurality of sets of two-bit state machines and also on a direction history of the last nine branch executions, whether the last nine branch executions pertained to the particular branch or other branches. The instruction address of the particular newly encountered branch is used to select one of the plurality of sets of two-bit state machines. The direction history of the last nine branch executions is used to select a particular two-bit state machine in the selected set of state machines. Each state machine is a two-bit saturating counter for counting the directions taken by the most recent few branches that accessed this particular state machine. Typically a particular state machine is accessed by the same static branch, although other branches may access the same state machine. A larger state machine value is indicative of more taken instances of a branch. A smaller state machine value is indicative of more not taken instances of a branch. Upon selection of a state machine, the state machine is accessed. If the present overall count is "greater" then a branch is predicted taken. If the present overall count is "lesser" then a branch is predicted not taken. The direction history of the most recent nine branch executions is held in a nine-bit shift register which is clocked or shifted each time a branch instruction is successfully decoded. The immediate branch direction just predicted is the new direction history value that is shifted into the shift register. A history bit value of one indicates a branch taken. A history bit value of zero indicates a branch not taken.

During a decode cycle, the linear decode PC 424 is used to perform a BHT table lookup. If a PC-relative branch instruction is decoded, then the accessed state machine immediately predicts the branch direction, although the actual instruction subsequently fetched and decoded is determined at the end of the decode cycle by the macroinstruction decoder 230. Subsequently, the branch condition (BRCOND) operation generated by decoding of the conditional branch instruction is resolved by logic in the scheduler 260, at which time the state machine is updated. If the branch is actually taken, the state machine is decremented unless already at the maximum value (3). If the branch is actually not taken, the state machine is incremented unless already at a minimum value (0). Accordingly, a state machine value of 0 and 1 respectively indicate a strong and a mild prediction of a branch not taken. A state machine value of 2 and 3 respectively indicate a mild and a strong prediction of a branch taken. To support updating of BHT entries, a copy of the branch address and direction history bits for accessing the BHT and a copy of the state machine value are passed to the scheduler 260 along with the branch condition (BRCOND) operation. Since a maximum of one BRCOND is included in an Op quad, the BHT support information is tagged to the Op quad applied to the scheduler 260. It is advantageous for reducing circuit size and complexity that the BHT does not contain entry tags (addresses of linear decode PC 424 associated with decoded conditional branches) that are typical in cache structures. It is further advantageous that the BHT has a large number of entries so that the contention rate is low.

The information saved in a scheduler 260 Op quad along with an associated BRCOND operation has a width of fifteen bits including four branch address bits, nine current history bits, and the immediately accessed two state machine bits, the upper bit of which is also the predicted direction for the immediate branch. The first thirteen bits are used, when necessary, to reaccess the BHT and to update a state machine value. The final two bits are modified to create the new state machine value.

When a branch is mispredicted, the set of history values in the nine-bit branch history shift register are corrected to reflect the actual direction taken by the branch. Furthermore, the shift register is "shifted back" to correspond to the mispredicted branch, then updated based on the actual branch direction and which branch direction was predicted.

A return address stack (RAS) (not shown) is a target address cache for return (RET) transfer control instructions. RAS is an eight entry, 32-bit wide, single-ported RAM that is managed as a circular buffer using a single three-bit pointer. During each cycle at most one access, either a read access for a RET decode or a write access for a CALL decode, is performed. RAS caches RET return addresses and predicts return addresses which inherently specify a target address indirectly, in contrast to other transfer control instructions that contain a direct specification of target address. RAS is advantageously utilized since a particular RET instruction often changes target address between different executions of the instruction. RAS discovers and anticipates the target address value for each RET instruction execution through monitoring of the return addresses that are saved—pushed on a stack—by CALL instructions. Corresponding CALL and RET instructions typically occur dynamically in pairs and in last-in-first-out LIFO order with respect to other CALL and RET instruction pairs.

Each time a CALL instruction is successfully decoded, the logical return address of the CALL instruction is saved (pushed) to a circular buffer managed as a LIFO stack. Each time a RET instruction is successfully decoded, the return address value currently on the top of the RAS is employed as the predicted target address for the RET and the value is popped from the RAS. RAS achieves a high prediction rate although mispredictions do occur because CALLs and RETs do not always occur in nested pairs, only near CALLs and RETs and not far CALLs and RETs are supported, and mispredictions occur because of the finite depth of the RAS. When a conditional branch misprediction occurs, RAS attempts to restore the state prior to misprediction by setting the top of stack pointer to the previous condition because CALL and RET instructions may have been speculatively decoded and the top-of-stack pointer thereby modified. The original pointer, before the misprediction, is to be restored. Restoration following a misprediction is supported by the scheduler 260. Each scheduler 260 Op quad is tagged with a current initial top-of-stack pointer value in effect during the decode cycle in which the Op quad was generated. When the BRCOND Op generated for a conditional branch instruction is resolved and found to be mispredicted, the top-of-stack pointer tagged to the scheduler Op quad is supplied to the RAS during a restart cycle that is generated by the scheduler 260. RAS replaces the current top-of-stack value with the scheduler Op quad top-of-stack pointer tag.

Figure 5:
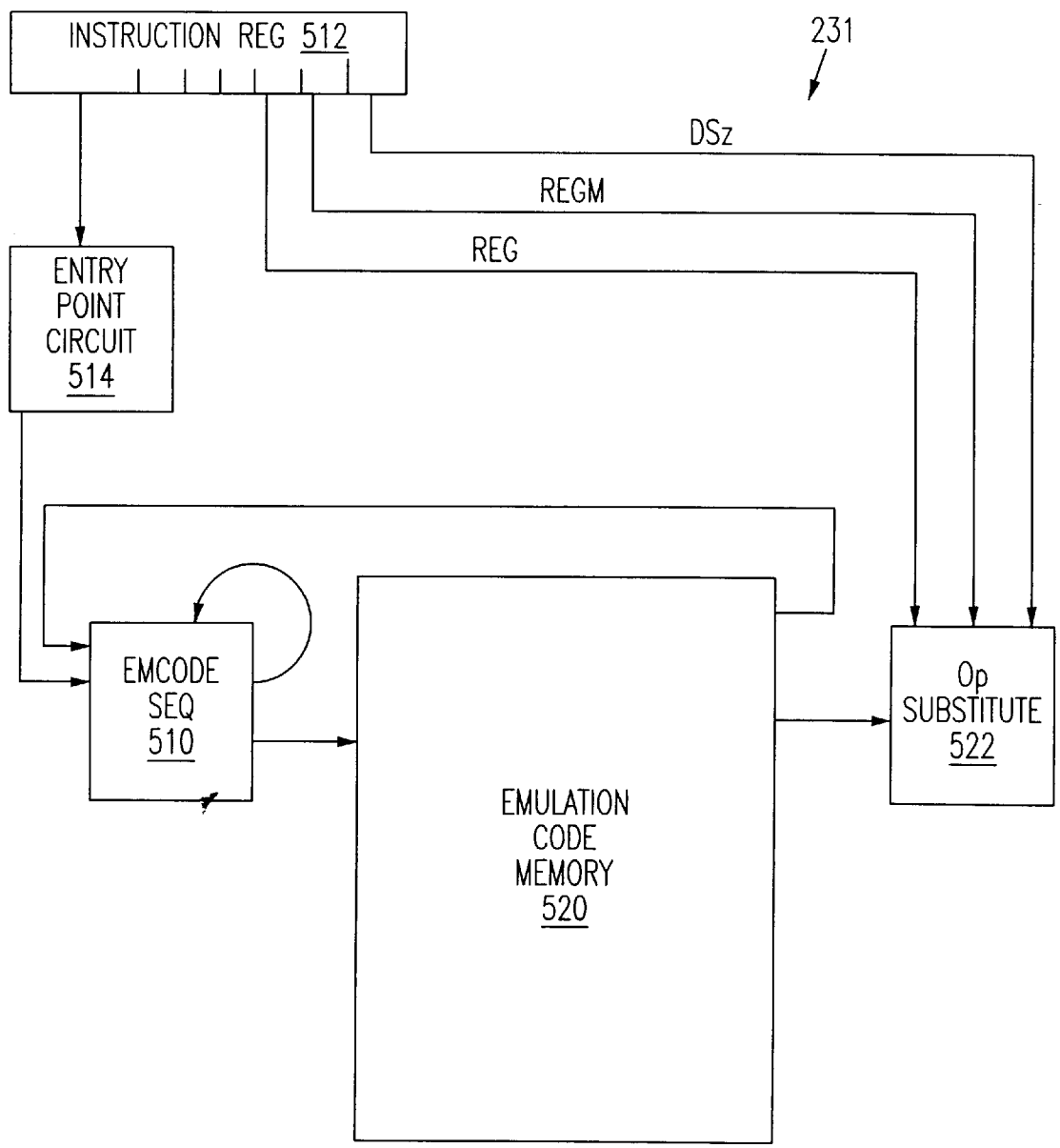
FIG. 5 is a schematic block diagram which depicts a structure of an emulation code sequencer and an emulation code memory of the instruction decoder shown in FIG. 4.

Referring to FIG. 5, a schematic block diagram depicts an instruction decoder emulation circuit 231 including an instruction register 512, an entry point circuit 514, an emulation code sequencer 510, an emulation code memory 231 and an Op substitution circuit 522. The instruction decoder emulation circuit 500 is a circuit within the instruction decoder 220. The instruction decoder emulation circuit 231 receives instruction bytes and associated predecode information from the instruction buffer 408 connected to the instruction fetch control circuit 218, the BTB 456 or the instruction cache 214. The instruction buffer 408 is connected to and supplies the instruction register 512 with x86 instructions. The instruction register 512 is connected to the entry point circuit 514 to supply emulation code ROM entry points. The entry point circuit 514 receives the x86 instruction and, from the x86 instruction operation code (opcode), generates an entry point address, a beginning address pointing into the emulation code memory 520. In this manner an address of an instruction in emulation code memory 520 is synthesized from the opcode of an x86 instruction. The address is derived based on the x86 instruction byte, particularly the first and second bytes of the x86 instruction as well as information such as the modr/m byte, prefixes REP and REPE, the protected mode bit and effective data size bit DSz. Generally, closely related x86 instructions have similarly coded bit fields, for example a bit field indicative of instruction type is the same among related x86 instructions, so that a single entry in the emulation code memory 520 corresponds to several x86 instructions. Entry points are generally synthesized by reading the x86 instructions and assigning bits of the entry point address according to the values of particular x86 instruction bit fields. The instruction register 512 is connected to the emulation code sequencer 510 which, in turn, is connected to the emulation code memory 520. The emulation code sequencer 510 applies the entry point to the emulation code memory 520 and receives sequencing information from the emulation code memory 520. The emulation code sequencer 510 either controls the sequencing of instructions or, when a new sequence is to be started, applies an entry point to the emulation code memory 520. Operations (Ops) encoded in the emulation code memory 520 are output by the emulation code memory 520 to the Op substitution circuit 522 as Op quads or Op units. The Ops correspond to a template for RISC-type x86 operation. This template includes a plurality of fields into which codes are selectively substituted. The emulation code memory 520 is connected to the Op substitution circuit 522 to supply Ops into which the various Op fields are selectively substituted. Functionally, the entry point circuit 514 calculates an entry point into the emulation code ROM 232 or emulation code RAM 236. The sequence in emulation code ROM 232 determines the functionality of an instruction.

The emulation code memory 520 includes an on-chip emulation code ROM 232 and an external emulation code RAM 236. The emulation code memory 520 includes encoded operations that direct how the processor 120 functions and defines how x86 instructions are executed. Both the emulation code ROM 232 and RAM 236 include a plurality of operation (Op) instruction encodings having a Op coding format that is the same in ROM 232 and RAM 236. For example, in one embodiment the emulation code ROM 232 has a capacity of 4K 64-bit words. The Op coding format is typically a format defined in 30 to 40-bits for example. In one embodiment, a 38-bit format, shown in FIGS. 6A through 6E, is defined. The emulation code ROM 232 base address location within the emulation space is fixed. The external emulation code RAM 236 is resident in standard memory address space within cacheable memory. The emulation code RAM 236 base address location within the emulation space is fixed. The 32-bit emulation code RAM 236 address is formed by the fixed base address of the emulation code RAM 236 which supplies bits the most significant fifteen bits <31:17>, and the Op address which furnishes fourteen bits <16:3> concatenated to the base address bits. The two least significant bits <1:0> of the emulation code RAM address are set to zero. The fourteen bit Op address in emulation code RAM 236 is the same as the Op address in emulation code ROM 232. Operations (Ops) are stored in Op coding format, for example 38-bits, in the external emulation code RAM 236 in 64-bit words. Bits in excess of the Op coding format bits of the 64-bit words are used to store control transfer (OpSeq) information. The external emulation code RAM 236 is typically used for test and debug purposes, allowing for patching of any instruction encoded in the emulation code ROM 232, and for implementing special functions such as system management mode (SMM). For example, if an instruction in emulation code ROM 232 is found to function improperly, the external emulation code RAM 236 is accessed to temporarily or permanently substitute for the improperly-functioning fixed code in the emulation code ROM 232. Access to the external emulation code RAM 236 is typically gained using one of two techniques. In a first technique, a one-bit field in an OpSeq field of an element of emulation code memory 520 designates that the next address for fetching instructions is located in external emulation code RAM 236. In this first technique, the on-chip emulation code ROM 232 initiates execution of the external emulation code RAM 236. In a second technique, a vector address is simply supplied for vectoring to an entry point in the emulation code RAM 236.

The instruction cache 214, instruction fetch control circuit 218 and instruction decoder 220 function in three instruction fetch and decode modes. In a first mode, the instruction decoder 220 fetches emulation code Op quads from the on-chip emulation code ROM 232. Each Op quad includes four operations (Ops) plus control transfer information (OpSeq) for determining the next cycle of fetch and decode function. In a second mode, the instruction fetch control circuit 218 controls fetching of x86 macroinstruction bytes from the instruction cache 214, which is part of the on-chip L1 instruction cache 214. The x86 macroinstructions are decoded by the macroinstruction decoder 230, which generates four operations (Ops). Four Ops plus the OpSeq field form a full Op quad. The instruction decoder 220 performs any coded control transfers using the branch predict logic 234 and vectoring functionality of the macroinstruction decoder 230. In a third mode, the instruction fetch control circuit 218 controls fetching of 64-bit words containing emulation code in Op coding format from the instruction cache 214, one 64-bit word per cycle. Each 64-bit word corresponds to a single operation (Op). In other embodiments, a plurality of 64-bit words may be accessed per cycle. An embodiment in which four 64-bit words are accessed, the emulation code RAM 236 supplies a full Op quad in the manner of the on-chip emulation code ROM 232 so that a fully-reprogrammable processor with full efficiency is achieved. A fully-reprogrammable processor advantageously permits soft implementation of greatly differing processors, for example an x86 processor and a PowerPC™ in a single hardware.

Figure 7:
FIG. 7 is a pictorial depiction of an OpSeq field format employed in the emulation code memory shown in FIG. 5.

In the first and third operating three modes, control transfer information is formatted into an operation sequencing (Opseq) field of the Op quad. Unconditional control transfers, such as branch (BR) and return from emulation (ERET) operations, are controlled completely using the Opseq control transfer information. Conditional transfers, such as branch on condition (BRcc), are controlled using a combination of the Opseq field and a branch condition (BRCOND) operation. An OpSeq field format graphic is shown in FIG. 7. The 16-bit OpSeq field 700 includes a two-bit sequencing action (ACT) field 710, a single-bit external emcode field 712 and a 13-bit operation (Op) address field 714. Four sequencing actions in the ACT field 710 are encoded, as follows:

| ACT | Operation | Description |
|---|---|---|
| 0 0 | BR/BRcc | uncond/cond branch to emcode address |
| 0 1 | BSR/BSRcc | uncond/cond "call" to emcode address |
| 1 0 | ERET/ERETcc | return from emulation to inst decoding |
| 1 1 | SRET/SRETcc | return from emulation call |

Whether a sequencing action of an OpSeq is unconditional or conditional depends on the presence or absence, respectively, of a branch condition (BRCOND) Op elsewhere within the Op quad. The BRCOND Op within the Op quad specifies the condition to be tested and the alternate emulation code target address. No explicit static branch direction prediction bit exists. Instead the predicted action and next address are always specified by the OpSeq field 700 and the "not predicted" next address is always specified by the BRCOND Op. A BRCOND Op is always paired with a BSR sequencing action including unconditional calls. For unconditional and conditional "predicted-taken" calls, the BRCOND Op specifies the return address to be saved.

The external emcode field 712 is set to one if emulation code to be executed is located in external emulation code RAM 236. The external emcode field 712 is set to zero if emulation code to be executed is located in internal emulation code ROM 232. The Op address field 714 designates an address of a target Op within a non-entry point Op quad.

The Opseq control transfer information controls unconditional control transfers when an Op quad or 64-bit memory word is fetched and arranged or "instantaneously decoded". Designation of the next instruction to be decoded is controlled by the Opseq field alone. The Opseq field specifies one of three alternative actions. First, the Opseq field directs fetching of emulation code from emulation code ROM 232 at a specified 14-bit single operation word address so that an emulation code ROM 232 Op quad is fetched. Second, the Opseq field directs fetching of emulation code from emulation code RAM 236 at a specified 14-bit single operation word address so that an emulation code RAM 232 64-bit memory word is fetched. Third, the Opseq field includes a return from emulation (ERET) directive, which directs the instruction decoder 230 to return to x86 microinstruction decoding.

Emulation code fetched from the emulation code ROM 232 is fetched in the form of aligned Op quads. A branch to an intermediate location within an Op quad causes the preceding operations within the Op quad to be treated as invalid by fetching NOOPs in place of the preceding operations.

The byte memory addresses for fetching 64-bit memory words from emulation code RAM 236 are created by concatenating a specified 14-bit operation address with three least significant bits set to zero, thereby creating an aligned 8-bit address. The byte memory addresses for fetching 64-bit memory words are 8-bit aligned, thus rendering memory Op decoding and fetch/decode advancement consistent and simple.

The Opseq control transfer information also controls designation of the immediate next instruction to be decoded for conditional control transfers. The branch condition (BRCOND) operation specifies the condition code to be tested and evaluated and specifies an alternative 14-bit emulation code fetch and decode address. Thus, Opseq control transfer information for conditional control transfers effectively specifies the predicted path of the conditional branch. The BRCOND address typically is either the 14-bit target Op word address or the 14-bit Op word address of the next "sequential" operation (Op). More generally, the BRCOND address may specify a fully general two-way conditional branch. A conditional ERET operation is implemented by setting the Opseq field to specify an ERET operation so that the conditional ERET is predicted taken. If the ERET operation is subsequently found to be mispredicted, then the x86 macroinstruction stream directed by the ERET is aborted and the sequential macroinstruction stream specified by the BRCOND operation is restarted.

BRCOND operations are loaded into the scheduler 260 in an unissued state. BRCOND operations are evaluated in-order by the branch resolution unit of the scheduler 260. If the branch is properly predicted, the branch is marked Completed. Otherwise, the BRCOND state is left unissued and triggers a branch abort signal when detected by the Op commit unit.

The emulation code memory 520 supports a single-level (no nesting) subroutine functionality, in which an Opseq field is set to specify alternatives for fetching emulation code. The alternatives are structured as a typical two-way conditional branch, except that a 14-bit Op word address from the immediate field of a BRCOND Op within the Op quad or memory Op is loaded into a subroutine return address register. The subroutine return address register stores the 14-bit Op word address plus a single bit which designates whether the return address is located in emulation code ROM 232 or RAM 236. The condition code specified by the BRCOND Op may be any alternative, including TRUE, so that both unconditional and conditional (predicted-taken) subroutines may be specified. However, the BRCOND Op must be specified to avoid loading an undefined value into the subroutine return address register.

All emulation code subroutine support and return address register management is performed by the emulation code sequencer 510 at the front of the pipeline. Thus return address register loading and usage is fully synchronous with standard decoder timing so that no delays are introduced.

Two-Way Emulation Code Branching

The emulation code ROM 232 is storage for a plurality of sequences of operations (Ops). An operation sequence begins at a defined entry point that is hard-coded into the emulation code ROM 232 and extends to a return from emulation (ERET) Opseq directive that ends the operation sequence. The number of operations in a sequence is typically variable as is appropriate for performing various different functions. Some simple x86 instructions have only a single Op entry in the emulation code ROM 232, although these instructions are fetched with Op quad granularity. Other more complex x86 instructions use many component operations. The emulation code ROM 232 storage is structured as a plurality of Op quads, programmed into a fixed ROM address space. Each Op quad includes four RISC Op fields and one Opseq field. The operation sequences are typically not aligned within the Op quads so that, absent some technique for branching to interspersed locations in emulation code ROM 232, many ROM units in the emulation code ROM 232 are unusable, wasting valuable integrated circuit space. Furthermore, because the entry point address of an instruction in emulation code ROM 232 is synthesized from the opcode of an x86 instruction, the entry point addresses often are forced into fixed positions spread throughout the ROM address space with intervening gaps that lead to unused portions of ROM. ROM positions that are left without access via an entry point are free for other usage but are not conveniently sequential to allow access. The OpSeq field provides a technique for branching to these interspersed locations, thereby substantially eliminating wasted space.

Each of the four RISC Op fields of an Op quad stores a simple, RISC-like operation. The OpSeq field stores a control code that is communicated to the emulation code sequencer 510 and directs the emulation code sequencer 510 to branch to a next location in the emulation code ROM 232. Each of the four RISC Op fields in the emulation code ROM 232 may store a branch operation, either conditional or unconditional, and thereby specify a target address so that a plurality of branches may be encoded in a single Op quad. In some embodiments of the instruction emulation circuit 231, the Op quad is limited to having at most a single branch operation to direct Op order in combination with the OpSeq field. The combination of a conditional branch Op in one of the four RISC Op fields and the OpSeq field in an Op quad yields an Op quad with two possible target or next addresses.

For an Op quad having a plurality of target addresses, the emulation code sequencer 510 directs the sequence of operations by selecting a hardcoded, predicted target address. Thus, for an Op quad including an conditional branch, the emulation code sequencer 510 selects a hardcoded OpSeq target address in preference over the conditional branch. The unconditional branch is subsequently handled in accordance with the branch prediction functionality of the processor 120 so that no additional branch handling overhead is incurred by implementing two-way emulation code branching.

Emulation microcode may be written so that a BRCOND Op is positioned in one of the first three positions of the Op quad. Thus, the Ops following the BRCOND Op within the Op quad are executed based on the predicted direction rather than whether the branch is ultimately taken. If the branch is ultimately found to be correctly predicted, all of the Ops of the Op quad and the Ops of subsequent Op quads are committed to the scheduler 260. If the branch is ultimately found to be mispredicted, all of the Ops following the BRCOND Op plus all subsequent Op quads are aborted. The emulation code is supplied to include the branch conditions, a target address, a "sequential" address, and also the prediction for the branch condition.

For most instructions, the OpSeq field alone supplies the next fetch address, either a vector address or an ERET return. This is advantageous for simplifying the control hardware, supplying a fast and simple control logic that controls operation fetching without analysis of conditional branching or branch prediction. For conditional branch instructions, the OpSeq field supplies a predicted branch address and a BRCOND operation in the quad specifies a condition code to be evaluated and specifies the alternate fetch address in case of misprediction. The emulation code handling advantageously achieves the flexibility of nonsequential Op quad fetching in which the instruction control sequence is selected by the program with few constraints. Accordingly, the OpSeq field is advantageously used to efficiently fit Op sequences into nonused locations in the emulation code ROM 232. The emulation code handling also includes the flexibility of optional two-way branching in the case of conditional branches and also in the case of a subroutine call which may be directed to return to substantially any location rather than being constrained to return to the instruction following the calling instruction. This usage of the OpSeq field to branch to a target address advantageously achieves unconditional branching without incurring a time or cycle penalty.

Emulation Environment Substitution

The emulation code sequencer 510 controls various emulation environment substitutions to substantially expand the number of encoded operations beyond the number of operation entries in the emulation code ROM 232. The emulation code sequencer 510 includes logic circuits that analyzes specific typically dedicated encodings of an Op field to determine when a substitution is to be made and which substitution is performed. Most encodings directly specify a field value. Other encodings indirectly specify a field value through emulation environment substitution. Usage of emulation mode substitution achieves encoding of CISC functionality while substantially reducing the size of emulation code ROM 232, advantageously reducing the size and cost of a processor integrated circuit. The Op fields, including the register field and some of the size fields, directly specify a register or specify an indirect register specifier such as AX or T1. Similarly, a field may select RegM which is the direct register specifier. The Op substitution logic analyzes the coding for the indirect register specifier to subsequently define the register coding and substitute the register encoding with the current register. The size fields select one byte, two bytes or four bytes, or select a D-size so that the current effective data size replaces the original encoding. The symbols such as HReg represent particular encodings such as HReg_T2 which is a symbolic representation of the encoding for T2. Illustrative symbols include Hreg, HDSz, HASz, HSegDescr, HSpecOpType and others.

Pseudo-RTL code, as follows, particularly describes the emulation environment substitution operation:

```
//Emulation Envirnoment Substitution;
//*******************************;
//Decode;
for (int i=0; i<4; ++i) {
    switch (OpQuad.Ops (i) .Type){
    case HOpType_RegOp:
        if ((HReg_Reg & Ox1c) ==(OpQuad.Ops(i).RegOp.Src1Reg & Ox1c))
            OpQuad.Ops (i).RegOp.Src1Reg = HReg (unit (DEC_EmReg));
            )
        if((HReg_13 RegM & Ox1c) == (OpQuad.Ops(i) .RegOp.Src1Reg & Ox1c)) {
            OpQuad.Ops(i) .RegOp.SrcqReg = HReg(unit(DEC_EmRegm));
            )
        if((HReg_RegM & Ox1c) == (OpQuad.Ops(i).RegOp.Imm8 &
            Ox1c))
            OpQuad.Ops(i).RegOp.Imm8 =DEC_EmRegm;
        if(!OpQuad.Ops(i).RegOp.I) (//not immediate
            if((HReg_Reg & Ox1c ==(OpQuad.Ops(i).RegOp.Imm8 &
                Ox1c))
                OpQuad.Op(i).RegOp.Imm8 = DEC_EmRegm;
            )//not immediate
        if((HReg_Reg & Ox1c ==(OpQuad.Ops(i).RefOp.DestReg & Ox1c)) {
            OpQuad.Ops(i).RegOp.DestReg = HReg(unit(DEC_EmReg));
            )
        if((HReg_RegM & Ox1c) ==(OpQuad.Ops(i).RegOp.DestReg & Ox1c)) {
            OpQuad.Ops(i).RegOp.DestReg = HReg(unit (DEC_EmRegm));
            )
        if(HDSz_D ==OpQuad.Ops(i).RegOp.DSz) {
            OpQuad.Ops(i).RegOp.DSz = DEC_/EmDSz ? HDSz_4B:
                HDSz_2B
                )
        if(HDSz_A ==OpQuad.Ops(i).RegOp.DSz) {
            OpQuad.Ops(i).RegOp.DSz = DEC_EmASz ? HDSz_4B:
                HDSz_2B
                )
        if(HDSz_S ==OpQuad.Ops(i).RegOp.DSz) {
            OpQuad.Ops(i).RegOp.DSz = RUX_B ? HDSz_4B : HDSz_2B:
            )
        break;
    case HOpType_LdStOP:
        if((HLdStOpType_LDST == OpQuad.Ops(i).LdStOp.Type) &&
                    DEC_EmLock) {
            OpQuad.Ops(i).LdStOp.Type = HLdStOpType_LDSTL;
            )
        if((HReg_Reg & Ox1c) == (OpQuad.Ops(i).LsStOp.DataReg & Ox1c)) {
            OpQuad.Ops(i).LdStOp.DataReg = HReg (unit (DEC_EmReg));
            )
        if(HReg_RegM & Ox1c) == (OpQuad.Ops(i).LdStOp.DataReg & Ox1c)) {
            OpQuad.Ops(i).LdStOp.DataReg = HReg(unit(DEC_EmRegm));
            )
        if(HDSz_D ==OpQuad.Ops(i).LdStOp.DSz) {
            OpQuad.Ops(i).LdStOp.DSz =DEC_EmDSz ? HDSz_4BB :
                    HDSz_2B;
            )
        if(HASz_A == OpQuad.Ops(i).LdStOp.ASz) {
            OpQuand.Ops(i).LdStOp.ASz = DEC_EmASz ? HASz_4B :
                HASz_2B
            )
        if(HASz_S == OpQuad.Ops(i).LdStOp.ASz) {
            OpQuad.Ops(i).LdStOp.ASz = RUX_B ? HASz_4B : HASz_2B
            )
        if(HASz_D ==OpQuad.Ops(i).LdStOp.ASz) {
            OpQuad.Ops(i).LdStOp.ASz = DEC_EmDSz ? HASz_4B :
                HASz_2B
            )
        if(HSegDescr_OS == OpQuad.Ops(i).LdStOp.Seg) {
            OpQuad.Ops(i).LdStOp.Seg = HSegDescr (unit(DEC_EmOprSeg));
            )
        break;
    case HOpType SpecOp:
        if(HReg_Reg & Ox1c) == (OpQuad.Ops(i).SpecOp.DestReg & Ox1c)) {
            OpQuad.Ops(i).SpecOp.DestReg = HReg(unit(DEC_EmReg));
            )
        if((HReg_RegM & Ox1c) == (OpQuad.Ops(i).SpecOp.DestReg & Ox1c)) {
            OpQuad.Ops(i).SpecOpDestReg + HReg(unit(DEC_EmRegm));
            )
        if(HDSz_D == OpQuad.Ops(i).SpecOp.DSz) {
            OpQuad.Ops(i).SpecOp.DSz = DEC_EmDSz ? HDSz_4B:
                HDSz_2B;
            )
```

```
//LDKD Op;
    id(Opquad.Ops(i).SpecOp.Type == HSpecOpType_LDKD) {
        HVector Imm17 = OpQuad.Ops(i).SpecOp.Imm17
        if(DEC_EmDSz) {
            Imm17 (5,0) = (Imm17(4,0) << 1) | Imm17 (0);
        }
        OpQuad.Ops(i).SpecOp.Imm117 = Imm17 (0);
    }
    break;
    )
    EDR_OpQuad = OpQuad;
    EDR_ERET = DEC_EXT Emc ? IC_ERET : (OpQuad.Action ==
        HOPSeq_ERET);
        )
```

The emulation code sequencer 510 sequences to a next entry point in the emulation code ROM 232, producing an Op quad, including four operations (Ops) and an Opseq field. For each of the four operations in an Op quad, various substitutions are made, the type of substitution depending on the particular operation type of the five general operation types. The five operation types include register operations (RegOps), load-store operations (LdStOps), load immediate operations (LIMMOps), special operations (SpecOps) and floating point operations (FpOps). Op formats for the five operation types are depicted in FIGS. 6A through 6E.

The Ops that are produced by the emulation code ROM 232 are generic in nature. In particular, the Ops do not correspond exactly to an x86 instruction. Instead, the Ops from the emulation code ROM 232 form a structure for an x86 instruction. Various bit fields within the Op template are substituted using an substitution function performed by the emulation code sequencer 510. Simply described, the substitution function substitutes some bits of the Op with other selected bits.

X86 instructions typically include an opcode followed by a modr/m byte. The modr/m byte designates an indexing type or register number to be used in the instruction. The modr/m byte has three fields including a 2-bit (MSB) mode field, a 3-bit (intermediate) reg field and a 3-bit (LSB) r/m field. The mode field combines with the r/m field to form 32 possible values indicative of eight registers and 24 indexing modes. The reg field specifies either a register number or three more bits of opcode information. The r/m field either specifies a register as the location of an operand or is used in combination with the mode field to define registers and indexing modes.

Figure 6:
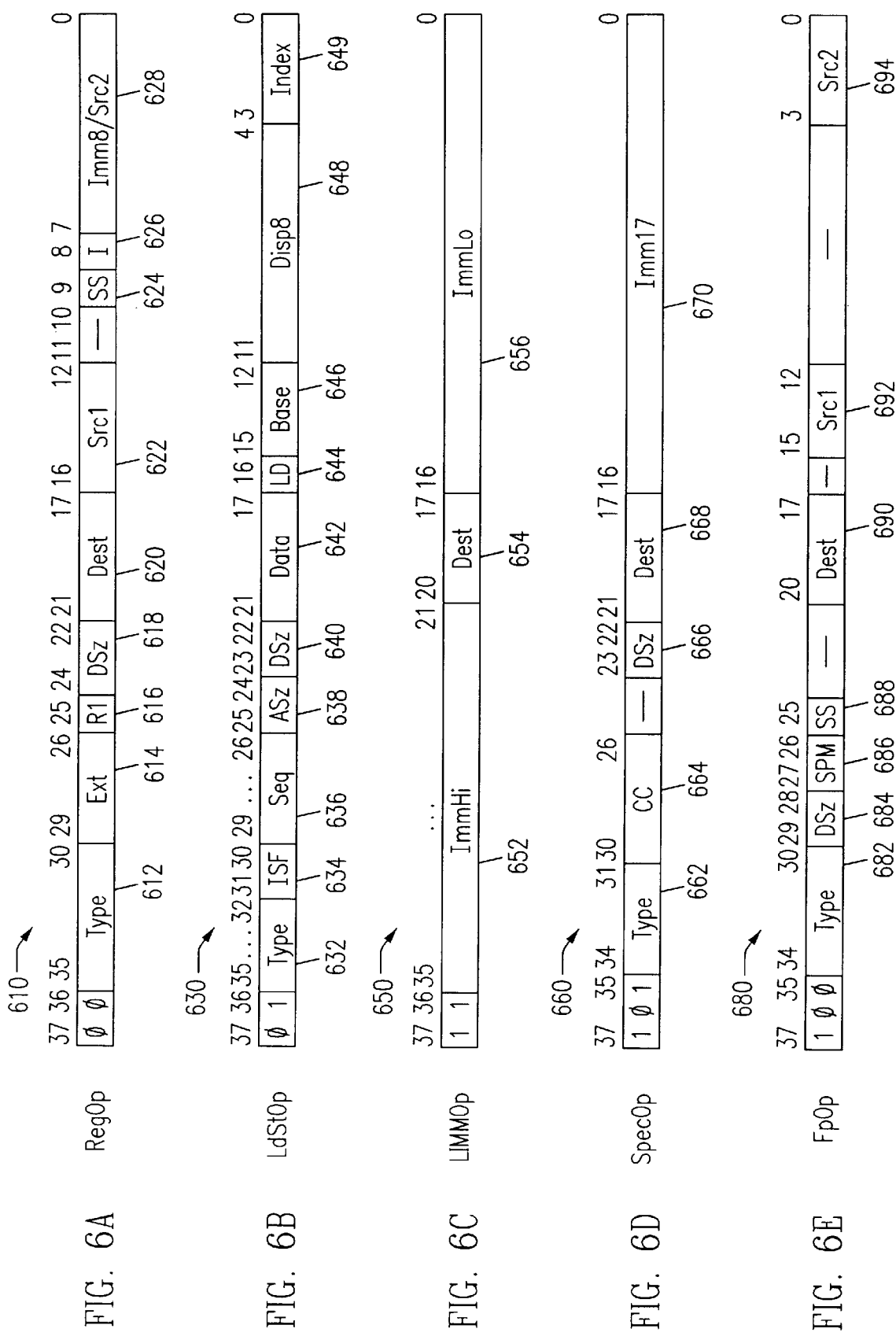
FIGS. 6A through 6E are pictorial illustrations showing a plurality of operation (Op) formats generated by the instruction decoder shown in FIG. 4.

FIG. 6A is a register operation (RegOp) field encoding graphic that illustrates various fields in the RegOp format. In the RegOp field 610, most-significant bits 36 and 37 are cleared to designate the operation as a RegOp. The RegOp field 610 also includes a 6-bit operation type (TYPE) field 612 at bit locations [35:30], a 4-bit extension (EXT) field 614 at bit locations [29:26], a RU1-only (R1) bit 616 at bit location [25], a 3-bit operation/data size (DSz) field 618 at bit locations [24:22], a 5-bit destination (DEST) general register field 620 at bit locations [21:17] and a 5-bit source 1 (SRC1) general register field 622 at bit locations [16:12]. The RegOp field 610 also includes a single-bit set status (SS) field 624 at bit location [9], a single-bit immediate source 2 (I) field 626 at bit location [8] and an 8-bit immediate data or general register for source 2 operands (IMM8/SRC2) field 628 at bit locations [7:0]. The TYPE field 612 of RegOp encodings include, as follows:

| TYPE code | Class | TYPE | Description |
| --- | --- | --- | --- |
| 0 0 0 0 0 x | ALU | ADD/INC | add/increment |
| 0 0 0 0 1 x | ALU | MOV/OR | move/or (only or if DSz=1) |
| 0 0 0 1 0 x | ALU | ADC | add with carry |
| 0 0 0 1 1 x | ALU | SBB | subtract with borrow |
| 0 0 1 0 0 0 | ALU | AND/EAND | logical and |
| 0 0 1 0 0 1 | ALU | BAND | logical and |
| 0 0 1 0 1 x | ALU | SUB/ESUB | subtract/decrement |
| 0 0 1 1 0 x | ALU | EXOR/XOR | exclusive or |
| 0 0 1 1 1 x | ALU | CMP | compare |
| 0 1 0 0 0 0 | SHIFT | SLL | logical shift left |
| 0 1 0 0 0 1 | SHIFT | BLL | logical shift left |
| 0 1 0 0 1 x | SHIFT | SRL | logical shift right |
| 0 1 0 1 0 x | SHIFT | SLC/RLC | shift/rotate left, carry |
| 0 1 0 1 1 x | SHIFT | SRC/RRC | shift/rotate right, borrow |
| 0 1 1 0 0 x | SHIFT | SLA | arithmetic shift left |
| 0 1 1 0 1 x | SHIFT | SRA | arithmetic shift right |
| 0 1 1 1 0 x | SHIFT | SLD/RLD | shift/rotate left, double |
| 0 1 1 1 1 x | SHIFT | SRD/RRD | shift/rotate right, double |
| 1 0 0 0 0 x | MOVE | RDFLG | read flag |
| 1 0 0 0 1 0 | MOVE | SEXT | |
| 1 0 0 0 1 0 | MOVE | ZEXT | |
| 1 0 0 1 0 x | MOVE | RDFLGS | |
| 1 0 0 1 1 x | MOVE | MOVcc | move conditional |
| 1 0 1 0 0 0 | MOVE | MUL1S | multiply signed/unsigned |
| 1 0 1 0 0 1 | MOVE | MUL1U | multiply signed/unsigned |
| 1 0 1 0 1 0 | MOVE | MULEH | multiply high/low data |
| 1 0 1 0 1 1 | MOVE | MULEL | multiply high/low data |
| 1 0 1 1 0 0 | MOVE | DIV1 | divide |
| 1 0 1 1 0 1 | MOVE | DIV2 | divide |
| 1 0 1 1 1 0 | MOVE | DIVER | divide |
| 1 0 1 1 1 1 | MOVE | DIVEQ | divide |
| 1 1 0 0 0 x | SPEC | RDxxx | read special register |
| 1 1 0 0 1 x | SPEC | | |
| 1 1 0 1 0 x | SPEC | | |
| 1 1 0 1 1 x | SPEC | | |
| 1 1 1 0 0 0 | SPEC | WRDR | write descriptor |
| 1 1 1 0 0 1 | SPEC | WRDL | write descriptor low |
| 1 1 1 0 1 x | SPEC | WRxxx | write special registor |
| 1 1 1 1 0 0 | SPEC | CHKS | check selector, |
| 1 1 1 1 0 1 | SPEC | WRDH | write descriptor high |
| 1 1 1 1 1 x | SPEC | WRIP | write instruction pointer |

Several RegOp encodings, specifically xx01x encodings, specify condition code dependence. The rotate and shift shift Ops are functionally equivalent except that different statmod bits are asserted.

The extension field (EXT) 614 is used, in combination with bit <0> of the TYPE field 612, for MOVcc operations to specify a 5-bit condition code. The extension field (EXT) 614 is also used for RDxxx/WRxxx operations to specify a 4-bit special register number. The set status (SS) field 624, in combination with the EXT field 614, is used to designate the status flags that are affected by an operation. For Ops in which the set status (SS) field 624 is set to 1, indicating that this Op does modify flags, the extension field (EXT) 614 specifies four status modification bits designating the groups of flags that are modified by the Op. For RDSEG Ops, the EXT field 614 specifies a 4-bit segment (selector) register. For a WRFLG conditional Op, the special register encoding matches the desired StatMod value for when the SS field is set. The set status (SS) field 624 and the EXT field 614 are RegOp fields.

Condition codes are encoded in five bits, bit <0> of the 5-bit condition code field specifies whether the condition or its complement is to be tested for truth or assertion, for example if cc <0> is equal to one then invert the condition. Bits <4:1> of the five-bit condition code (CC) field specify the condition to be evaluated, as follows:

| CC | mnemonic | condition |
|---|---|---|
| 0 0 0 0 | True | 1 |
| 0 0 0 1 | ECF | ECF |
| 0 0 1 0 | EZF | EZF |
| 0 0 1 1 | SZnZF | ~(~EZF.ZF) |
| 0 1 0 0 | MSTRZ | ~EZF.~IP.~(DTF + SSTF) |
| 0 1 0 1 | STRZ | ~EZF.~IP.~(DTF + SSTF) |
| 0 1 1 0 | MSTRC | ~ECF.~IP.~(DTF + SSTF) |
| 0 1 1 1 | STRZnZF | ~EZF.~IP.~(DTF + SSTF).ZF |
| 1 0 0 0 | OF | OF |
| 1 0 0 1 | CF | CF |
| 1 0 1 0 | ZF | ZF |
| 1 0 1 1 | CvZF | CF + ZF |
| 1 1 0 0 | SF | SF |
| 1 1 0 1 | PF | PF |
| 1 1 1 0 | SxOF | SF^OF |
| 1 1 1 1 | SxOvZF | SF^OF + ZF |

Bit cc[0] specifies whether the condition or the complement of the condition is evaluated for truth.

In the definitions, the character "~" indicates a logical NOT operation, "·" designates a logical AND operation, "+" specifies a logical OR operation, and "^" designates a logical XOR operation. OF, SF, ZF, AF, PF, and CF are standard x86 status bits. EZF and ECF are an emulation zero flag and an emulation carry flag, respectively, that emulation code uses in sequences implementing x86 instructions when the architectural zero flag ZF and carry flag CF are not changed. IP, DTF and SSTF are signals indicating an interrupt is pending, a debuf trap flag and a single step trap flag respectively.

Branch conditions STRZ and MSTRC are logically identical and used in implementing x86 instructions such as a move string instruction MOVS. For these x86 instructions, emulation code stores an index in a register and creates a loop that ends with a BRCOND. Each iteration of the loop moves a block of data and decrements the index. Branch predictaion initially predicts that the BRCOND branches to the beginning of the loop. Condition MSTRC indicates that branch evaluation logic is to signal the instruction decoder when the index reaches a predefined point near completion of the x86 instruction. The decoder then changes the branch prediction for the BRCOND that is loaded into the scheduler. Accordingly, a mispredicted branch and associated abort is avoided when looping is complete. Processor efficiency is improved in this manner.

The EXT field 614 is used to update condition flags including six flags corresponding to x86 flags and two emulation flags. The eight flags are divided into four groups, using one status modification bit per group of flags. The EXT field 614 defines updating of the various condition code flags substantially independent of the TYPE 612 specification, so that functionally related flags are controlled and updated as a group. Updating of related flags as a group advantageously conserves control logic. The EXT field 614 defines a set of bits which determine the flags to be updated for a particular instruction. Decoupling of condition code handling from operation type, using the independent TYPE 612 and set status (SS) field 624, allows some operations to be defined which do not update the flags. Accordingly, for those circumstances in which updating of condition flags is not necessary, it is highly advantageous to disable flag updating to avoid unnecessary dependency on previous flag values.

The RU1-only field 616 is indicative of Ops that are issued to the first register unit 244 and not to the second register unit 246 so that the R1 field 616 is a bit for hard-encoding an execution unit specification. Thus, the RU1-only field 616 indicates that a particular operation is only executable on a specific execution unit, generally because only the specific execution unit incorporates a function implemented on that unit. The set status (SS) field 624 modifies status flags according to EXT field 614 settings. The I field 626 specifies whether the source 2 operand is immediate or a general register. The IMM8/SRC2 field 628 specifies a 5-bit general register if the I field 626 is zero. The IMM8/SRC2 field 628 specifies a signed immediate value which is extended to the size of operation specified by the DSz field size if the I field 626 is one.

In the case of register operation (RegOp) substitution, the operation (Op) from the Op quad is a register operation (RegOp). The instruction register 512 holds instruction bytes that are decoded by the vectoring decoder 418. During a vectoring instruction decode, the vectoring decoder 418 generates an initial vectoring quad and an entry point address based on the contents of the instruction register 512. At the same time, the vectoring decoder 418 initializes the emulation environment variables, also called the emulation environment register 516, from various information based on fields of the instruction register 512 and based on other information. Information from the emulation environment register 516 is supplied to Op substitution logic that performs the substitution operation.

For RegOp substitution, various substitutions are made into fields of the RegOp format 610 shown in FIG. 6A. For the destination (DEST) 620 and source 1 (SRC1) 622 fields of a RegOp operation, a five-bit register encoding specifies a register using direct register specifiers (0–15) or indirect register specifiers (Reg and RegM). The direct register specifiers directly designate one of sixteen registers. The indirect specifiers, Reg and RegM, are substituted at Op decode time by the current register numbers (0–15) from the emulation environment registers 516. Substitution takes places as the instruction decoder 230 decode an instruction, vectors to an emulation code sequence in emulation code ROM 232, initialize the emulation environment register 516 with various fields from the instruction and other information. During operation of an emulation code sequence, the Ops in the sequence include various fields, such as indirect register specifier fields and size data fields, which are substituted based on current values of the emulation environment register 516. Op substitution logic determines whether the encodings for a field are indicative of a substituted field. An encoding for a field may indicate that other fields are substituted. For example, the coding of indirect specifiers Reg and RegM in the dest 620 and src1 622 fields is indicative that the DSz field 618 is also substituted.

With respect to the DSz field 618, the x86 instruction set instructions operate on 8 bit, 16 bit or 32 bit data, depending on the current default condition of the processor 120. The DSz field 618 includes three bits which indicate a data size of one byte, two bytes or three bytes. For instructions specifying substitution of data size, indirect size specifiers designate an A size, D size or S size. A data size substitution is determined by a B-bit and a D-bit. The B-bit is specified by the current stack-segment register (SS). The D-bit is specified by the code-segment register (CS). For indirect size specifiers, S size is determined by the B-bit. The effective address (A) size and the effective data (D) size are determined by the D-bit, possibly overridden by address or data size overwrite prefixes, and held in the emulation environment register 516. In general, the indirect specifiers of A size, D size, and S size are substituted or replaced by the absolute encoding for the bytes or four bytes. For example, if a D size is selected, the data size is resolved into two bytes or four bytes based on the effective data size as specified by a bit in the emulation environment register 516. Similarly, if an indirect size specifier encodes the A size, the effective address size is specified by a bit in the emulation environment register 516 to be either two bytes or four bytes. If the indirect specifier selects the S size, a B-bit determines whether two byte or four bytes are substituted.

Substitution of the Imm8/Src2 field 628 is performed only if source 2 (src2) operand is an indirect register specifier, rather than an immediate value. Op substitution logic determines whether the encoding for the immediate (I) field 626 is indicative of a substitution in the Imm8/Src2 field 628 by accessing the I field bit 626 and, if an indirect register specifier is selected, substituting a five-bit general register designation into the imm8/src2 field 628 of the RegOp format 610. For a register-stored src2 operand using the memory-indexed addressing form, no substitution takes place and the imm8/src2 field 628 of the RegOp format 610 is loaded with an index value. The RegOp format 610 is a RISC-type three (two source and one destination) operand format including the src1 field 622, the imm8/src2 field 628 and the dest field 620. A standard x86 format is a two operand format. The I field 626 advantageously allows the source 2 operand to flexibly take the form of either an immediate value or a general register.

The RegOp field 610 defines a group of specific Ops, including signed multiply (MUL1S), unsigned multiply (MUL1U), multiply high data (MULEH) and multiply low data (MULEL) Ops, that execute parts of multiplication and unloading operations so that a multiply instruction is made up of a plurality of these specific multiplication Ops. A division operation is similarly executed by combination of a plurality of specific simple division Ops, including one and two bit divide (DIV1), step divide (DIV2), divide unload remainder (DIVER) and divide unload quotient (DIVEQ) Ops, for example performing a two-bit iteration on a divide.

The WRIP Op writes the x86 program counter (PC) to change the execution address when the WRIP Op is retired, restarting instruction fetching at a desired address. The WRIP Op is particularly advantageous in the case of various instructions for which decoding of the instruction length is difficult or impossible so that, to avoid logic complexity, the implemented logic does not correctly decode the length. The instruction is also advantageous for serializing instruction fetch operations and for emulating branches. Efficiency is achieved by allowing the logic to incorrectly decode the instruction length and to set the program counter using the WRIP Op so that the incorrectly decode instruction length is ignored.

The check selector (CHKS) Op is used for handling x86 instruction set segment descriptors and selectors. The CHKS Op initiates a process of loading a segment register, including the operations of checking for a null selector and generating an address offset into a descriptor table.

Several write descriptor Ops (WRDH, WRDL, WRDR) are defined to perform real (WRDR) and protected mode (WRDH/WRDL) segment register loads, as are known in the computing arts and most particularly with respect to conventional x86 operations. The write descriptor real (WRDR) Op loads the segment register in a real mode fashion. The write descriptor protected mode high and low (WRDH/WRDL) Ops perform a sequence of checking operations in the protected mode. In a conventional x86 architecture, access of a task to instruction code and data segments and the I/O address space is automatically checked by processor hardware, typically operating as a state machine. In the processor disclosed herein, the conventional protected mode checks are instead performed as a sequence of operations as an emulation code sequence of hardware primitives.

FIG. 6B is a load-store operation (LdStOp) field encoding graphic that illustrates various fields in the LdStOp format. In the LdStOp field 630, most-significant bits 36 and 37 are respectively set to one and zero to designate the operation as a LdStOp. The LdStOp field 630 also includes a 4-bit operation type (TYPE) field 632 at bit locations [35:32], and a two-bit index scale factor (ISF) field 634 at bit locations [31:30] designating factors 1x, 2x, 4x and 8. The LdStOp field 630 includes a 4-bit segment register (SEG) field 636 at bit locations [29:26] and a two-bit address calculation size (ASz) field 638 at bit locations [25:24] designating a selection between A size, S size, D size and four bytes. The effective data and address sizes are substituted for LdStOps in the same manner as RegOp substitution. The LdStOp field 630 includes a 2-bit data size (DSz) field 640 at bit locations [23:22] specifying sizes (1, 2, 4 and DSize bytes) for integers and sizes (2, 4 and 8 bytes) for floating point, a 5-bit data source/destination (DATA) general register field 642 at bit locations [21:17] and a single-bit large displacement (LD) bit 644 at bit location [16] specifying a large displacement using the Disp8 displacement from a preceding Op. The LD bit 644 is useful since Ops are only 38 bits wide, an instruction format insufficient to specify a full 32-bit displacement into an operation. Only displacements encoded in eight bits are possible for a single LdStOp field 630. The LD bit 644, when asserted, indicates that the immediately preceding Op supplies a full 32-bit displacement. The LdStOp field 630 includes a 4-bit base (BASE) general register field 646 at bit locations [15:12]. The LdStOp field 630 also includes an 8-bit signed displacement (DISP8) field 648 at bit locations [11:4] and a 4-bit index (INDEX) general register 649 at bit locations [3:0]. The TYPE field 632 of LdStOp encodings include, as follows:

| TYPE code | TYPE | Description |
| --- | --- | --- |
| 0 0 0 0 | LD | load integer data |
| 0 0 0 1 | LDF | load floating point data |
| 0 0 1 0 | LDST | load integer data with store check |
| 0 0 1 1 | LDM | load multimedia data |
| 0 1 0 0 | CDAF | CDA plus flush cache lines |
| 0 1 0 1 | — | |
| 0 1 1 0 | LDSTL | load int. w/store check, locked |
| 0 1 1 1 | LDST | load int. w/store check |
| 1 0 0 0 | ST | store integer data |
| 1 0 0 1 | STF | store floating point data |
| 1 0 1 0 | STUPD | store int. w/base register update |
| 1 0 1 1 | STM | store multimedia data |

-continued

| TYPE code | TYPE | Description |
|---|---|---|
| 1 1 0 0 | CDA | check data effective address |
| 1 1 0 1 | CIA | check instruction effective address |
| 1 1 1 0 | TIA | TLB invalidate address |
| 1 1 1 1 | LEA | load effective address |

In the case of load-store operation (LdStOp) substitution, the emulation code sequencer 510 first determines whether a LOCK prefix has been acknowledged during setup of the emulation environment. If the designated LdStOp operation is a load integer with store check (LDST) and the LOCK prefix is acknowledged, the emulation code sequencer 510 substitutes a load integer with store check, locked (LDSTL) opcode for the LDST opcode.

For LdStOp substitution, various substitutions are made into fields of the LdStOp format 630 shown in FIG. 6B. For the data register (DataReg) field 642 of a LdStOp operation, a five-bit register encoding specifies a register using direct register specifiers (0–15) or indirect register specifiers (Reg and RegM). The direct register specifiers directly designate one of sixteen registers. The indirect specifiers, Reg and RegM, are substituted at Op decode time by the current register numbers (0–15) from the emulation environment registers 516. Substitution takes places as the instruction decoder 230 decode an instruction, vectors to an emulation code sequence in emulation code ROM 232, initialize the emulation environment register 516 with various fields from the instruction and other information. During operation of an emulation code sequence, the Ops in the sequence include various fields, such as indirect register specifier fields and size data fields, which are substituted based on current values of the emulation environment register 516. Op substitution logic determines whether the encodings for a field are indicative of a substituted field. An encoding for a field may indicate that other fields are substituted. The particular substitution depends on whether the data register (DataReg) 642 is addressed using register addressing or memory-indexed addressing. If the register addressing form is designated, DataReg field 642 of the LdStOp format 630 is determined by indirect specifier Reg. If memory-indexed addressing is designated, DataReg field 642 of the LdStOp format 630 is determined by indirect specifier RegM.

With respect to the ASz field 638 and the DSz field 640, the x86 instruction set instructions operate on 8 bit, 16 bit or 32 bit data, depending on the current default condition of the processor 120. The ASz field 638 and DSz field 640 each include two bits which indicate a data size of one byte, two bytes or three bytes. For instructions specifying substitution of data size, indirect size specifiers designate an A size, D size or S size. A data size substitution is determined by a B-bit and a D-bit. The B-bit is specified by the current stack-segment register (SS). The D-bit is specified by the code-segment register (CS). For indirect size specifiers, S size is determined by the B-bit. The effective address (A) size and the effective data (D) size are determined by the D-bit, possibly overridden by address or data size overwrite prefixes, and held in the emulation environment register 516. In general, the indirect specifiers of A size, D size, and S size are substituted or replaced by the absolute encoding for the bytes or four bytes. For example, if a D size is selected, the data size is resolved into two bytes or four bytes based on the effective data size as specified by a bit in the emulation environment register 516. Similarly, if an indirect size specifier encodes the A size, the effective address size is specified by a bit in the emulation environment register 516 to be either two bytes or four bytes. If the indirect specifier selects the S size, a B-bit determines whether a two byte or four bytes are substituted.

The LdStOp operation is checked to determine whether a four-bit segment register field 636 is to be substituted. When the emulation environment is set up, segment override prefixes are monitored. Segment override prefixes affect the decode of a subsequent instruction when the generation of a LdStOp is dependent on the effective operand segment of the instruction. The default segment is DS or SS, depending on the associated general address mode, and is replaced by the segment specified by the last segment override prefix. The segment register address space is expanded from conventional x86 specification to four bits to allow additional special segment registers to be support. The segment register is encoded as follows:

| SegReg# | Seg | Description |
|---|---|---|
| 0 0 0 0 | ES | architectural segment register |
| 0 0 0 1 | CS | architectural segment register |
| 0 0 1 0 | SS | architectural segment register |
| 0 0 1 1 | DS | architectural segment register |
| 0 1 0 0 | FS | architectural segment register |
| 0 1 0 1 | GS | architectural segment register |
| 0 1 1 0 | HS | temporary segment register |
| 0 1 1 1 | — | (reserved) |
| 1 0 0 x | TS | descriptor table SegReg (GDT or LDT) |
| 1 0 1 0 | LS | linear SegReg (ie, null segmentation) |
| 1 0 1 1 | MS | emulation memory segment register |
| 1 1 x x | OS | effective (arch.) data segment register |

At Op decode time, the emulation code sequencer 510 replaces the "OS" segment register with the current three bit segment register number from the emulation environment. Thus, a segment register is alternatively hardcoded in a specific segment register, or set to segment OS, which designates the current effective data segment register but which can be overridden with a segment override.

The emulation memory segment register (MS) designates access of a special emulation memory for usage in the emulation environment. The descriptor table SegReg TS designates access of either the global descriptor table (GDT) or the local descriptor table (LDT).

FIG. 6C is a load immediate operation (LIMMOp) field encoding graphic that illustrates various fields in the LIMMOp format. In the LIMMOp field 650, most-significant bits 36 and 37 are both set to one to designate the operation as a LIMMOp. The LIMMOp field 650 also includes a 16-bit immediate high part (ImmHi) 652 at bit locations [35:20], a 5-bit destination (DEST) general register field 654 at bit locations [19:16] and a 16-bit immediate low part (ImmLo) 656 at bit locations [15:0]. ImmHi 652 and ImmLo 656 combine to specify a 32-bit value that is loaded into the register specified by the DEST field 654.

FIG. 6D is a special operation (SpecOp) field encoding graphic that illustrates various fields in the SpecOp format. In the SpecOp field 660, most-significant bits 35 to 37 are respectively set to 101 to designate the operation as a SpecOp. The SpecOp field 660 also includes a 4-bit operation type (TYPE) field 662 at bit locations [34:31], a 5-bit condition code (CC) field 664 at bit locations [30:26] and a two-bit data size (DSz) field 666 at bit locations [23:22] designating sizes of 1, 4 and DSize bytes. The SpecOp field 660 includes a 5-bit destination general register (DEST) field 668 at bit locations [21:17] and a 17-bit immediate constant (Imm17) field 670 at bit locations [16:0]. The Imm17 field 670 holds either a 17-bit signed immediate value or a 14-bit Op address. The CC field 664 is only used by BRCOND Ops. The DSz field 666 and DEST field 668 are used only by LDKxx Ops. A standard NOP Op is defined to be "LIMM t0, <undefined>. The TYPE field 662 of SpecOp encodings include, as follows:

| TYPE code | TYPE | Description |
|---|---|---|
| 0 0 x x | BRCOND | branch condition |
| 0 1 0 x | LDDHA | set default fault handler address |
| 0 1 1 x | LDAHA | set alternate fault handler address |
| 1 0 0 x | DSK | load constant |
| 1 0 1 x | LDKD | load constant, data |
| 1 1 x x | FAULT | unconditional fault |

In the case of special operation (SpecOp) substitution, the SpecOp is checked to determine whether a destination general register (DestReg) is addressed using register addressing or memory-indexed addressing. If the register addressing form is designated, the emulation code sequencer 510, substitutes a previously stored modr/m reg field from Reg register into the DestReg field 668 of the SpecOp format 660 shown in FIG. 6D. If the memory-indexed addressing form is designated, the emulation code sequencer 510, substitutes a previously stored modr/m regm field from Regm register into the DestReg field 668 of the SpecOp format. The DestReg field 668 holds a five-bit register number which is the destination of operation LDK or LDKD.

The SpecOp is also checked to determine whether the data size (DSz) field 666 is to be substituted. A substitution value for the DSz field is determined previous to Op handling by the emulation code sequencer 510 when the emulation environment is defined in accordance with current segment default information as overridden by any operand size overrides. The DSz field 666 is set to a size of 1 byte, 4 bytes or an alternative defined D size for the load constant operations LDK and LDKD. The emulation code sequencer 510 substitutes a designated substitution value into the DSz field 666 of the SpecOp format 660.

If a SpecOp is a load constant, data (LDKD) operation, the emulation code sequencer 510 adjusts or scales data in the 17-bit immediate (Imm17) field 670 based on the current effective data size, which is specified by the data size (DSz) field 666. The 17-bit immediate (Imm17) field contains a 17-bit constant, a 17-bit signed immediate or a 14-bit Op address.

Register Address Space and Emulation Interface

The processor 120 implements a register address space that is expanded in comparison to a conventional x86 register address space. The processor 120 register address space is addressed by five bits so that $2^5$, or 32, registers may be defined. Eight registers correspond to x86 architectural registers. Sixteen additional temporary registers are added. The data size (DSz) field either directly or indirectly specifies the data size of the operation. For a single-byte operation, a register designated by the register encoding field is different from a two or four byte register designated by the same register encoding field. The data size of an operation may be either one-byte ($1^B$) or two/four bytes ($2^B/4^B$) for RegOps, SpecOps and the data field 642 of LdStOps. The data size is always two/four bytes ($2^B/4^B$) for the base 646 and index 649 fields of the LdStOps.

The processor 120 register field encoding is, as follows:

| REG number | DSz 2B/4B | DSz 1B | Description |
|---|---|---|---|
| 0 0 0 0 0 | AX/EAX | AL | |
| 0 0 0 0 1 | CX/ECX | CL | |
| 0 0 0 1 0 | DX/EDX | DL | |
| 0 0 0 1 1 | BX/EBX | BL | |
| 0 0 1 0 0 | SP/EPS | AH | |
| 0 0 1 0 1 | BP/EBP | CH | |
| 0 0 1 1 0 | SI/ESI | DH | |
| 0 0 1 1 1 | DI/EDI | BH | |
| 0 1 0 0 0 | t1 | t1L | disp32 |
| 0 1 0 0 1 | t2 | t2L | imm32 |
| 0 1 0 1 0 | t3 | t3L | address temp |
| 0 1 0 1 1 | t4 | t4L | address temp |
| 0 1 1 0 0 | t5 | t1H | address temp |
| 0 1 1 0 1 | t6 | t2H | modr/m effective address |
| 0 1 1 1 0 | t7 | t3H | next decode PC (seq or ret) |
| 0 1 1 1 1 | t0/_ | t4H | — |
| 1 0 0 0 0 | t8 | t8L | intermediate data temp |
| 1 0 0 0 1 | t9 | t9L | intermediate data temp |
| 1 0 0 1 0 | t10 | t10L | intermediate data temp |
| 1 0 0 1 1 | t11 | t11L | intermediate data temp |
| 1 0 1 0 0 | t12 | t8H | intermediate data temp |
| 1 0 1 0 1 | t13 | t9H | intermediate data temp |
| 1 0 1 1 0 | t14 | t10H | intermediate data temp |
| 1 0 1 1 1 | t15 | t11H | data save temp |
| 1 1 0 x x | reg | reg | |
| 1 1 1 x x | regm | regm | |

Mnemonics "t0" and "_" are synonyms for a register than can be written but always returns a zero when read. "_" is typically used in a context where an operand or result value is a "don't care".

Twenty-four general registers are supplied. The first eight registers correspond to the x86 general registers AX to DI. The remaining sixteen registers are temporary or scratch registers used within multiple operation sequences implementing CISC instructions. Operations which use 5-bit register numbers access 32 registers and remaining register numbers that are not used for integer registers are used as multimedia registers or placeholders for emulation environment variable substitution.

The x86 integer register set supports addressing for byte operations of either of the lower two bytes of half the registers (AX, CX, DX, and BX). Based on register size specification, the three-bit register numbers within the x86 instructions are interpreted as either high/low byte registers or as word/dword registers. From an operational perspective, this size is specified by either the ASz or DSz field of the operation. (ASz for base and index registers in LdStOps, and generally DSz for data/dest, src1 and src2 registers. The scratch integer register set supports similar addressing of the lower two bytes of half the registers (t1–t4 and t8–t11).

The intermediate data temporary registers are used, beginning with t8 in order of value derivation or little-endian significance. The "reg" and "regm" register numbers are replaced at Op decode time by the current three bit register number from the emulation environment, specifically by substituting Reg/RegM with "00xxx". The three-bits designate a register from among the first eight registers (AX through DI).

The organization of the Op formats and the expanded register address space define a flexible internal microarchitectural state of the processor 120. The x86 architectural state is merely a subset of the processor 120 microarchitectural state. The expanded register address space includes an expanded number of temporary registers, as compared to the x86 register address space. Twenty-four registers are supplied by the expanded register address space of the processor 120, only eight of these registers correspond to the x86 architectural registers and sixteen additional temporary registers are supplied. Similarly, the processor 120 includes an expanded number of flag registers, only some of which correspond to the x86 status flags.

For example, in one processor 120 embodiment, an emulation carry flag is defined in addition to the conventional carry flag and associated with the emulation environment. Thus, a conventional add instruction is defined that sets the carry flag and changes the permanent architectural state of the processor 120. An emulation add operation is defined that sets the emulation carry flag and not the conventional carry flag. Various instructions are defined to branch on the basis of the emulation carry flag while other instructions branch on the basis of the conventional carry flag. Thus, the processor 120 is concurrently operational in both a conventional microarchitectural state and in an emulation microarchitectural state. This operation in an emulation environment allows the processor 120 to execute an emulation microsequence and to not change the visible microarchitectural state.

Figure 8:
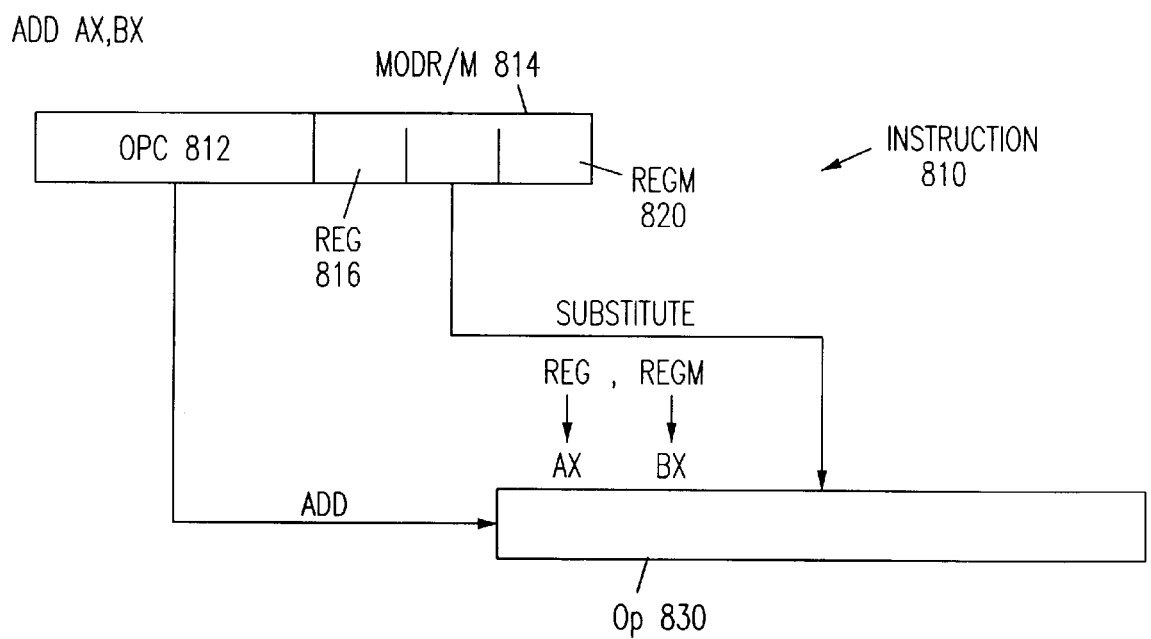
FIG. 8 is a pictorial depiction of an exemplary instruction substitution.

Referring to FIG. 8, the substitution technique is illustrated by a specific example. An ADD register instruction 810 in the x86 instruction set is encoded as an opcode 812 followed by a modr/m byte 814. The 8-bit opcode field of the ADD instruction, in combination with specification in the modr/m byte that the instruction is a register instruction, are used to derive a particular ROM entry point that causes the emulation code ROM 232 to produce an Op 830 for an ADD RegM to Reg operation. The reg and regm fields in the instruction register 512 specify that reg becomes AX and regm becomes BX, respectively. The reg and regm fields are applied from the instruction register 512 to the Op substitution circuit 522 so that substitution is achieved. The emulation code ROM 232 includes Op templates for only a limited number of Ops and the Op substitution circuit 522 fills the templates variously to generate a large number of different Ops.

Referring to the listed processor 120 register field encodings, register AX is hard-specified by a reg code, 0 0 0 0 0. Alternatively, four possible reg encodings, 1 1 0 x x, specify substitution of a register. The substitution is made based on the particular instruction emulated and the current state of the processor 120 including the current emulation environment. Generally, a substitution and execution of an operation is performed by substituting: (1) an encoding for a Reg into the dest field 620, (2) an encoding for a register Reg into the src1 field 622, (3) an encoding for a RegM into the Imm8/Src2 field 628, (4) a zero into the immediate (I) field 626, and (5) either the one, two or four bytes designated by the data size into the DSz field 618.

Figure 9:
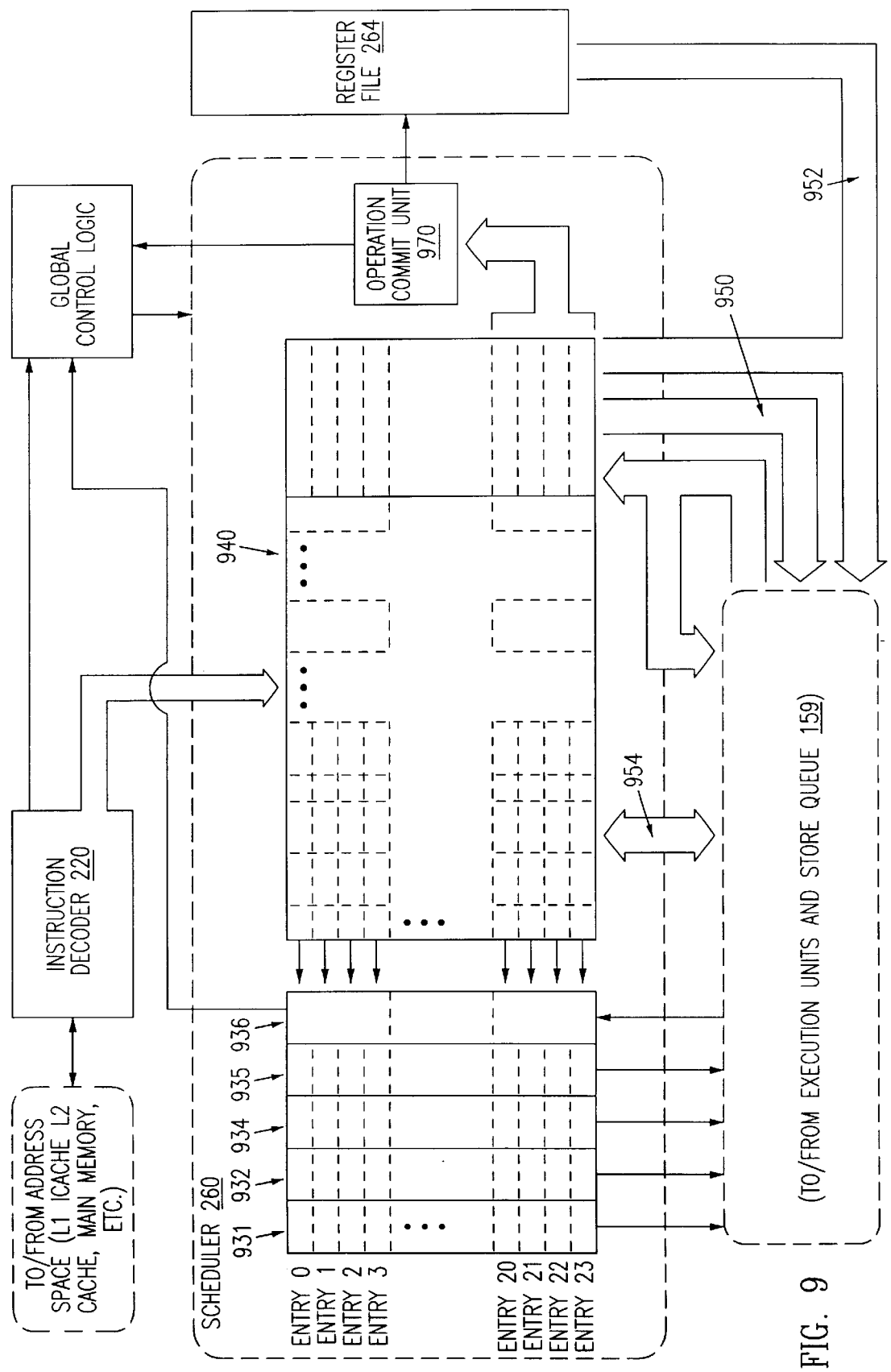
FIG. 9 is a schematic block diagram illustrating an exemplary embodiment of a scheduler.

Referring to FIG. 9, an exemplary embodiment of a scheduler 260 is shown. The scheduler 260 includes 24 entries which are associated with up to 24 operations. Each entry includes a set of storage elements (nominally flip-flops) in a scheduling reservoir 940 and portions of logic 931 to 936 associated with the entry. The storage location contain information regarding an operation (Op) which is awaiting execution, in the process of being executed, or completed. Most of the storage elements are loaded/initialized when the instruction decoder 220 loads a new operation into scheduler reservoir 940. Some storage elements are loaded or reloaded later such as when the operation completes execution. Storage fields that retain a value from the time an operation is loaded into scheduling reservoir 940 until the operation is retired from scheduler 260 are referred to herein as "static fields." Fields which can be reloaded with new values are referred to as "dynamic fields."

Individually, a storage element entry may be considered an enabled flip-flop. In combination, with respect to the scheduler 260, the plurality of storage elements are a shift register that is four entries wide and six rows (Op quad entries) deep. Storage elements associated with dynamic fields are loaded from a data source or a preceding storage element. Data is loaded into a storage element and simultaneously and independently shifted into a different storage element.

Scheduler 260 controls RU, LU, and SU pipelines created by register units 244 and 246, load unit 240, and store unit 242. Each RU pipelines has three stage referred to as the issue stage, the operand fetch stage or stage 0, and stage 1. LU and SU pipelines four stages referred to as the issue stage, the operand fetch stage or stage 0, stage 1, and stage 2. As described above, the State field represents the five states using "shifting/increasing field of ones" encoding to indicate the current pipeline stage of the associated operation or indicate that the operation has completed its pipeline.

Static fields are defined as follows and all values are active high:

Type[2:0] Specifies the type of operation, particularly for issue selection. For example, LdOps is selected for issue to LU alone. Type[2:0] decodes into three bits as follows:

| | |
|---|---|
| 000 | A Special operation not actually executed. |
| 010 = LU | A LdOp executed by load unit. |
| 10x = SU | A StOp executed by store unit. |
| 101 = ST | A StOp which references memory or at least generates a faultable address (i.e. not an LEA operation). |
| 11x = RU | A RegOp executed by RUX or possibly RUY. |
| 110 = RUX | A RegOp executable ONLY by RUX. |
| 111 = RUY | A RegOp executable by RUX or RUY. |
| LD_Imm | If a LdStOp, then the operation uses a large displacement (versus a small (8-bit) displacement held within this entry). If the operation is a RegOp, then an immediate value is Src2 operand. |
| Src1Reg[4:0] | Source 1 operand register number. |
| Src2Reg[4:0] | Source 2 operand register number. |
| DestReg[4:0] | Destination register number. |
| SrcStReg[4:0] | Source register number for Store data. |

Src1BM[1:0], Src2BM[1:0], and Src12BM[2] are byte marks designating bytes of Src1Reg and Src2Reg that must be valid for execution of the operation. Bits [2], [1], and [0] correspond to Reg[31:16], Reg[15:8] and Reg[7:0] respectively. Src12BM[2] applies to both Src1Reg and Src2Reg.

SrcStBM[2:0] Byte marks designating bytes of DestReg, when used by a StOp to specify the Store Data register, that are necessary for execution and actually completion of the StOp. The bit correspondence is the same as for Src1BM[1:0].

OpInfo[12:0] Additional information used only by the execution units or the operation commit unit (OCU) 970 depending on whether the operation is executable. The scheduler does not otherwise use the information. OpInfo is a union of three possible field definitions, depending on whether the Op is a RegOp, a LdStOp, or a SpecOp.

For a RegOp:

| | |
|---|---|
| Type[5:0] | Copy of the original Op Type field. |
| Ext[3:0] | Copy of the original Op Ext field. |
| R1 | Copy of the original Op R1 field. |
| DataSz[1:0] | The effective data size for the operation (1, 2, 4 bytes) |
| For a LdStOp: | |
| Type[3:0] | Copy of the original Op Type field. |
| ISF[1:0] | Copy of the original Op ISF field. |
| Seg[3:0] | Copy of the original Op Seg field. |
| DataSz[1:0] | The effective data size for the memory transfer. |
| AddrSz | The effective address size for the address calculation. (32/16 bits) |
| For a SpecOp: | |
| Type[3:0] | Copy of the original Op Type field. |
| CC[4:0] | Copy of the original Op cc field. |

Dynamic fields are defined as follows with all values active high:

State[3:0] Indicates the current execution state of an operation. (S3,S2,S1,S0 are alternate signal names for State[3:0].) Five possible states are encoded by a shifting field of ones across the four bits:

| | |
|---|---|
| 0000 | Unissued |
| 0001 | Stage 0 |
| 0011 | Stage 1 |
| 0111 | Stage 2 |
| 1111 | Completed |

The intermediate states correspond to the Op's current execution stage. The bits are updated (effectively shifted) as the operation is successfully issued or advances out of a stage. Note: some operations (e.g. LDK) are loaded into the scheduler with an initial State of 1111 and thus are already "completed". State [3:0] is also set to 1111 during abort cycles.

if (S0Enbl) S0=~BumpEntry+SC_Abort if (S1Enbl) S1=(S0 ~BumpEntry)+SC_Abort if (S2Enbl) S2=S1+SC_Abort if (S3Enbl) S3=S2+S1 RU+SC_Abort BumpEntry=RU ~S1 S0 (Exec1 BumpRUX+~Exec1 BumpRUY)

S0Enbl="Issue OPi to LU" CHP_LUAdv0+
  "Issue OPi to SU" CHP_SUAdv0+
  "Issue OPi to RUX" CHP_RUXAdv0+
  "Issue OPi to RUY" CHP_RUYAdv0+
  SC_Abort+BumpEntry
    S1Enbl=LU CHP_LUAdv0+SU CHP_SUAdv0+
    RU (Exec1 CHP_RUXAdv0+~Exec1
      CHP_RUYAdv0)+SC_Abort
S2Enbl=LU CHP_LUAdv1+SU CHP_SUAdv1+RU+
  SC_Abort
S3Enbl=LU CHP_LUAdv2+SU CHP_SUAdv2+RU+
  SC_Abort Exec1 If the operation is a RegOp, then RUX (not RUY) executes the operation. Exec1 is loaded when the operation has successfully been issued.

if (S0Enbl) Exec1="Issue OPi to RUX"

DestBM[2:0] Byte marks designating bytes of DestReg that the Op modifies. Bits [2,1,0] correspond to DestReg [31:16], Reg[15:8], and Reg[7:0] respectively. DestBM is cleared during abort cycles.

if (SC_Abort) DestBM=3'b0

DestVal[31:0] DestVal is the register result value from execution of the Op to be committed to DestReg. DestBM indicates which bytes are valid after Op execution. DestVal is loaded when the Op completes execution stage 1 or 2, depending on the type of Op. For non-executed Ops such as LDK, DestVal is initialized with the appropriate register result value. DestVal alternatively holds large immediate and displacement values for RegOps and LdStOps (respectively), and the alternate (sequential or target) branch PC value associated with a BRCOND Op.

if ((~S2+LU) ~S3 S1) DestVal=switch (Type)
  case LU: G_DestRes
  case SU: SU1_DestRes
  case (RU Exec1): RUX_DestRes
  case (RU ~Exec1): RUY_DestRes
  // an alternative mux control equation
  // if (S2) G_DestRes
  // elseif (SU) SU1_DestRes
  // elseif (Exec1) RUX_DestRes
  // else RUY_DestRes StatMod[3:0] Status group marks indicating which groups of status bits the Op modifies. Bits [3,2,1,0] correspond to {EZF,ECF}, OF, {SF,ZF,AF,PF}, and CF respectively. StatMod is always all zeroes for non-RegOps and is cleared during abort cycles.

if (Exec1 ~S3 S1 RUX_NoStatMod+SC_Abort)
StatMod=4'b0

StatVal[7:0] Statval is the status result value from execution of this Op and is committed to EFlags. StatMod designates valid bits after Op execution. StatVal is significant only for RegOps as is reflected by a zero value of StatMod for all non-RegOps. StatVal is loaded when the RegOp completes execution stage 1.

if (~S3 S1) StatVal=(Exec1) ? RUX_StatRes:RUY_StatRes

OprndMatch_XXsrcY where "XX" is LU, SU, RUX, or RUY and "Y" is 1 or 2.

Additional storage elements are used for storing transient information that is passed between two stages of logic. This differs from information of more global significance. Storage elements are physically the same as the above and are simply listed for completeness. Since additional storage elements pass information from the Issue stage to stage 0 of each processing pipeline or, in one case, from stage 1 to stage 2 of SU, storage element values are controlled by the XXAdv0 (or SUAdv2) global signals.

if (LUAdv0) {
  OprndMatch_LUsrc1= . . .
  OprndMatch_LUsrc2= . . .
}
if (SUAdv0) {
  OprndMatch_SUsrc1= . . .
  OprndMatch_SUsrc2= . . .
}
if (SUAdv2) {
  OprndMatch_SUsrcSt= . . .
}
if (RUXAdv0) {
  OprndMatch_RUXsrc1= . . .
  OprndMatch_RUXsrc2= . . .
}
if (RUYAdv0) {
  OprndMatch_RUYsrc1= . . .
  OprndMatch_RUYsrc2= . . .

}

DBN[3:0] The four Bn (n=0–3) data breakpoint status bits for a LdStOp. This field is initially all zeroes, then, when a LdStOp in this position executes, breakpoint bits from the appropriate unit are recorded for later trapping.

if ((AdvLU2+AdvSU2) ~S3 S2) DBN[3:0]=(DBN_LU [3:0] LU)+(DBN_SU[3:0] SU)

Scheduler Op Quad Entry Definition

The twenty-four entries are managed in FIFO fashion with new operations loaded in one end (the "top"), shifted down to the other end (the "bottom"), and retired or unloaded from the bottom of scheduling reservoir 940. To simplify the control, scheduler 260 manages reservoir 940 on an Op quad basis. Operations are loaded into, shifted through, and retired from reservoir 940 in groups of four. This matches the fetching and generation of operations in the form of Op quads by both the emcode ROM and the MacDec in decoder 220.

The scheduling reservoir 940 may be viewed as a six entry shift register containing Op quads. Each Op quad entry contains four entries, plus additional information associated with the Op quad as a whole. The following enumerates the additional "Op quad" fields and provides a short functional description of each field. All values are defined active high. Most of the fields are static. The description of the dynamic fields includes a pseudo-RTL definition of the logic generating the data and enable inputs of the storage elements holding these fields.

Emcode: Indicates whether this is an emcode op quad from emcode ROM or an Op quad generated by the MacDec.

Eret: Indicates that this is an emcode Op quad and that "contains" an ERET (return from emcode ROM).

FaultPC[31:0]: The logical macroinstruction (mI) fault program counter value associated with the operations in the Op quad entry. Used by the operation commit unit (OCU) 970 when handling fault exceptions on any of the operations.

BPTInfo[14:0] Branch Prediction Table-related information from when the Op quad was generated. This field is defined only for MacDec-generated Op quads which contain a BRCOND operation.

RASPtr[2:0] The Return Address Stack the top of the stack (TOS) value as of when the Op quad was generated. This field is defined only for MacDec-generated Op quads which contain a BRCOND operation.

LimViol Indicates that the Op quad is the decode of a transfer control instruction for which a code segment limit violation was detected on the target address. For most Op quads, this field is static. For the first register Op quad entry, this field can be loaded as summarized by the following pseudo-RTL description:

@clk: LdLV=LdEntry0~DEC_OpQSel_E
if (LdLV) LimViol=DEC_LimViol

OPQV Indicates whether the Op quad entry contains a valid Op quad and is used by the logic controlling the shifting of entries. Entries within for an "invalid" Op quad entry must still be defined and must have the same state as aborted entries.

if (SC_Abort) OpQV='b0

Op1I, Op2I, Op3I A count of the number of macroinstructions (mI) represented by this Op Quad (1, 2, or 3). Used to maintain a count of retired instructions.

Ilen0, Ilen1 The lengths in bytes of the first, and (if present) second macroinstruction represented by the Op Quad. Used to determine the instruction address at which a fault occurred.

Smc1stAddr, Smc1stPg, Smc2ndAddr, Smc2ndPg

The first and (if there are instructions from more than one page in the Op quad) second address covered by operations in the op quad. Used to detect self-modifying code.

OpDec Definition

The instruction decoder 220 also includes an Op substitution circuit 522 that connects the macroinstruction decoder 230 and the emulation code ROM 232 of the instruction decoder 220 to the scheduler 260. The Op substitution circuit 522 expands RISC instructions into field values load into the top, Op quad entry 0, of scheduler reservoir 940. To generate an Op quad, Op substitution circuit 522 modifies some fields from the RISC instruction based on other fields, derives new fields from existing ones, replaces some fields with physically different fields, and passes a few fields through unchanged. Environment variable substitution for fields of emcode operations requiring such, and the nulling of operations within emcode op quads which were jumped into the middle of, are both performed in logic preceding OpDec (i.e. EmDec).

The following pseudo-RTL equations describe the generation of each field of a scheduler entry from the fields of an incoming RISC instruction. The notation xxxOp.yyy refers to a field yyy defined for an instruction of type xxxOp, irrespective of the actual type of the instruction. For example, Regop.Src1 refers to bits in an instruction at the same position as the Src1 field of a RegOp. FIGS. 6A through 6E show exemplary field definitions for a RegOp, LdStOp, LIMMOp, SpecOp, and FpOp.

---

```
Type[2:0] switch(OpId) {
    case RegOp: Type[2,1] = 'b11,
            Type[0] = ~(RegOp.R1 + RUYD)
    case LdStOp: Type[2] = LdStOp.Type[3],
        Type[1] = ~LdStOp.Type[3],
        Type[0] = LdStOp.Type[3] && ~(LdStOp.Type[2]
            && LdStOp.Type[1])
    default: Type[2:0]= 'b000
    }
"RUYD" is a special register that disables the second register unit RUY for debugging.
LD_Imm   LD_Imm = (OpId=RegOp) ? RegOp.I : LdStOp.LD
            //don't care if not RegOp or LdStOp
Src1Reg[4:0]
        if (OpId=RegOp) Src1Reg =
        RegOp.Src1; Src1Reg[2]&=~(LsStOp.DSz=1B)
        else
        Src1Reg = {1'b0,LdStOp.Base}
            //don't care if not RegOp or LdStOp
```

-continued

```
            Src2Reg[4:0]
                    if (OpId=RegOp) Src2Reg =
                            RegOp.Src2; Src2Reg[2] &= ~(LdStOp.DSz=1B}
                    else
                            Src2Reg = {1'b0,LdStOp.Index}
                                    //don't care if not RegOp or LdStOp
DestReg[4]
            if (OpId= LIMMOp) DestReg = {1'b0,LIMMOp.Dest}
            elseif (OpId=LdStOp LdStOp.Type=STUPD)
                    DestReg = {1'b0,LdStOp,Base}
            else{
                    DestReg = LdStOp.Data
                    DestReg = DestReg[2] ~(LdStOp.DSz=1B)
                    }               //don't care if non-STUPD StOp
SrcStReg[4:0] SrcStReg = LdStOp.Data
            SrcStReg[2] SrcStReg[2] ~(LdStOp.DSz=1B &&
                    LdStOp.DataReg=t0)
                    //don't care if not StOp
Src1BM[1:0], Src2BM[1:0], and Src12BM[2]
            if (OpId=RegOp) {
                    Src1BM[0] = ~(RegOp.DSz=1B) + RegOp.Src1[2]
                    Src1BM[1] = ~(RegOp.DSz=1B) + RegOp.Src1[2]
                    Src2BM[0] = ~(RegOp.DSz=1B) + ~RegOp.Src2[2]
                            + RegOp.I
                    Src2BM[1] = ~(RegOp.DSz=1B) + RegOp.Src2[2]
                            ~RegOp.I
                    if (RegOp.Type=10001x) Src2BM[1]=
                            Src1BM[1] = 1'b0    //if ZEXT,SEXT
                    Src12BM[2] = (RegOp.DSz=4B)
                    if (RegOp.Type=(10001x + 111x00))Src12BM[2]=
                            1'b0           //if ZEXT,SEXT,CHKS
            } else {          //else LdStOp or don't care
                    Src1BM[1:0]= Src2BM[1:0] = 2'b11
                    Src12BM[2] = (LdStOp.ASz=4B)
            } //don't-care if LIMM
SrcStBM[2:0]
            if (LdStOp.Type=x0xx) {//STxxx Ops
                    SrcStBM[0]= ~(LdStOp.DSz=1B) +
                            ~LdStOp.Data[2]
                    SrcStBM[1] = ~(LdStOp.DSz=1B) +
                            LdStOp.Data[2]
                    SrcStBM[2] = (LdStOp.DSz=4B)
                    } else
                            SrcStBM[2:0] = 'b000        //CDA,CIA,LEA Ops
                                    //don't care if not StOp
OpInfo[12:0]    OpInfo[12] = Op[35]
            OpInfo[11:8] = (OpId=LIMMOp) ? 'b1111 : Op[34:31]
            OpInfo[7:0] = Op[30:25], Op[23:22]
State[3:0] State =
            (~OpQV + OpId=SpecOp SpecOp.Type=(LDKxx + LDxHA) +
            OpId=LIMMOp) ? 'b1111 : 'b0000
Exec1           Ecec1 = X
DestBM[2:0]
            if (OpId=LIMMOp0 {
                    if (LIMMOp.DestReg=t0)
                    DestBM = 'b000
                    else
                    DestBM = 'b111
            }elseif (OpId=LdStOp LdStOp.Type=STUPD) {
                    DestBM[1;0] = 2'b11
                    DestBM[2] = (LdStOp.ASz=4B)
                    { else }
                    DestBM[0] = ~(LdStOp.DSz=1B) +
                            ~LdStOP.Data[2]
                    DestBM[1] = ~(LdStOp.DSz=1b) + LdStOp.Data[2]
                    DestBM[2] = (LdStOp.DSz=4B)
                    }
            if (~OpQV + DestReg='B01111 +
                    (OpId=LdStOp LdStOp.Type=ST/STF))
                    DestBM = 3'b0
DestVal[31:0] DestVal = swithc(OpId) {
                    case RegOp: sext(RegOp.Imm8)
                    case LdStOP: sext(LdStOp.Disp8)
                    case LIMMOp: {LIMMOp.ImmHi,LIMMOp.ImmLo}
                    case SpecOp: if (SpecOp.Type=BRCOND &
                            ~DEC_OpQSel_E) DEC_AltNextIPC
                            else sext(SpecOp.IMM17)
```

StatMod[3:0]
StatMod=(OpQV OpId=RegOp RegOp.SS) ? RegOp.Ext:
    4'b0
StatVal[7:0] StatVal=8'bX
DBN[3:0] DBN=4'b0
  The following pseudo-RTL code describes generation of
each Op quad entry field which is associated with an Op
quad rather than a single particular operations.
    Emcode Emcode=DEC_OpQSel_E+DEC_Vec2Emc
       //treat vectoring Op quad as part of emcode
    Eret Eret=DEC_OpQSel_E EDR_Eret
    FaultPC[31:0] FaultPC=DEC_IPC
       //the logical PC for the first decoded mI in quad
    BPTInfo[14:0] BPTInfo=DEC_BPTInfo
       //info from the current BPT access
    RASPtr[2:0] RASPtr=DEC_RASPtr
       //the current return address stack TOS
    OpQV  OpQV=((DEC_OpQSel_E)?EDR_
       OpQV:DEC_OpQV) & ~ExcpAbort ~(SC_MisPred
       ~BrAbort)
    LimViol LimViol='b0
    //This Op quad bit is actually loaded one cycle
    //later than all of the other fields above (i.e. during
    //the first cycle that the new Op quad is resident and
    //valid within the scheduler. This is reflected in the
    //description above of this Op quad field.
Issue Selection
  Each cycle, based on State[3:0] fields of all the entries as of the beginning of the cycle, the scheduler 260 selects a LdOp, a StOp, and two RegOps to be issued into the corresponding processing pipelines, LU, SU, RUX, and RUY. The scheduler 260 selects operations for issue based on State and Type fields within each entry which are searched "in order" from oldest to newest operations in scheduling reservoir 940. Issue selection does not consider the register, status, and/or memory dependencies that each operation may have on relatively older operations.
  The scheduler 260 performs issue selection simultaneously and independently for each of the four processing pipelines. The selection algorithms for the four pipes are similar. The next unissued operation (as indicated by its State field) of given type is selected. In other words, the next unissued LdOp is selected for load unit 240, the next unissued StOp is selected for store unit 242, and the next two Unissued RegOps are issued to register unit X and register unit Y (the first to RUX, the second to RUY). Conceptually the issue selection for RUY depends on RUX, but is performed in parallel with issue selection for RUX. As further discussed below, some RegOps are only issuable to RUX, and the operation selected for issue to RUY is the next RegOp that is issuable to RUY.
  Each scheduler entry generates four bits (i.e. a signal) "Issuable to xxx" which indicate whether that operation is currently eligible for issue selection to the pipeline xxx where xxx is LU, SU, RUX, or RUY.
    "Issuable to xxx"="State=Unissued" && "Executable by xxx"
  Signals that are "issuable to xxx" are generated from State and Type bits of an entry. Specifically, "State=Unissued"= ~S0 and "Executable by xxx"=LU/SU/RU/RUY for execution pipeline LU/SU/RUX/RUY respectively. The selection process for pipeline xxx scans from the oldest scheduler entry to the youngest scheduler entry for entries with bit "Issuable to xxx" set. For pipelines LU, SU, and RUX, the first operation found with bit set is the one selected for issue.

Issue selection for pipeline RUY selects the first such operation after the operation selected for pipeline RUX.
  Operations are eligible for issue selection immediately after being loaded into the scheduler, i.e. an operation can be issued during its first cycle of residence within the scheduler. In such cases, only the Type bits and bit S0 need to be valid at the beginning of the cycle. All other field in an entry can be generated as late as during the issue selection phase (i.e. up to one half cycle later) and only need to be valid within a scheduler entry for the next phase of the processing pipeline.
  If an operation selected for issue does not advance into stage 0, then the operation was not successfully issued. During the next clock cycle, that operation's State field indicates the operation is unissued, and the operation competes for issue and will probably be selected again.
  In one embodiment of the invention, scheduler 260 scans the operations using scan chains formed from logic circuits in the entries. Each scan chain is similar to a carry chain such as used in high speed adders. For a scan for operations to be issued to the load unit, the store unit, or register unit X, a "carry" bit Cin input to the entry for the oldest entry is set and propagates through the scan chain until logic in one of the entries kills the scan bit. An entry kills the carry bit if the entry corresponds to an operation of the type scanned (i.e. "Issuable to xxx"). To scan for an operation to be issued to register unit Y, a "carry" bit is generated by an entry associated with the operation to be issued to register unit X, and that carry bit propagates until killed by an entry associated with an operation issuable to register unit Y.
Displacement Forwarding
  During the operand forward phase, scheduler 260 fetches and forwards displacement operands to the LU and SU processing pipelines in addition to the register operands for these units. The LU and SU each have three input operand buses 952 which carry two register operands and one displacement operand. Displacement operands are 32-bit quantities, but some bytes may be undefined. An execution unit does not use undefined displacement bytes during correct operation.
  Scheduler 260 handles displacements in a manner similar to operation register result values. The displacements are stored until used within the 32-bit DestVal fields of entries and are driven onto displacement buses 950, as is appropriate, during the operand forward phase of LU/SU stage 1. Displacements are always immediate values within scheduler 260, so that forwarding displacement values from register file 264 does not occur. Field DestVal is also used for result values from LdOps and some StOps of LdStOp's, but the two uses do not conflict since a result value is not loaded into a scheduler entry until after use of the displacement value, i.e. not until after stage 0.
  Small (8-bit) displacements, which are specified within operations, are handled differently from large (16/32-bit) displacements. Op substitution circuit 522 sign extends a small displacement before loading the small displacements into the DestVal field of the entry holding the associated LdStOp. Large displacements are presumed to be stored in the DestVal field of the entry immediately preceding the LdStOp using the displacement. Generally, the preceding entry holds a "LIMM t0,[disp]" operation.
  The selection of DestVal values to drive onto the displacement buses 950 during each cycle does not require scanning of scheduler entries. Instead, each entry determines from its State and Type fields whether to enable its own drivers or drivers in a preceding entry to assert a DestVal field value onto the appropriate displacement bus 950. The following equations summarize the enabling the displacement bus drivers within each entry.

Disp_LU=(thisOp(LU ~S1 S0 ~LD)+nextOp(LU ~S1 S0 LD))?DestVal:32'bZ

Disp_SU=(thisOp(SU ~S1 S0 ~LD)+nextOp(SU ~S1 S0 LD))?DestVal:32'bZ

Values "thisOp" and "nextOp" identify the physical entry from which come the following minterm's literals LU, S1, S0, and LD. Also, in the case of the first/youngest entry in scheduler 260, the NextOp minterm is zero.

Immediate Forwarding

In accordance with the exemplary format of RISC instructions for execution engine 222, immediate values are only src2 operands of RegOps. Scheduler 260 handles immediate values in a similar manner to displacements but as part of the register operand forwarding mechanism. Like displacement values, immediate values are stored in the DestVal fields of entries; but like register operands, immediate values are forwarded over register operand buses 952 (specifically the RUXsrc2 and RUYsrc2 operand buses).

The exemplary RISC instruction set uses only small (8-bit) immediate values in RegOps and stores the immediate values in field DestVal of the entry holding the RegOp. Src2 operand immediate values are forwarded to respective register execution units during the operand forward phase of stage 0 in place of a register value. The selection of a register value source (i.e. a scheduler entry or the register file) is inhibited, and the entry in question directly drives its DestVal field onto the appropriate src2 operand bus 952.

The inhibition of any RUX/RUYsrc2 operand selection is performed during the operand selection phase through masking of the generate signal that would normally be asserted by the entry holding the RegOp whose operands are being fetched. This is done separately and independently for RUXsrc2 and RUYsrc2 and prevents selection of any entry by the RUX/Ysrc2 scan chain and selection of the register file as the default operand source. The previous operand selection scan chain equations exhibit the inhibition.

The selection of "immediate" DestVal values to drive onto the RUXsrc2 and RUYsrc2 operand buses during each cycle does not require scanning of scheduler entries. Instead, each entry enables the drivers of its DestVal field onto the appropriate operand bus simply based on its State and related bits. These are the same drivers used for normal register value forwarding; there is simply an additional term in each enable equation for handling immediate operands. The following summarizes these terms as separate equations enabling separate bus drivers within each entry.

Oprnd_RUXsrc2=(RU Exec1 ~S1 S0 Imm)?DestVal:32'bZ

Oprnd_RUYsrc2=(RU ~Exec1 ~S1 S0 Imm)?DestVal:32'bZ

When an entry drives an immediate value onto an operand bus 952, the entry also drives the associated operand status bus 954. The same bus drivers and driver input values as for normal operands are used for immediate values; there is simply an additional term in each enable equation (the same additional terms as above). The following summarizes these terms as separate equations enabling separate bus drivers:

OprndStat_RUXsrc2=(RU Exec1 ~S1 S0 Imm)?OprndStat:10'bZ

OprndStat_RUYsrc2=(RU ~Exec1 ~S1 S0 Imm)?OprndStat:10'bZ

Data Operand Fetching

StOps have three register source operands and no register destination, in contrast other operations have to up to two source operands and one destination. The third source operand for a StOp provides the data to be stored and is sometimes referred to herein as a data operand. The data operand is not needed to start execution but is needed for completion of a StOp. Fetching of StOp data operand values is performed in a manner similar fetching other source operands, but is synchronized with SU stage 2. Whereas the "normal" operand fetch process occurs during the issue stage and stage 0 of operation processing, the data operand fetch process occurs during SU stages 1 and 2. Scheduler 260 detects a data operand that is not yet available during SU stage 2 and holds the associated StOp in stage 2.

The data operand fetch process is largely the same as issue and operand fetch stages described above with two principal differences. The first difference is that an operand selection phase for the StOp currently in SU stage 1 replaces the issue selection phase and does not scan across scheduler entries to choose between multiple candidates. Instead, the entry associated with the StOp at SU stage 1 identifies itself from the State and Type fields. The second difference is that the OpInfo field of the StOp does not need to be read out (again) during a broadcast phase for the data operand. Instead, store unit 242 retains the OpInfo value read out when the StOp was issued and uses that OpInfo field during the following phases. The OpInfo value read out during the SU Issue stage is passed down with the operation through stages 0, 1, and 2 the SU pipeline.

The following equation describe the signals generated for the data operand fetch.

SU stage 1: Operation Selection Phase

"Select for data operand fetch"=SU ~S2 S1

SU stage 1: Data Operand Broadcast Phase

SrcStInfo[7:0]={SrcStBM[2:0],SrcStReg[4:0]}

OprndInfo_SUsrcSt="Select for data operand fetch"?SrcStInfo:8'bZ

"match with operand SUsrcSt"=OprndMatch_SUsrcSt=
(busReg[4:0]==DestReg[4:0])
&& (busBM[1] DestBM[1]+busBM[0] DestBM[1])
where "bus" refers to OprndInfo_SUsrcSt.

The match signal is then latched into a pipeline register bit within each entry:

if (SUAdv2) OprndMatch_SUsrcSt="match with operand SUsrcSt"

SU stage 2: Data Operand Selection Phase

Bit-level scan equations:

~P=K=OprndMatch_SUsrcSt

G=SU ~S3 S2

Group-level scan equations are the same as for other operand selection scan chains.

"Supply OPi result value to SUsrcSt"=SUsrcStchain.CINi SUsrcStchain.Ki

SU stage 2: Operand Forward Phase

Enable for driver within each scheduler entry:

Oprnd_SUsrcSt=
"Supply Op result value to SUsrcSt"?DestVal:32'bZ
OprndStat_SUsrcSt=
"Supply Op result value to SUsrcSt"?OprndStat:10'bZ
Enable for driver at output of register file:
Oprnd_SUsrcSt=
SUsrcStchain.COUT?SUsrcStRegVal:32'bZ
OprndStat_SUsrcSt=
SUsrcStchain.COUT?{7'b1111111,3'bXXX}:10'bZ The data operand Oprnd_SUsrcSt transferred over bus 555 is captured in a pipeline register at the input of store unit 242. During this phase, control logic (not shown) uses the operand status value read.

RegOp Bumping

"Normally", operations issued to a given processing execution unit progress down the pipeline in fixed order with respect to other operations issued to that pipeline. When an operation is held up in stage 0, for example, the operation currently being selected for issue to that pipe also gets held up because operations cannot pass by each other within a processing pipeline. Scheduler 260 generally manages the processing pipelines based on in-order issue selection and processing.

One exception is made. When a RegOp is held up in stage 0 of either register unit due to one or more unavailable operand values, the RegOp may be bumped out of the processing pipe and back to the unissued state. This amounts to setting the RegOp's State field back to b0000. When a RegOp is bumped out of a RU stage 0, the following RegOp selected for issue to that register unit advances into stage 0, immediately taking the place of the bumped RegOp. Simultaneously, the bumped RegOp is immediately eligible for reissue to a register unit, not necessarily the same register unit.

Bumping is applicable to all RegOps and is subject to the following constraints. First, an RUX-only RegOp (in RUX stage 0) cannot be bumped if an RUX-only RegOp is currently being selected for issue to RUX because bumping would violate the guaranteed that RUX-only RegOps are executed in order with respect to each other. Secondly, a RegOp should only be bumped if it will be stalled for more than one cycle, otherwise it is generally better to leave the RegOp in stage 0 waiting to advance to stage 1. The above equations indicating the S1 State bits of entries implement RegOp bumping. In addition, global control logic (not shown) generates the global bump signals (BumpRUX and BumpRUY) which force assertion of the RUXAdv0 and RUYAdv0 signals.

Status Flag Handling

The handling and use of status flags, both x86 architectural flags and micro-architectural flags, involves three areas of functionality: fetching status flag operand values for cc-dep RegOps, fetching status flag values for resolution of BRCOND operations, and synchronizing non-abortable RegOps with preceding BRCOND operations. Unlike logic (not shown) for register operands and LdOp-StOp ordering, logic (not shown) supporting status flag functions is not spread across all scheduler entries. Status flag handling for related operations only occurs while operations that access status flags are within certain Op quad entries. Cc-dep RegOps must be in Op quad entry 3, the middle Op quad entry within scheduling reservoir 940, during the cycle when status operand fetching occurs (i.e. during RUX stage 0). BRCOND operations and non-abortable RegOps must be in Op quad entry 4 during resolution by branch unit 252 and RUX stage 0, respectively.

Cc-dep and non-abortable RegOps are held up in RUX stage 0 if they have not yet shifted down to Op quad entry 3 and 4 respectively. Conversely, scheduler Op quad shifting is inhibited until such operations are successfully able to advance into RUX stage 1. These restrictions allow logic 535 to be simpler and smaller. For example, the fetching of appropriate status flag values for cc-dep RegOps and BRCOND operations only occurs across the bottom three scheduler Op quad entries and can be performed independently for each of four groups of status flags corresponding to the four StatMod bits of an operation. Logic can be shared or utilized for both cc-dep RegOp status operand fetching and BRCOND operation resolution, and the synchronization between non-abortable RegOps and BRCOND operations is simplified.

In addition, passing status flag values directly from either RegOp execution unit to a cc-dep RegOp entering the RUX execution unit, is not supported. The result is a minimum one cycle latency between the execution of a ".cc" RegOp and the execution of a following cc-dependent RegOp. The statistical performance impact of this latency is minimal because cc-dependent RegOps rarely occur in a consecutive order. Further, any impact can be eliminated by emcode and MacDec ordering operations to eliminate consecutive cc-dependent RegOps.

To further aid the simplification and reduction of logic, a number of restrictions are placed on where cc-dep RegOps, BRCOND operations, and non-abortable RegOps can occur relative to each other within Op quads. These generally translate into emcode coding rules, but in some cases also constrain MacDec decoding of multiple mI's in one cycle. In particular, the restrictions are as follows:

1) No ".cc" RegOps after a BRCOND operation.
2) No cc-dep RegOps after a ".cc" RegOps.
3) No non-abortable RegOps in a quad with a BRCOND Op.
4) Only one cc-dep RegOp within an Op quad.
5) Only one BRCOND operation within an Op quad.
6) Only one non-abortable RegOp within an Op quad.

Status Forwarding to CC-Dep RegOps

During each cycle, the four operations within Op quad entry 3 are examined to determine whether any of them is a cc-dep RegOp. If one is, then the specific type of the RegOp is decoded to determine which groups of status flags are needed, and the StatusV bits are checked to determine whether all of those groups are, in fact, valid. Concurrently, Status[7:0] is blindly passed to the RUX execution unit.

If all of the required flag groups are currently valid, then the RegOp is allowed to advance into RUX stage 1 at least insofar as the status operand fetch is concerned. If the RegOp does not immediately advance into stage 1, though, then shifting of Op quad entries 3 to 6 is inhibited. If any of the required flag groups are not currently valid, then the RegOp is held up from advancing into RUX stage 1 and shifting of scheduler Op quad entries 3 to 6 is inhibited.

If there is no unexecuted cc-dep RegOp in Op quad entries 3 to 6, but there is a cc-dep RegOp in RUX stage 0, then the RegOp is unconditionally held up in stage 0. If a cc-dep RegOp in Op quad entry 3 has not yet executed, but there is no cc-dep RegOp in RUX stage 0 or there is an unexecuted cc-dep RegOp in Op quad entries 4 to 6, then shifting of Op quad entries 3 to 6 is inhibited.

There is an additional input from the RUX unit (RUX_NoStatMod) which indicates that the operation being executed there does not modify status flags. A cycle-delayed version, called "NoStatMod," is useful in several situations. The following equations describe this logic.

CCDepInRUX_0=(OpInfo_RUX_0(RegOp).Type[3:2]='b01) OpV_RUX_0 UnexecCCDepInQ3=

OP12:(RU OpInfo(RegOp).Type[3:2]='b01 ~S1)+

OP13:(RU OpInfo(RegOp).Type[3:2]='b01 ~S1)+

OP14:(RU OpInfo(RegOp).Type[3:2]='b01 ~S1)+

OP15:(RU OpInfo(RegOp).Type[3:2]='b01 ~S1)

if (~OpInfo_RUX_0(RegOp).Type[5])
StatV=StatusV[1]
//need CF for ADC,SBB,RLC,RRC Ops elseif (OpInfo__RUX__0(RegOp).Type[1:0]='b10)
   StatV=StatusV[0] //need EZF,ECF for MOVcc Op
else //need OF, . . . ,CF for MOVcc,RDFLG,DAA,DAS Ops
StatV=StatusV[3] StatusV[2] StatusV[1]
//keep track of when an unexecuted cc-dep RegOp is in
//Op quad entry 3:
StrtExecCCDep=CCDepInRUX__0 SC__AdvRUX0
   ~BumpRUX
//keep track of when an unexecuted cc-dep RegOp is in
//Op quad entry 4
@clk: if (LdEntry4+StrtExecCCDep+SC__EAbort)
   UnexecCCDepInQ4=LdEntry4 UnexecCCDepInQ3
   ~StrtExecCCDep ~SC__EAbort
//hold copy of status flag values at input to RUX
//execution unit:
SC__HoldStatus=UnexecCCDepInQ4
//hold RegOp execution if . . . :
StatusInvld__RUX=(CCDepInRUX__0
   ~UnexecCCDepInQ4)
   ~(UnexecCCDepInQ3 StatV ~NoStatMod)
//hold Op quad from shifting out of scheduler quad 3 //if
   . . . :
HoldOpQ3=
   UnexecCCDepInQ3 ~(CCDepInRUX__0 StatV
      ~NoStatMod)+
   UnexecCCDepInQ4

Brcond Operation Resolution

During each cycle, Op quad entry 4 is checked for a BRCOND operation. If one is found, then the condition code (cc) field of that entry is decoded to select one of 32 condition value combinations and associated valid bits. The value and validity of the selected condition are then used to inhibit scheduler shifting of quad entries 4 to 6 and/or to assert pipeline restart signals if necessary.

If a BRCOND operation is found to be mispredicted (and thus a pipeline restart is required), the restart signal is asserted based on whether the BRCOND operation is an "MacDec" or emcode operation and whether it is from internal or external emcode. In addition, an appropriate x86 macroinstruction or emcode vector address and an associated return address stack TOS value are generated.

For the benefit of the logic handling synchronization between non-abortable RegOps and preceding BRCOND operations (described in the next section), record is also maintained of the occurrence of a mispredicted BRCOND operation while it remains outstanding (i.e. until an abort cycle occurs). Further, the existence of an outstanding mispredicted BRCOND operation is used to hold up the loading of "new" Op quads (from the "restarted" MacDec) until the abort cycle occurs.

If a BRCOND operation was correctly predicted, the only action taken is to set the BRCOND operation's State bit S3 to indicate the BRCOND is completed.

The following equations describe all of this logic. Reference is made below to "DTF" and "SSTF" signals—these are signals indicating breakpoint and single-step traps, respectively. There is also a signal called "MDD, " for "multiple decode disable" which can be used for debugging to prevent more than one macroinstruction from being inserted into the scheduler at a time.

BRCOND16=OP16:(Type=SpecOp OpInfo(SpecOp)
   .Type=BRCOND ~S3)
BRCOND17=OP17:(Type=SpecOp OpInfo(SpecOp)
   .Type=BRCOND ~S3)
BRCOND18=OP18:(Type=SpecOp OpInfo(SpecOp)
   .Type=BRCOND ~S3)
BRCOND19=OP19:(Type=SpecOp OpInfo(SpecOp)
   .Type=BRCOND ~S3)
BRCONDInQ4=(BRCOND16+BRCOND17+
   BRCOND18+BRCOND19) OPQ4:OpQV
CondCode[4:0]={BRCOND16}*5 OP16:OpInfo(SpecOp)
   .CC[4:0]+
   {BRCOND17}*5 OP17:OpInfo(SpecOp).CC[4:0]+
   {BRCOND18}*5 OP18:OpInfo(SpecOp).CC[4:0]+
   {BRCOND19}*5 OP19:OpInfo(SpecOp).CC[4:0]
CondV=switch (CondCode[4:1]) {
   case 0000: 'b1
   case 0001: StatusV[0]
   case 0010: StatusV[0]
   case 0011: StatusV[0] StatusV[2]
   case 0100: StatusV[0]
   case 0101: StatusV[0]
   case 0110: StatusV[0]
   case 0111: StatusV[0] StatusV[2]
   case 1000: StatusV[3]
   case 1001: Statusv[1]
   case 1010: StatusV[2]
   case 1011: StatusV[2] StatusV[1]
   case 1100: StatusV[2]
   case 1101: StatusV[2]
   case 1110: StatusV[3] StatusV[2]
   case 1111: StatusV[3] StatusV[2]
}
//any active h/w interrupt requests?:
IP=SI__NMIP+SI__INTRP
CondVal=switch (CondCode[4:1]) {
   case 0000: CondCode[0]^'b1
   case 0001: CondCode[0]^Status[0]
   case 0010: CondCode[0]^Status[1]
   case 0011: Status[1]+(CondCode[0]^~Status[5])
   case 0100: CondCode[0]^(~Status[1] ~IP ~(DTF+SSTF+
      MDD))
   case 0101: CondCode[0]^(~Status[1] ~IP ~(DTF+SSTF+
      MDD))
   case 0110: CondCode[0]^(~Status[0] ~IP ~(DTF+SSTF+
      MDD))
   case 0111: ~Status[1] ~IP ~(DTF+SSTF+MDD)&
      (CondCode[0]^Status[5])
   case 1000: CondCode[0]^Status[7]
   case 1001: CondCode[0]^Status[2]
   case 1010: CondCode[0]^Status[5]
   case 1011: CondCode[0]^(Status[5]+Status[2])
   case 1100: CondCode[0]^Status[6]
   case 1101: CondCode[0]^Status[3]
   case 1110: CondCode[0]^(Status[7]^Status[6])
   case 1111: CondCode[0]^((Status[7]^Status[6])+Status
      [5])
}
// the definitions of CondCode[4:1] is as follows //(bit 0 flips the sense):

| | | |
|---|---|---|
| True | | 4'b0000 |
| ECF | | 4'b0001 |
| EZF | | 4'b0010 |
| SZnZF | 4'b0011 | |
| MSTRZ | 4'b0100 | |
| STRZ | | 4'b0101 |
| MSTRC | | 4'b0110 |
| STRZnZF | | 4'b0111 |
| OF | | 4'b1000 |
| CF | | 4'b1001 |
| ZF | | 4'b1010 |
| CvZF | | 4'b1011 |
| SF | | 4'b1100 |
| PF | | 4'b1101 |
| SxOF | | 4'b1110 |
| SxOvZF | | 4'b1111 |

//hold Op quad from shifting out of Op quad entry 4 //if . .
. :
HoldOpQ4A=BRCONDInQ4 ~CondV
SC_Resolve=
BRCONDInQ4 CondV ~SC_MisPred ~NoStatMod
~OPQ4:Emcode
//remember resolution of a BRCOND operation in quad 4:
@clk: Resolved=~LdEntry4 (SC_Resolve+Resolved)
//terminate REP MOVS emcode loop if almost done:
//use CS "D" bit supplied by RUX to aid termination in
//16-bit case
TermMovs=BRCONDInQ4 CondV ~NoStatMod ~SC_MisPred &
  ((CondCode[4:1]='b0110) (OP19:DestVal[15:0]=
  16'h5) & (OP19:DestVal[31:16]=16'h0+RUX_D)+
  (CondCode[4:1]='b0100) (OP23:DestVal[15:0]=
  16'h6) & (OP23:DestVal[31:16]=16'b0+RUX_D))
  //CondCode=MSTRC . . . +CondCode=MSTRZ . . .
@clk: TermedMOVS=~LdEntry4 (TermMOVS ||
  TermedMOVS)
SC_TermMOVS=TermMOVS+TermedMOVS
//get emcode or instruction vector address for handling
//mispredicted branch
BrVecAddr[31:0]={BRCOND16}*32 OP16:DestVal
[31:0]+
  {BRCOND17}*32 OP17:DestVal[31:0]+
  {BRCOND18}*32 OP18:DestVal[31:0]+
  {BRCOND19}*32 OP19:DestVal[31:0]
//supply old RAS TOS ptr to MacDec for restoring if
//BRCOND operation mispredicted:
SC_OldRASPtr[2:0]=OPQ4:RASPtr[2:0]
//supply old BPT info to MacDec for restoring
//if BRCOND operation mispredicted:
SC_OldBPTInfo[14:0]=OPQ4:BPTInfo[14:0]
//supply either fault PC or alternate branch address to
//MacDec if BRCOND operation mispredicted:
SC_RestartAddr[31:0]=ExcpAbort?OPQS:FaultPC:
  ((OPQ4:Emcode)?OPQ4:FaultPC[31:0]:
  BrVecAddr[31:0])
//initiate restart if BRCOND operation mispredicted:
BrVec2Emc=SC_Resolve ~CondVal OPQ4:Emcode
BrVec2Dec=SC_Resolve ~CondVal OPQ4:~Emcode
//remember misprediction:
@clk: if (SC_Resolve+SC_Abort) SC_MisPred=~SC_Abort (~CondVal+SC_MisPred)
//mark BRCOND Op as Completed if correctly predicted:
@clk: if (SC_Resolve CondVal BRCOND16) OP16:S3='b1
@clk: if (SC_Resolve CondVal BRCOND17) OP17:S3='b1
@clk: if (SC_Resolve CondVal BRCOND18) OP18:S3='b1
@clk: if (SC_Resolve CondVal BRCOND19) OP19:S3='b1

A BRCOND operation being successfully resolved may sit in Op quad entry 4 for more than one cycle due to Op quad entries 5 and 6 not being able to shift and thus preventing Op quad entry 4 from shifting down. During this time SC_Resolve=1 and one of signals BrVec2XXX on buses 557 remains asserted for the entire time (versus for just the first cycle). This is alright since instruction decoder 220 keeps restarting each cycle until signal BrVec2XXX deasserts. All of the other associated signals such as the vector address maintain proper values throughout this time.

Non-abortable RegOp Synchronization

During each cycle, Op quad entry 4 is checked for a non-abortable RegOp. If one is found, then scheduler 260 checks for any preceding mispredicted BRCOND operations. Due to emcode coding constraints, any preceding BRCOND operations must be in a lower Op quad entry and thus must have all been resolved. Further, any BRCOND operation currently being resolved is guaranteed to fall after the non-abortable RegOp and thus is irrelevant.

If no such mispredicted BRCOND operations exist, then the RegOp is allowed to advance into RUX stage 1. If the RegOp does not immediately advance into stage 1, it is still allowed to shifted out of Op quad entry 4.

If Op quad entries 4 or 5 contain no unexecuted non-abortable RegOp but there is a non-abortable RegOp in RUX stage 0, the non-abortable RegOp is unconditionally held up in stage 0 the non-abortable Reg-Op reaches Op quad entry 4. If there is a non-abortable RegOp in Op quad entry 4 that has not yet executed, but there is no non-abortable RegOp in RUX stage 0 or there is an unexecuted non-abortable RegOp in Op quad entry 5, shifting of Op quad entries 4 and 5 is inhibited.

The following equations describe this logic:
NonAbInRUX_0=(OpInfo_RUX_0(RegOp).Type
  [5:2]='b1110) OpV_RUX_0
UnexecNonAbInQ4=

OP16(RU OpInfo(RegOp).Type[5:2]='b1110 ~S1)+

OP17(RU OpInfo(RegOp).Type[5:2]='b1110 ~S1)+

OP18(RU OpInfo(RegOp).Type[5:2]='b1110 ~S1)+

OP19(RU OpInfo(RegOp).Type[5:2]='b1110 ~S1)

//hold RegOp execution if . . . :
NonAbSync=NonAbInRUX_0 & (~UnexecNonAbInQ4+
  SC_MisPred+"trap pending")
//hold Op quad from shifting out of Op quad entry 4 //if . .
. :
HoldOpQ4B=UnexecNonAbInQ4

System Embodiments

Figure 10:
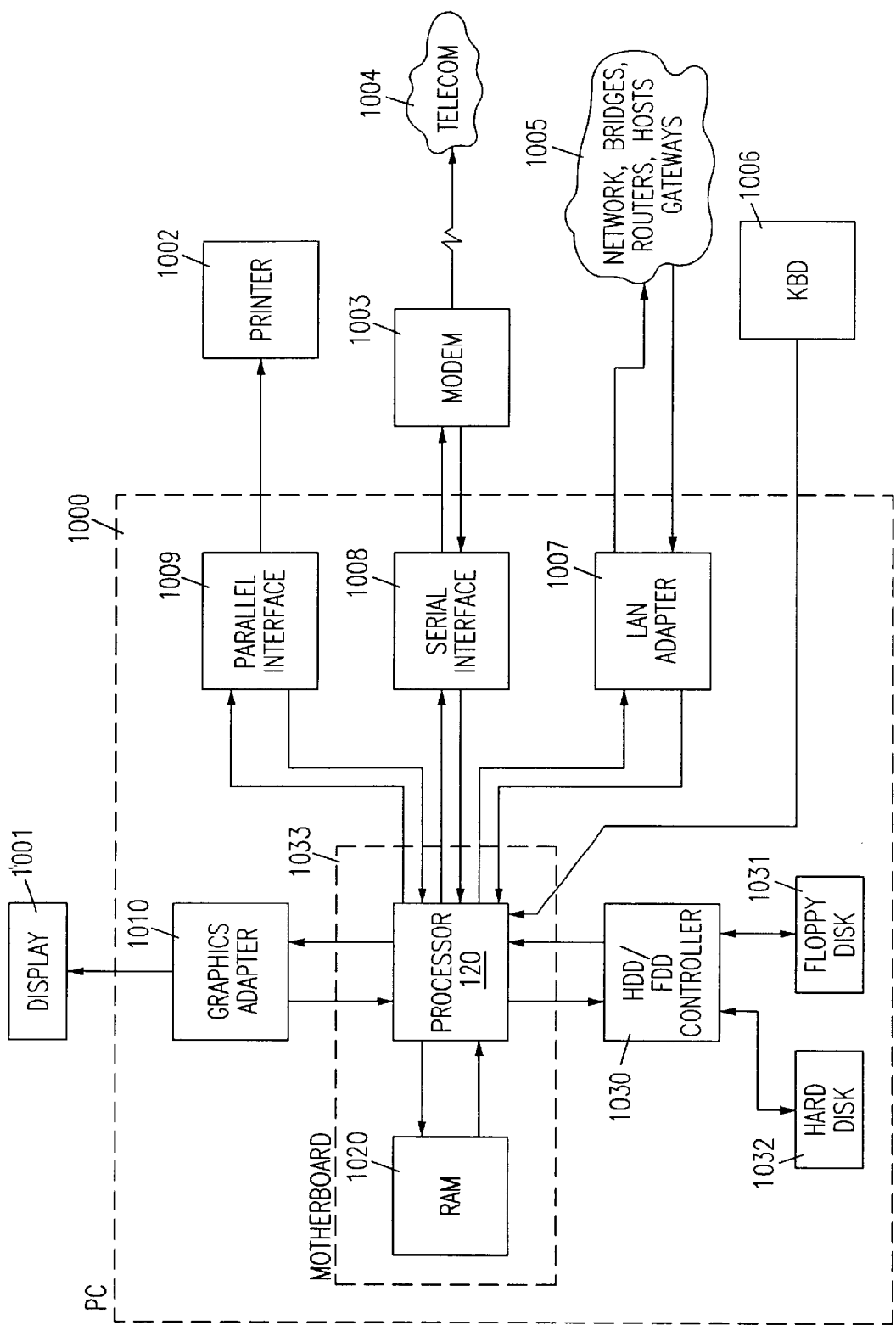
FIG. 10 is a block diagram of a personal computer incorporating a processor having an instruction decoder which implements a RISC86 instruction set in accordance with an embodiment of the present invention.
Figure 11:
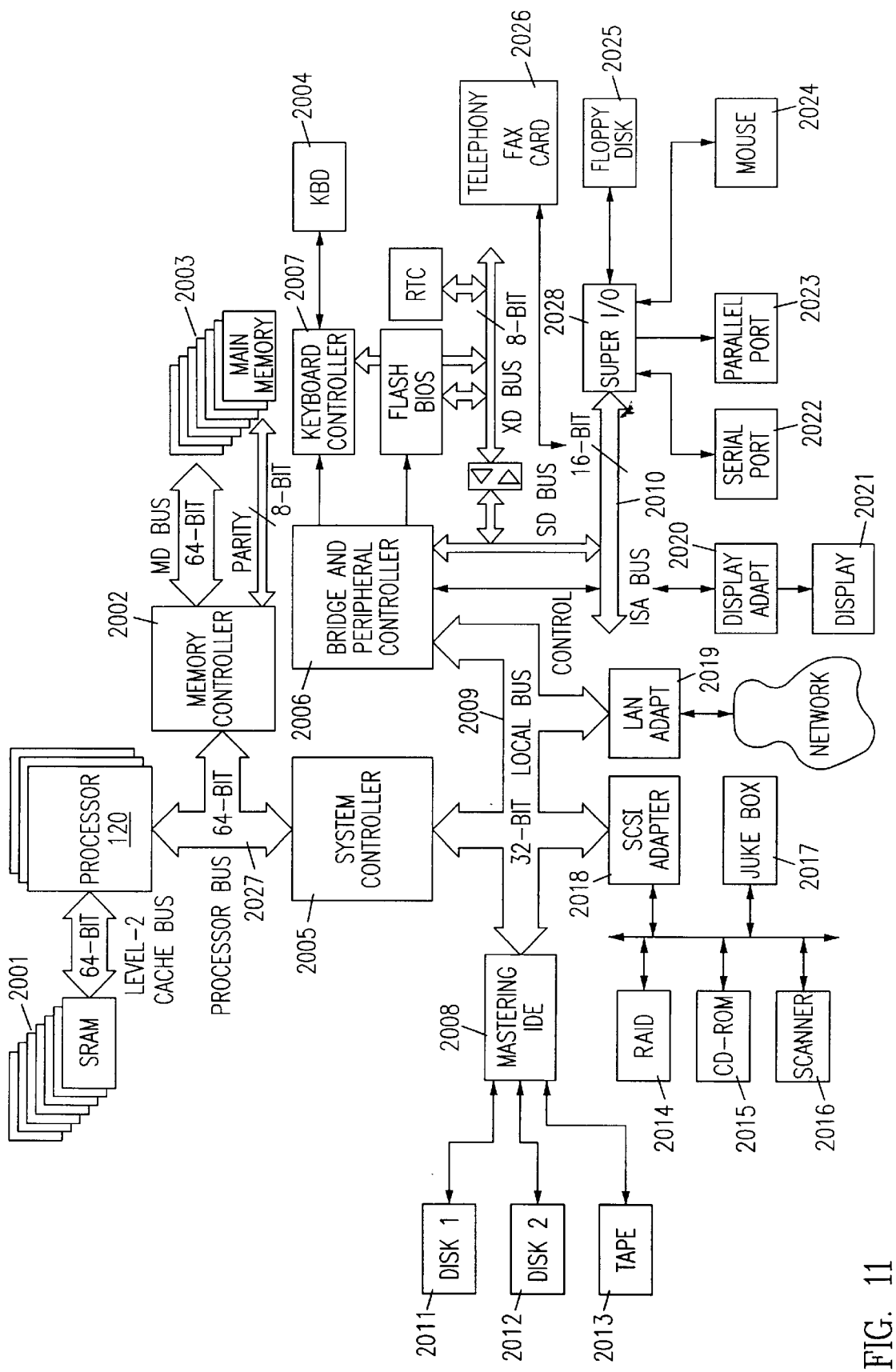
FIG. 11 is a block diagram of a network server computer incorporating a processor having an instruction decoder which implements a RISC86 instruction set in accordance with an embodiment of the present invention.
Figure 12:
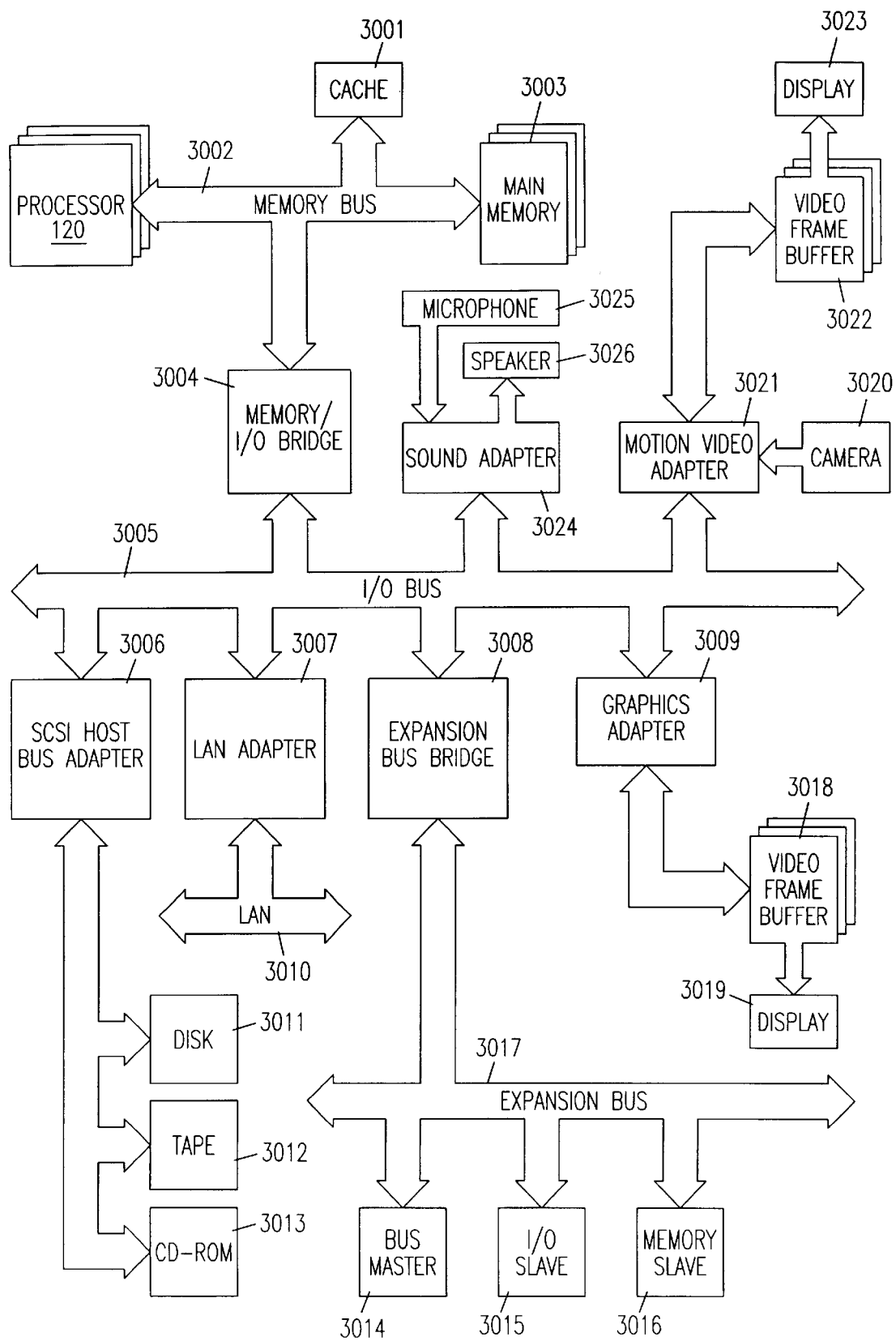
FIG. 12 is a block diagram of a multimedia computer incorporating a processor having an instruction decoder which implements a RISC86 instruction set in accordance with an embodiment of the present invention.

Superscalar processor 120 may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 10–12 depict an illustrative set of suitable system configurations for a processor, such as superscalar processor 120, that has an instruction decoder which implements a RISC86 instruction set. In particular, FIGS. 10–12 depict suitable combinations of a superscalar processor having an instruction decoder that implements a RISC86 instruction set with suitable, bus configurations, memory hierarchies and cache configurations, I/O interfaces, controllers, devices, and peripheral components.

The set of system configurations depicted in FIGS. 10–12 is merely illustrative and alternate combinations of bus configurations, memory hierarchies, I/O interfaces, controllers, devices, and peripheral components are also suitable. For example, suitable configurations for a system incorporating superscalar processor 120 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc;
8. video cards and devices, 2-D and 3-D graphics cards, frame buffers, MPEG/JPEG compression/ decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 10–12 are illustrative of an exemplary subset of the full set of suitable combinations.

A networked personal computer incorporating superscalar processor 120 is shown in FIG. 10. Superscalar processor 120 is connected to memory subsystem 1020. In the embodiment of FIG. 10, memory subsystem 1020 is shown as RAM, although alternative embodiments include a cache or caches interposed between the RAM and superscalar processor 120. Control logic and storage for such a cache may be distributed among the memory subsystem 1020 and the supersealar processor 120. For example, the level 1 caches (i.e., instruction cache 214 and data cache 216) and cache control logic 212 may be included in superscalar processor 120 as shown in FIG. 2 and the level 2 cache may be included as part of memory subsystem 1020. Alternative distributions are also suitable, although the level 1 caches are preferably on-chip with the out-of-order execution engine 222 (see FIG. 2) of superscalar processor 120.

In the embodiment shown in FIG. 10, superscalar processor 120 and memory subsystem 1020 are included as parts of motherboard 1033. A series of adapters, interfaces and controllers couple the processor to devices and peripheral components. These adapters, interfaces and controllers are typically be connected to the processor as cards in a backplane bus of motherboard 1033. However, alternative embodiments may incorporate individual adapters, interfaces and controllers into motherboard 1033. For example, graphics adapter 1010 may be included on motherboard 1033 with superscalar processor 120. In either case, graphics adapter is connected to superscalar processor 120 via busses such as those described below with reference to FIGS. 11 and 12. Graphics adapter 1010 drives signals to control display 1001 in accordance with screen updates supplied by superscalar processor 120. Parallel interface 1009 and serial interface 1008 provide parallel port and serial port signaling interfaces for respectively interfacing to parallel port devices (e.g., printers such as parallel printer 1002, tape backup units, etc.) and to serial devices (e.g., modem 1003, pointing devices, and printers). In the embodiment shown in FIG. 10, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of hard disk 1032 and to floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, LAN adapter 1007 provides a network interface to local area networks such as 802.3 ethernet, 10base-T, twisted pair, and token ring networks. As with the other adapters and interfaces, LAN adapter 1007 is typically connected to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

Because of the high performance associated with its superscalar design, superscalar processor 100 is particularly attractive as the processor, or a one of multiple processors, in a network server configuration such as that shown in FIG. 11. In the network server configuration shown in FIG. 11, multiple instances of superscalar processor 100 are shown connected to a level 2 cache 2001 and to a processor bus 2027. In the embodiment shown in FIG. 11, superscalar processor 100 includes an on-board level 1 cache (i.e., instruction cache 214 and data cache 216) and level 2 cache control logic. The level 2 cache control logic (not shown) is connected to level 2 cache 2001 via a 64-bit cache bus. Alternate embodiments of superscalar processor 120, such as the embodiment shown in FIG. 2, may offload the functionality of level 2 cache control logic. In such an alternative embodiment, level 2 cache control logic may be interposed between superscalar processor 120 and level 2 cache 2001. In the context of bus structures presented in FIG. 11, level 2 cache control logic could be connected to superscalar processor 120 via processor bus 2027. Suitable modifications to the level 2 cache configuration shown in FIG. 11 will be apparent to those skilled in the art.

Referring again to FIG. 11, superscalar processor 120 is connected to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. System controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to IDE controller 2008, SCSI Adapter 2018, LAN Adapter 2019, and bridge and peripheral controller 2006). Certain of the local bus devices and components on local bus 2009 may optionally be provided as cards connected to the local bus 2009 by a modular connector. In the embodiment shown in FIG. 11, IDE controller 2008, SCSI adapter 2018, and LAN adapter 2019 are provided as cards connected to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown connected to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is connected to two disks (hard disk 2011 and floppy disk 2012) and to a tape backup unit 2013. Alternative configurations may interface an IDE/enhanced IDE CD-ROM via IDE controller 2008, although a both a CD-ROM 2015 and a CD jukebox 2017 are interfaced via a Small Computer System Interface (SCSI) adapter 2018 in the embodiment shown in FIG. 11. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is connected to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 11. Additional SCSI devices may also be connected to SCSI adapter 2018 and additional SCSI adapters may be connected to local bus 2009 to provide even larger numbers of SCSI device connections. Additionally, SCSI adapter 2018 and/or additional SCSI adapters may be connected to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 11, additional hard disks printers, LAN adapters and other computer systems may be connected to superscalar processor 120 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is connected to local bus 2009 and, in the embodiment of FIG. 11, supports an IEEE 802.3 Carrier Sense Multiple Access with Collision Detection (CSMA/CD) local area network, although adapters for alternative network configurations and for media variations of an 802.3 network are also be suitable. LAN adapter 2019 is therefore representative of suitable alternative device adapters such as those based on IEEE 802.x standards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 connected to superscalar processor 120 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is connected to any of the suitable bus structures (e.g., VL bus, PCI bus, ISA bus, SCSI, etc.).

ISA bus 2010 is connected to local bus 2009 via bridge and peripheral controller 2006. Suitable bridges, like system controller 2005 bridge, are well known in the art and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queueing, and texture mapping. As described above, display device requirements have typically been less demanding in network server configurations than in personal computer or workstation configurations. As a result, display adapter 2020 is shown connected to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be connected via serial port 2022 and printers may be connected via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 11, includes a hierarchy of busses with varying performance characteristics each matched to the devices and components connected thereto. Those skilled in the art will recognize a variety of suitable variations on the bus hierarchy shown in FIG. 11, including the elimination individual busses, the addition of multiple instances of individual busses, and redistribution of devices and components among the various busses. The server configuration shown in is FIG. 11 is representative of all such suitable variations.

A multimedia workstation configuration for superscalar processor 120 shown in FIG. 12. As with the server configuration shown in FIG. 11, the multimedia workstation configuration includes a hierarchy of busses with varying performance characteristics each matched to the devices and components connected thereto. Those skilled in the art will recognize a variety of suitable variations on the bus hierarchy shown in FIG. 12. Memory bus 3002 couples superscalar processor 120, cache 3001, memory 3003, and bridge 3004. As with the network server configuration shown in FIG. 11, a variety of cache configurations are suitable for a multimedia workstation. In the embodiment shown in FIG. 12, superscalar processor 120 includes an on-board level 1 cache (i.e., the instruction cache 214 and data cache 216 shown in FIG. 2). A level 2 cache (i.e., cache 3001) including control logic is connected to superscalar processor 120 via memory bus 3002. Alternate embodiments of superscalar processor 120, may incorporate functionality of level 2 cache control logic thereby enabling a direct connection to level 2 cache storage. Furthermore, alternative embodiments may relocate all cache support to cache 3001, although at least a level 1 cache is preferably on-chip with the out-of-order execution engine 222 (see FIG. 2) of superscalar processor 120. Suitable modifications to the cache configuration shown in FIG. 11 will be apparent to those skilled in the art.

I/O bus 3005 is comparable to local bus 2009 shown in FIG. 11 and is preferably a high speed I/O bus such as a VL bus or PCI bus. SCSI adapter 3006, LAN adapter expansion bus bridge 3008, graphics adapter 3009, sound adapter 3024, and motion video adapter 3021 are connected to each other and to superscalar processor 120 via I/O bus 3005. SCSI adapter 3006, LAN adapter 3007, and expansion bus bridge 3008, together with the components and devices connected to each are comparable to corresponding adapters, components, and devices discussed above with reference to FIG. 11.

In particular, SCSI adapter 3006 is connected to multiple SCSI devices (illustratively, disk 3011, tape backup unit 3012, and CD-ROM 3013) in a daisy chain configuration. For illustrative purposes, the daisy chain of SCSI devices is shown as a bus. Additional SCSI devices may also be connected to SCSI adapter 3006. Suitable designs for SCSI adapter 3006 are discussed above with reference to the comparable SCSI adapter 2018 shown in FIG. 11. Variations on the set of SCSI devices, and on SCSI configurations in general (each of which has been described above with reference to FIG. 11) are also applicable in the multimedia workstation configuration shown in FIG. 12. Similarly, suitable designs and variations on LAN adapter 3007 are also described above in the context of the comparable LAN adapter 2019 (see FIG. 11). Furthermore, suitable designs and variations on expansion bus 3017 are described above in the context of the comparable ISA bus 2010 (see FIG. 11). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices connected thereto) are comparable. SCSI adapter 3006, LAN adapter 3007, expansion bus bridge 3008, and expansion bus 3017 are therefore also of any such suitable designs.

As shown above in FIG. 2, out-of-order execution engine 222 of superscalar processor 120 includes a multimedia unit 157 for executing multimedia extensions to the x86 instruction set. Referring again to FIG. 12, multimedia adapters, such as sound adapter 3024, motion video adapter 3021, and graphics adapter 3009, are each connected to superscalar processor 120 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively connected to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration shown in FIG. 12, video compression and decompression can be performed by superscalar processor 120 (executing multimedia instructions in multimedia unit 157) and/or by motion video adapter 3021. Thus, memory bus 3002 and bridge 3004 preferably support burst data transfers across the bridge 3004 between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queueing, and texture mapping. Suitable designs for graphics adapters are well known in the art and modular components based on these designs are commonly available. Graphics adapter 3009 is of any such suitable design. Alternative embodiments my combine the graphics display functionality of graphics adapter 3009 with the motion video display functionality of motion video adapter 3021 outputting on a single high-resolution display device.

CROSS-REFERENCE

The present invention is related to subject matter disclosed in the following co-pending patent applications:

1. U.S. patent application Ser. No. 08/649,981, entitled, "Instruction Predecode and Multiple Instruction Decode," now U.S. Pat. No. 5,809,273, naming John G. Favor and Amos Ben-Meir as inventors and filed on even date herewith;
2. U.S. patent application Ser. No. 08/649,995, entitled, "Instruction Buffer Organization Method and System," now U.S. Pat. No. 5,799,165, naming John G. Favor as inventor and filed on even date herewith;
3. U.S. patent application Ser. No. 08/592,150, entitled "Self-Modifying Code Handling System", now U.S. Pat. No. 5,826,073, naming Amos Ben-Meir and John G. Favor as inventors and filed on Jan. 26, 1996;
4. U.S. patent application Ser. No. 08/592,209, entitled "Out-of-Order Load/Store Execution Control,", now U.S. Pat. No. 5,754,812, naming John G. Favor, Amos Ben-Meir, Warren G. Stapleton, Jeffrey E. Trull and Mark E. Roberts as inventors and filed on Jan. 26, 1996;
5. U.S. patent application Ser. No. 08/649,242, entitled, "Out-of-Order Processing With Operation Bumping to Reduce Pipeline Delay,", now U.S. Pat. No. 5,799,165, naming John G. Favor and Amos Ben-Meir as inventors and filed on even date herewith;
6. U.S. patent application Ser. No. 08/650,055, entitled, "Scan Chain for Rapidly Identifying First or Second Objects of Selected Types In A Sequential List,", now U.S. Pat. No. 5,881,261, naming John G. Favor, Amos Ben-Meir and Jeffrey E. Trull as inventors and filed on even date herewith;
7. U.S. patent application Ser. No. 08/649,984, entitled, "Instruction Decoder Including Two-Way Emulation Code Branching,", now U.S. Pat. No. 5,920,713, naming John G. Favor as inventor and filed on even date herewith;
8. U.S. patent application Ser. No. 08/649,980, entitled, "Instruction Decoder Including Emulation Using Indirect Specifiers,", now U.S. Pat. No. 5,794,063, naming John G. Favor as inventor and filed on even date herewith;
9. U.S. patent application Ser. No. 08/649,982, entitled, "Flexible Implementation of a System Management Mode (SMM) in a Processor,", now U.S. Pat. No. 6,093,213, naming John G. Favor and Frederick D. Weber as inventors and filed on even date herewith;
10. U.S. patent application Ser. No. 08/592,041, entitled "Design for a Simulation Module Using an Object-Oriented Programming Language,", now U.S. Pat. No. 5,870,585, naming Warren G. Stapleton as inventor and filed on Jan. 26, 1996;
11. U.S. patent application Ser. No. 08/592,828, entitled "Method for Analyzing The Performance of a Microprocessor,", now U.S Pat. No. 5,886,899, naming Warren G. Stapleton as inventor and filed on Jan. 26, 1996;
12. U.S. patent application Ser. No. 08/592,829, entitled "Method for Simulating Cache Operation,", now U.S. Pat. No. 5,845,106, naming Warren G. Stapleton as inventor and filed on Jan. 26, 1996;

13. U.S. patent application Ser. No. 08/649,243, entitled, "Unified Multi-Function Operation Scheduler for Out-Of-Order Execution In A Superscalar Processor", now U.S. Pat. No. 5,884,059, naming John G. Favor, Amos Ben-Meir and Warren G. Stapleton as inventors and filed on even date herewith; and 14. U.S. patent application Ser. No. 08/649,847, entitled, "A Cache Controller With Table Walk Logic Tightly Coupled to Second Level Access Logic", now U.S. Pat. No. 5,960,463, filed on even date herewith;

each of which is incorporated herein by reference, in its entirety.

While the invention has been described with reference to various embodiments, it will be understood that these embodiments are illustrative and that the scope of the invention is not limited to them. Many variations, modifications, additions, and improvements of the embodiments described are possible. Additionally, structures and functionality presented as hardware in the exemplary embodiment may be implemented as software, firmware, or microcode in alternative embodiments. For example, the description depicts a macroinstruction decoder having short decode pathways including three rotators 430, 432 and 434, three instruction registers 450, 452 and 454 and three short decoders SDec0 410, SDec1 412 and SDec2 414. In other embodiments, different numbers of short decoder pathways are employed. A decoder that employs two decoding pathways is highly suitable. These and other variations, modifications, additions, and improvements may fall within the scope of the invention as defined in the claims which follow.

What is claimed is:

1. A microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:
      a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:
         a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands, wherein the RegOp class further includes special register read and write operations and has defined-usage bit-fields including:
            an extension bit-field for specifying a condition code for a conditional move instruction and for specifying a special register to be read and written by the special register read and write operations.

2. The microprocessor according to claim 1, wherein the RegOp class further includes an operation that modifies one or more status flags, the RegOp class further having defined-usage bit-fields including:
   an extension bit-field for specifying the one or more status flags that are modified by the operation; and
   a set status bit-field for causing the operation to modify status flags in accordance with the extension bit-field.

3. The microprocessor according to claim 1, wherein the RegOp class of operations includes an operation for writing a program counter to redirect processor execution.

4. A microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:
      a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:
         a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands, wherein the RegOp class further has defined-usage bit-fields including: a bit-field for designating an execution unit for executing an operation.

5. The microprocessor according to claim 4, wherein the RegOp class further includes an operation that modifies one or more status flags, the RegOp class further having defined-usage bit-fields including:
   an extension bit-field for specifying the one or more status flags that are modified by the operation; and
   a set status bit-field for causing the operation to modify status flags in accordance with the extension bit-field.

6. The microprocessor according to claim 4, wherein the RegOp class of operations includes an operation for writing a program counter to redirect processor execution.

7. A microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:
      a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:

a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands, wherein the RegOp class of operations includes a check selector operation for simultaneously checking a memory segment selector for access permission and loading the selector if permission is attained.

8. The microprocessor according to claim 7, wherein the RegOp class further includes an operation that modifies one or more status flags, the RegOp class further having defined-usage bit-fields including:

an extension bit-field for specifying the one or more status flags that are modified by the operation; and a set status bit-field for causing the operation to modify status flags in accordance with the extension bit-field.

9. The microprocessor according to claim 7, wherein the RegOp class of operations includes an operation for writing a program counter to redirect processor execution.

10. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:

a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands, wherein the RegOp class of operations includes a check selector operation (CHKS) for simultaneously checking a memory segment selector for access permission and loading the selector if permission is attained.

11. The microprocessor according to claim 10, wherein the RegOp class further includes an operation that modifies one or more status flags, the RegOp class further having defined-usage bit-fields including:

an extension bit-field for specifying the one or more status flags that are modified by the operation; and a set status bit-field for causing the operation to modify status flags in accordance with the extension bit-field.

12. The microprocessor according to claim 10, wherein the RegOp class of operations includes an operation for writing a program counter to redirect processor execution.

13. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:

a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands, wherein the RegOp class of operations includes: a write descriptor real (WRDR) operation for loading a segment register in a real mode fashion; a write descriptor protected mode high (WRDH) operation and a write descriptor protected mode low (WRDL) operation for performing a sequence of checking operations for checking data segments and I/O address space as an emulation code sequence of hardware primitives.

14. The microprocessor according to claim 13, wherein the RegOp class further includes an operation that modifies one or more status flags, the RegOp class further having defined-usage bit-fields including:

an extension bit-field for specifying the one or more status flags that are modified by the operation; and a set status bit-field for causing the operation to modify status flags in accordance with the extension bit-field.

15. The microprocessor according to claim 13, wherein the RegOp class of operations includes an operation for writing a program counter to redirect processor execution.

16. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the indirect specifiers specify an instruction parameter selected from the parameters including an operating register, a data size and an address size.

17. The microprocessor according to claim 16, wherein the instruction classes include:

a load operation (LdOp) class including load operations and having defined-usage bit-fields including an operation type field, a plurality of bit-fields for designating a source address in memory, a bit-field for designating a destination register for receiving data from the source address in memory, and a bit-field for designating a data size of the source-destination data.

18. The microprocessor according to claim 16, wherein the instruction classes include:
   a store operation (StOp) class including store operations having defined-usage bit-fields including an operation type field, a plurality of bit-fields for designating a store address in memory, a bit-field for designating a data source register for sourcing data from the store register, and a bit-field for designating a data size of the source-destination data.

19. The microprocessor according to claim 16, wherein the instruction classes further include a load immediate operation class (LIMMOp) having defined-usage bit-fields including:
   an immediate data high (ImmHi) bit-field and an immediate data low (ImmLo) bit-field for designating the immediate data value; and
   a bit-field for designating a data destination register for receiving data from the load-store address in memory.

20. The microprocessor according to claim 16, wherein the instruction classes further include a special operation class (SpecOp) including a conditional branch operation, a set default fault handler address operation, a set alternate fault handler address operation and an unconditional fault operation and having defined-usage bit-fields including:
   a bit-field for designating a condition code; and
   a data immediate bit-field for designating a signed immediate data value.

21. A microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:
      a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:
         a load-store operation (LdStOp) class including load and store operations and having defined-usage bit-fields including an operation type field, a plurality of bit-fields for designating a load-store address in memory, a bit-field for designating a data source-destination register for sourcing-receiving data from the load-store address in memory, and a bit-field for designating a data size of the source-destination data, wherein the plurality of bit-fields for designating a load-store address in memory in the LdStOp class includes: a segment register for designating a memory segment of the load-store address; a base register for designating a base of the load-store memory address; an index register for designating a memory index; and an index scale factor bit-field for designating an index scale factor.

22. The microprocessor according to claim 21, wherein the LdStOp class of operations includes a check data effective address (CDA) operation.

23. The microprocessor according to claim 21, wherein the LdStOp class of operations includes a check instruction effective address (CIA) operation.

24. The microprocessor according to claim 21, wherein the LdStOp class of operations includes a store integer data with base register update (STUPD) operation.

25. The microprocessor according to claim 21, wherein the LdStOp class of operations includes an operation for invalidating a TLB address (TIA).

26. A superscalar microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:
      a plurality of mutually-uniform bit-length instruction codes, each code being divided into a plurality of defined-usage bit fields and the codes being classified into a plurality of instruction classes, each code in an instruction class having a mutually-consistent definition of defined-usage bit-fields, the instruction classes including:
         a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands;
         a load-store operation (LdStOp) class including load and store operations and having defined-usage bit-fields including an operation type field, a plurality of bit-fields for designating a load-store address in memory, a bit-field for designating a data source-destination register for sourcing-receiving data from the load-store address in memory, and a bit-field for designating a data size of the source-destination data; and
         a load immediate operation class (L,IMMOp) having defined-usage bit-fields including:
            an immediate data high (ImmHi) bit-field and an immediate data low (ImmLo) bit-field for designating the immediate data value; and
            a bit-field for designating a data destination register for receiving data from the load-store address in memory.

27. A microprocessor according to claim 26, wherein the instruction set RegOp class further includes an operation that modifies one or more status flags, the RegOp class further having defined-usage bit-fields including:
   an extension bit-field for specifying the one or more status flags that are modified by the operation; and
   a set status bit-field for causing the operation to modify status flags in accordance with the extension bit-field.

28. A superscalar microprocessor comprising:
   a source of CISC-like instructions;
   a RISC-like processor core for executing a plurality of RISC-like operations in parallel; and
   a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, each code in an instruction class having a mutually-consistent definition of defined-usage bit-fields, the instruction classes including:

a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands;

a load-store operation (LdStOp) class including load and store operations and having defined-usage bit-fields including an operation type field, a plurality of bit-fields for designating a load-store address in memory, a bit-field for designating a data source-destination register for sourcing-receiving data from the load-store address in memory, and a bit-field for designating a data size of the source-destination data; and a special operation class (SpecOp) including a conditional branch operation, a set default fault handler address operation, a set alternate fault handler address operation and an unconditional fault operation and having defined-usage bit-fields including: a bit-field for designating a condition code; and a data immediate bit-field for designating a signed immediate data value.

29. A microprocessor according to claim 28, wherein the instruction set RegOp class further includes an operation that modifies one or more status flags, the RegOp class further having defined-usage bit-fields including:

an extension bit-field for specifying the one or more status flags that are modified by the operation; and a set status bit-field for causing the operation to modify status flags in accordance with the extension bit-field.

30. A computer system comprising:

a memory subsystem which stores data and instructions; and a processor operably coupled to access the data and instructions stored in the memory subsystem, wherein the processor includes:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, each code in an instruction class having a mutually-consistent definition of defined-usage bit-fields, the instruction classes including:

a register operation (RegOp) class including arithmetic operations, shift operations and move operations and having defined-usage bit-fields including an operation type field, three operand bit-fields for designating a first source operand, a second source operand and a destination operand, a bit-field for designating a data size of the operands;

a load-store operation (LdStOp) class including load and store operations and having defined-usage bit-fields including an operation type field, a plurality of bit-fields for designating a load-store address in memory, a bit-field for designating a data source-destination register for sourcing-receiving data from the load-store address in memory, and a bit-field for designating a data size of the source-destination data, and at least one of a load immediate operation class (LIMMOp) and a special operation class (SpecOp), wherein the LIMMOp class has defined-usage bit-fields including: an immediate data high (ImmHi) bit-field and an immediate data low (ImmLo) bit-field for designating the immediate data value; and a bit-field for designating a data destination register for receiving data from the load-store address in memory; and wherein the SpecOp class includes a conditional branch operation, a set default fault handler address operation, a set alternate fault handler address operation and an unconditional fault operation and having defined-usage bit-fields including: a bit-field for designating a condition code; and a data immediate bit-field for designating a signed immediate data value.

31. The computer system of claim 30, wherein the processor and the memory subsystem are components of a motherboard.

32. The computer system of claim 31, wherein the motherboard further comprises a backplane bus operably connected to the processor, and wherein the computer system further comprises one or more devices on cards connected to the motherboard via the backplane bus.

33. The computer system of claim 30, further comprising a parallel device interface operably coupled to the processor.

34. The computer system of claim 33, further comprising a printer connected to the processor via the parallel interface.

35. The computer system of claim 30, further comprising a serial device interface operably coupled to the processor.

36. The computer system of claim 35, further comprising a modem connected to the processor via the serial interface.

37. The computer system of claim 30, further comprising a graphics adapter operably coupled to the processor.

38. The computer system of claim 37, further comprising a video display connected to the processor via the graphics adapter.

39. The computer system of claim 30, further comprising a local area network adapter operably coupled to the processor.

40. The computer system of claim 39, further comprising a network of devices connected to the processor via the network adapter.

41. The computer system of claim 30, further comprising a disk controller operably coupled to the processor.

42. The computer system of claim 41, further comprising a hard disk connected to the processor via the disk controller.

43. The computer system of claim 41, further comprising a floppy disk connected to the processor via the disk controller.

44. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:

a special operation class (SpecOp) including a conditional branch operation, a set default fault handler address operation, a set alternate fault handler address operation and an unconditional fault operation and having defined-usage bit-fields including: a bit-field for designating a condition code; and a data immediate bit-field for designating a signed immediate data value, wherein the SpecOp class of operations includes an operation for loading a constant (LDK).

45. The microprocessor according to claim 44, wherein the special operation class (SpecOp) further includes a load constant operation and the defined-usage bit-fields further include:

a bit-field for designating a data destination register; and a bit-field for designating a data size of constant data.

46. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein the instruction classes include:

a special operation class (SpecOp) including a conditional branch operation, a set default fault handler address operation, a set alternate fault handler address operation and an unconditional fault operation and having defined-usage bit-fields including: a bit-field for designating a condition code; and a data immediate bit-field for designating a signed immediate data value, wherein the SpecOp class of operations includes a load constant data (LDKD) operation.

47. A microprocessor comprising:

a source of CISC-like instructions;

a RISC-like processor core for executing a plurality of RISC-like operations in parallel; and a decoder coupling the source of CISC-like instructions to the RISC-like processor core, the decoder for converting CISC-like instructions into operations of a RISC-like instruction set including:

a plurality of mutually-uniform bit-length instruction codes, each code being divided into a plurality of defined-usage bit fields and the codes being classified into a plurality of instruction classes, the code in an instruction class having a mutually-consistent definition of defined-usage bit-fields including a bit-field that is mapped using indirect specifiers so that a single mutually-uniform bit-length instruction code maps into a plurality of instruction versions, wherein a defined-usage bit-field of an operation is designated by a substituted value that is determined by an emulation environment of the processor.

48. The microprocessor according to claim 46, wherein the special operation class (SpecOp) further includes a load constant operation and the defined-usage bit-fields further include:

a bit-field for designating a data destination register; and a bit-field for designating a data size of constant data.

* * * * *